(12) United States Patent
Uemura

(10) Patent No.: US 9,564,638 B2
(45) Date of Patent: Feb. 7, 2017

(54) BATTERY ELECTRODE OR SEPARATOR SURFACE PROTECTIVE AGENT COMPOSITION, BATTERY ELECTRODE OR SEPARATOR PROTECTED BY THE COMPOSITION, AND BATTERY HAVING THE BATTERY ELECTRODE OR SEPARATOR

(75) Inventor: Taichi Uemura, Chiba (JP)

(73) Assignee: KYORITSU CHEMICAL & CO., LTD., Tokyo (JP)

( * ) Notice: Subject to any disclaimer, the term of this patent is extended or adjusted under 35 U.S.C. 154(b) by 698 days.

(21) Appl. No.: 13/994,655

(22) PCT Filed: Dec. 12, 2011

(86) PCT No.: PCT/JP2011/078676
§ 371 (c)(1),
(2), (4) Date: Jun. 14, 2013

(87) PCT Pub. No.: WO2012/081543
PCT Pub. Date: Jun. 21, 2012

(65) Prior Publication Data
US 2013/0260207 A1    Oct. 3, 2013

(30) Foreign Application Priority Data

Dec. 14, 2010    (JP) .................. 2010-277606

(51) Int. Cl.
| | | |
|---|---|---|
| *H01M 2/16* | (2006.01) | |
| *H01M 4/62* | (2006.01) | |
| *H01M 10/0525* | (2010.01) | |
| *H01M 10/42* | (2006.01) | |
| *H01M 4/60* | (2006.01) | |

(52) U.S. Cl.
CPC ............. *H01M 4/62* (2013.01); *H01M 2/16* (2013.01); *H01M 2/168* (2013.01); *H01M 4/604* (2013.01); *H01M 10/0525* (2013.01); *H01M 10/4235* (2013.01); *Y02E 60/122* (2013.01); *Y02T 10/7011* (2013.01)

(58) Field of Classification Search
CPC ........ H01M 2/16; H01M 2/168; H01M 4/604; H01M 4/62; H01M 10/0525; H01M 10/4235
USPC ................................. 429/144, 215
See application file for complete search history.

(56) References Cited

U.S. PATENT DOCUMENTS

| | | |
|---|---|---|
| 2004/0101752 A1 | 5/2004 | Oosawa et al. |
| 2009/0208842 A1 | 8/2009 | Harada et al. |
| 2010/0175354 A1 | 7/2010 | Mizukami et al. |
| 2011/0027642 A1 | 2/2011 | Lee et al. |

FOREIGN PATENT DOCUMENTS

| | | | |
|---|---|---|---|
| JP | 06-196199 A | | 7/1994 |
| JP | 07-320713 | * | 12/1995 |
| JP | 07-320713 A | | 12/1995 |
| JP | 09-237622 A | | 9/1997 |
| JP | 11-007935 A | | 1/1999 |
| JP | 2003-162991 A | | 6/2003 |
| JP | 2004-164896 A | | 6/2004 |
| JP | 2004-348975 A | | 12/2004 |
| JP | 2005-171230 A | | 6/2005 |
| JP | 2006-100051 A | | 4/2006 |
| JP | 2006-182925 A | | 7/2006 |
| JP | 2009-193864 A | | 8/2009 |
| JP | 2010-055755 A | | 3/2010 |
| WO | 2009/104423 A1 | | 8/2009 |
| WO | 2009/125984 A2 | | 10/2009 |

OTHER PUBLICATIONS

International Search Report issued in PCT/JP2011/078676 mailed on Jun. 18, 2013 (6 pages).
International Search Report issued in PCT/JP2011/078676 mailed on Mar. 19, 2012 (2 pages).
Patent Abstracts of Japan for Publication No. 2010-055755, Publication Date: Mar. 11, 2010 (1 Page).
Patent Abstracts of Japan for Publication No. 2004-348975, Publication Date: Dec. 9, 2004 (1 Page).
Patent Abstracts of Japan for Publication No. 09-237622, Publication Date: Sep. 9, 1997 (1 Page).
Patent Abstracts of Japan for Publication No. 06-196199, Publication Date: Jul. 15, 1994 (1 Page).
Patent Abstracts of Japan for Publication No. 2009-193864, Publication Date: Aug. 27, 2009 (1 Page).
Patent Abstracts of Japan for Publication No. 2006-182925, Publication Date: Jul. 13, 2006 (1 Page).
Patent Abstracts of Japan for Publication No. 2006-100051, Publication Date: Apr. 13, 2006 (1 Page).
Patent Abstracts of Japan for Publication No. 2005-171230, Publication Date: Jun. 30, 2005 (1 Page).
Patent Abstracts of Japan for Publication No. 2004-164896, Publication Date: Jun. 10, 2004 (1 Page).
Patent Abstracts of Japan for Publication No. 2003-162991, Publication Date: Jun. 6, 2003 (1 Page).
Patent Abstracts of Japan for Publication No. 11-007935, Publication Date: Jan. 12, 1999 (1 Page).
Patent Abstracts of Japan for Publication No. 07-320713, Publication Date: Dec. 8, 1995 (1 Page).

* cited by examiner

*Primary Examiner* — Edward Cain
(74) *Attorney, Agent, or Firm* — Osha-Liang LLP

(57) ABSTRACT

A battery electrode or separator surface protective agent composition having fluidity and being capable of being solidified by hot melt, and comprising at least two types of organic particles comprising organic materials, wherein the organic particles of types different from each other are substantially incompatible with each other, wherein when the composition is solidified by hot melt, the organic particles of the same type thermally fuse with one another to form a continuous phase.

20 Claims, 3 Drawing Sheets

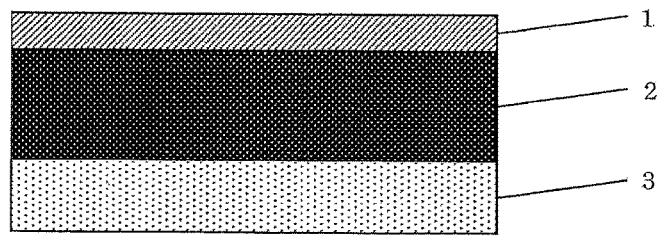
FIG. 1
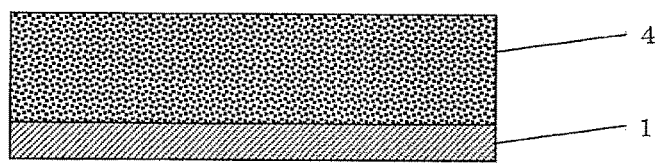
FIG. 2
FIG. 3a) before heat fusion    FIG. 3b) after heat fusion
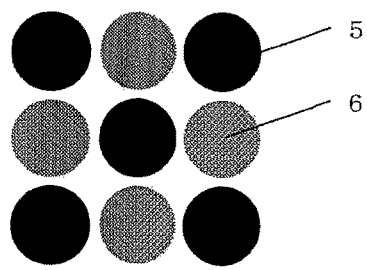
FIG. 4a) Before heating    FIG. 4b) After heating
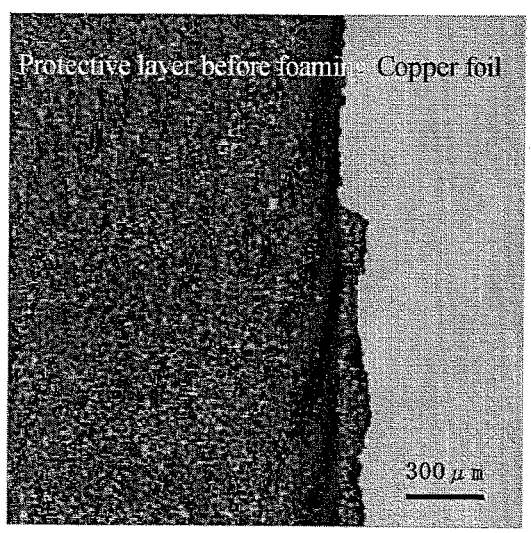
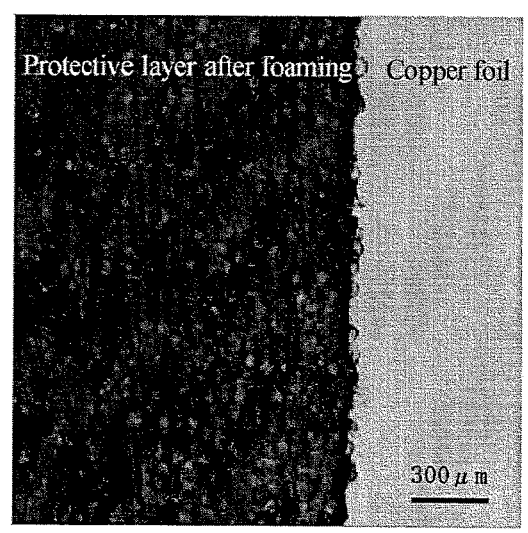

FIG. 5a) Hollow frame and thin film
FIG. 5b) Electrode to which the thin film has been transferred
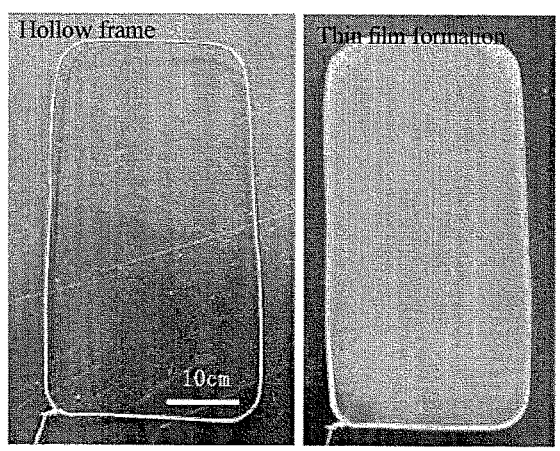
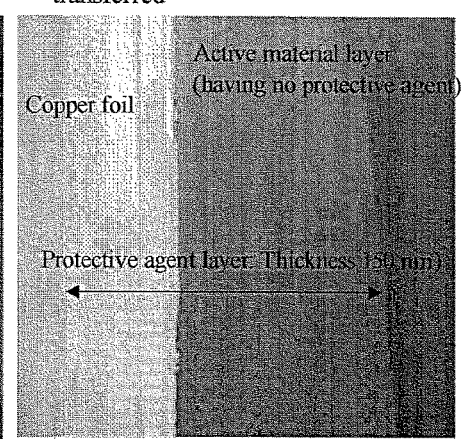

BATTERY ELECTRODE OR SEPARATOR SURFACE PROTECTIVE AGENT COMPOSITION, BATTERY ELECTRODE OR SEPARATOR PROTECTED BY THE COMPOSITION, AND BATTERY HAVING THE BATTERY ELECTRODE OR SEPARATOR

CROSS-REFERENCE TO RELATED APPLICATIONS

This application is a National Stage Application of PCT/JP2011/078676, filed on Dec. 12, 2011, which claims priority pursuant to 35 U.S.C. 199(a) to Japanese Patent Application No. 2010-277606, filed on Dec. 14, 2010. The contents of both PCT/JP2011/078676 and Japanese Patent Application No. 2010-277606 are hereby incorporated by reference in their entirety.

BACKGROUND

Field of the Invention

One or more embodiments of the present invention relates to a battery electrode or separator surface protective agent composition, a method for protecting a battery electrode or separator surface using the composition, a battery electrode or separator coated with the composition, and a battery comprising the battery electrode or separator. The battery comprising the battery electrode or separator is advantageous not only in that it has high heat resistance, low internal resistance, and excellent charge/discharge cycle characteristics as well as large charge/discharge capacity, but also in that even when the battery is charged and discharged in many cycles repeatedly for a long term, the deterioration of the active material layer is small, achieving an increased life of the battery.

Background Art

Some of lithium-ion primary battery and secondary battery which are lightweight and which have a high voltage and a large capacity, calcium-ion primary battery and secondary battery, magnesium-ion primary battery and secondary battery, sodium-ion primary battery and secondary battery, and an electrical double layer capacitor having excellent charge and discharge rate characteristics have been put into practical use as a power source for mobile electric devices, such as a cell phone and a laptop computer, and power tools, such as an electric tool and a vehicle. However, a conventional battery has problems in that the safety is poor due to low heat resistance or crush resistance, and in that conductive foreign matter mixed into the battery in the stage of production penetrates the separator to cause short-circuiting. In addition, the conventional battery has a high internal resistance, practically unsatisfactory high-rate charge/discharge characteristics, and unsatisfactory charge/discharge capacity, and, when the battery is used for a long term, the active material layer markedly deteriorates.

One of the reasons why satisfactory safety of the battery cannot be provided as mentioned above resides in that with respect to the heat generation by the occurrence of short-circuiting due to the breakdown of the insulation by the separator caused by, e.g., mixing of conductive foreign matter, the generation of dendrite, or breakage of the battery, the method for preventing the runaway heat generation from rapidly proceeding in the battery is inappropriate.

As a method for solving the above problem, a method has been proposed in which a coating layer having high heat resistance, which has insulation with respect to the electronic conductivity but has ionic conductivity, is formed on a battery electrode and/or separator surface so that, even when runaway heat generation causes the separator to thermally degrade, the coating layer prevents the positive and negative electrodes from touching to cause short-circuiting (patent document 1). The above coating layer acts as a layer which suppresses the generation of dendrite or retains the electrolytic solution, and the coating layer serves as an ion supply source to reduce the internal resistance, contributing to the improvement of the high-rate discharge characteristics. Further, the coating layer makes the electrode surface uniform, and therefore local acceleration of the deterioration of the active material layer caused by the concentration of an electrode reaction due to the uneven surface of the electrode can be suppressed, and thus an effect of preventing the deterioration of the active material layer caused when the battery is used for a long term can be obtained. However, in this method, the coating layer has poor adhesion to the electrode surface and further has low ionic conductivity, and therefore, when the method is applied to a battery for use as power supply for vehicle and others, the resultant battery has high internal resistance so that it cannot achieve high-rate charge/discharge cycle characteristics, and particularly, the high internal resistance causes charge and discharge loss, making it difficult to achieve satisfactory running distance. Furthermore, the batter has no satisfactory effect of relaxation of expansion and shrinkage stress of a material constituting the battery, such as an active material, caused due to charging and discharging, leading to a problem in that the adhesion force, mechanical strength and others are lowered.

Further, there is a coating layer of a composite type in the form of an emulsion of, e.g., an elastomer having high ionic conductivity, and this coating layer has both high ionic conductivity derived from an elastomer constituting the island portion and a mechanical strength derived from a polymer constituting the sea portion, and therefore exhibits excellent ionic conductivity and excellent mechanical strength as well as excellent stress relaxation effect (patent document 2). However, in this method, the coating layer has low ionic conductivity, and therefore, when the method is applied to a battery for use as power supply for vehicle and others, the resultant battery has high internal resistance so that it cannot achieve high-rate charge/discharge cycle characteristics, and particularly, the high internal resistance causes charge and discharge loss, making it difficult to achieve satisfactory running distance.

Furthermore, there is a coating layer of a type having incorporated inorganic particles, such as a ceramic, and this coating layer conducts ions through a polar group present on the ceramic surface, and hence exhibits excellent ionic conductivity and excellent mechanical strength by virtue of a reinforcing effect of the ceramic (patent document 3). However, there is a problem in that a binder having poor ionic conductivity covers the individual particles to clog voids between the particles, causing the ionic conductivity to be poor.

Moreover, a method has been proposed in which the active material and conductive agent are bonded using a binder in a particulate form, and the binder covers the active material and conductive agent to prevent the lowering of the ionic conductivity. However, this method has a problem in that much of the binder does not constitute a continuous layer and further many voids are formed between the active material and conductive agent, lowering the mechanical strength (patent document 4).

PRIOR ART REFERENCES

Patent Documents

Patent document 1: Japanese Unexamined Patent Publication No. Hei 6-196199
Patent document 2: Japanese Unexamined Patent Publication No. 2010-55755
Patent document 3: Japanese Unexamined Patent Publication No. Hei 9-237622
Patent document 4: Japanese Unexamined Patent Publication No. 2004-348975

SUMMARY

An object of one or more embodiments of the present invention is to solve problems accompanying the prior art in that the conventional protective agent for a battery electrode or separator surface, which is used for protecting the electrode or separator surface to improve the safety of the battery, or which is used as a layer to be impregnated with an electrolytic solution and serves as an ion source to improve the battery characteristics, does not have practically satisfactory ionic conductivity and cannot achieve high-rate charge/discharge cycle characteristics, and causes large charge and discharge loss due to the high internal resistance.

The present inventor has made studies with a view toward solving the problems accompanying the prior art. As a result, it has been found that the cause of poor ionic conductivity of the protective agent for a battery electrode or separator surface is that the island structure responsible for the ionic conductivity does not form a continuous phase, so that ions cannot continuously move in the protective agent.

One or more embodiments of the present invention is directed to a battery electrode or separator surface protective agent composition having fluidity and being capable of being solidified by hot melt, and comprising at least two types of organic particles comprising organic materials, wherein the organic particles of types different from each other are substantially incompatible with each other, wherein when the composition is solidified by hot melt, the organic particles of the same type thermally fuse with one another to form a continuous phase.

One or more embodiments of the present invention is the battery electrode or separator surface protective agent composition, wherein at least one type of the thermally fusible organic particles undergo crosslinking upon heat fusion.

One or more embodiments of the present invention is the battery electrode or separator surface protective agent composition, wherein the crosslinking upon heat fusion occurs at a temperature below the heat fusion temperature of the organic particles of the other type(s).

One or more embodiments of the present invention is the battery electrode or separator surface protective agent composition, wherein, in the at least two types of organic particles comprising organic materials and being substantially incompatible with each other, one type of the organic particles contain in an amount of 5 wt % or more an organic material having a hydrogen bonding functional group value of 0.001 to 0.023 mol/g, and the other at least one type of the organic particles contain in an amount of 5 wt % or more an organic material having a hydrogen bonding functional group value which is ½ or less of that of the above organic particles.

One or more embodiments of the present invention is the battery electrode or separator surface protective agent composition, wherein at least one type of the organic particles have a cyano group and/or a polyethylene glycol structure.

One or more embodiments of the present invention is the battery electrode or separator surface protective agent composition, which further comprises thermally infusible particles or fillers, wherein the thermally fusible particles fuse together between the thermally infusible particles or fillers to achieve bonding at points, forming a porous structure.

One or more embodiments of the present invention is the battery electrode or separator surface protective agent composition, which further comprises inorganic particles having an active hydrogen group and having a pH for isoelectric point in the range of from 4 to 13.

One or more embodiments of the present invention is the battery electrode or separator surface protective agent composition, wherein at least one type of the organic particles are covered with an inorganic material, wherein the organic particles covered with an inorganic material break at least part of the inorganic material covering layer by heating, so that the organic particles fuse with one another.

One or more embodiments of the present invention is the battery electrode or separator surface protective agent composition, which further comprises a core-shell type foaming agent.

One or more embodiments of the present invention is the battery electrode or separator surface protective agent composition, which further comprises a liquid binder in an amount of 50 wt % or less, based on the weight of the at least two types of organic particles comprising organic materials and being substantially incompatible with each other.

One or more embodiments of the present invention is the battery electrode or separator surface protective agent composition, wherein the binder is an energy radiation curable resin.

One or more embodiments of the present invention is directed to a method for protecting a battery electrode or separator surface, which comprises forming a layer of the above-mentioned battery electrode or separator surface protective agent composition on a battery electrode or separator surface, and solidifying the resultant composition layer by hot melt, whereupon the organic particles of the same type thermally fuse with one another to form a continuous phase.

One or more embodiments of the present invention is the method for protecting a battery electrode or separator surface, wherein the composition layer is solidified in a state in which at least one type of the organic particles are oriented in a magnetic field and/or an electric field.

One or more embodiments of the present invention is the method for protecting a battery electrode or separator surface, wherein the layer of the battery electrode or separator surface protective agent composition is formed from a film prepared using a hollow frame.

One or more embodiments of the present invention is a battery electrode or separator which is protected by the above-mentioned battery electrode or separator surface protective agent composition, or which is produced by using the above-mentioned method for protecting a battery electrode or separator surface.

One or more embodiments of the present invention is a battery having the above-mentioned battery electrode or separator.

By coating a battery electrode and/or separator with the battery electrode or separator surface protective agent composition of one or more embodiments of the present invention, the following effect can be obtained. The occurrence of short-circuiting between the positive and negative electrodes due to crush of the battery caused by an accident, mixing of conductive foreign matter, or fusion of the separator caused by, e.g., runaway heat generation is prevented, and a stress of expansion and shrinkage of the active material caused due to charging and discharging is relaxed. Further, the coating layer serves as a layer retaining an electrolytic solution on the electrode or separator surface or a desolvating layer for ions contained in the electrolytic solution to reduce the resistance to ionic conductivity, so that even when the battery is charged and discharged in many cycles repeatedly for a long term, or the charged battery is allowed to stand at a high temperature, the deterioration of the battery characteristics can be prevented.

In one or more embodiments of the present invention, the protective layer serves as a layer retaining an electrolytic solution or electrolyte ions or a desolvating layer for ions contained in the electrolytic solution and hence reduces the resistance to ionic conductivity, enabling high-rate charge/discharge.

In one or more embodiments of the present invention, the material for the protective layer having high ionic conductivity and/or high flexibility and the material for the protective layer having high mechanical strength and high heat resistance together form a continuous phase, and therefore a battery having excellent ability to relax a stress and low internal resistance as well as high heat resistance can be provided.

In one or more embodiments of the present invention, by imparting ionic conductivity to the protective layer per se or impregnating the inside of the porous protective layer with an electrolytic solution, the protective layer can be an ionic conductive film, and can be used as a solid electrolyte membrane or a gel electrolyte membrane.

In one or more embodiments of the present invention, by incorporating additional thermally infusible particles or fillers, so that the thermally fusible particles fuse together between the thermally infusible particles or fillers to achieve bonding at points, forming a porous structure, the surface protective agent composition having excellent electrolytic solution impregnation properties can be provided.

In one or more embodiments of the present invention, by having inorganic particles having an active hydrogen group and having a pH for isoelectric point in the range of from 4 to 13, the ionic conductivity and mechanical strength as well as heat resistance can be improved.

In one or more embodiments of the present invention, by incorporating a core-shell type foaming agent, when the battery suffers runaway heat generation, the core-shell type foaming agent is expanded and increases the space between the positive electrode and the negative electrode to form a barrier layer, thus achieving safety.

In one or more embodiments of the present invention, the battery electrode and/or separator or separator surface is protected by a film prepared using a hollow frame, and therefore a very thin and uniform protective layer having no pinhole can be formed, and thus, in the electrode or separator surface having a protective layer produced by this method, the amount of the electrolytic solution retained can be kept constant, so that not only can the safety be achieved, but also the battery performance and battery life can be further improved.

BRIEF DESCRIPTION OF THE DRAWINGS

FIG. 1 is a cross-sectional view of a battery electrode coated with the battery electrode or separator surface protective agent composition.

FIG. 2 is a cross-sectional view of a separator coated with the battery electrode or separator surface protective agent composition.

FIGS. 3A-3B show schematic views of a process in which the organic particles of the same type thermally fuse with one another to form a continuous phase, with respect to the at least two types of organic particles, a) before heat fusion and b) after heat fusion.

FIGS. 4A-4B show photographs of an electrode coated with the battery electrode or separator surface protective agent containing a core-shell type foaming agent covered with an inorganic material a) before heating, and b) after heating at 200° C. for one minute.

FIGS. 5A-5B show photographs of a thin film being formed using a hollow frame, and an electrode having a protective agent layer formed by subjecting the formed thin film in a semidried state to adhere to the surface of the electrode and drying the film, wherein the left-hand view of a) shows a hollow frame, the right-hand view of a) shows the hollow frame and a thin film, and b) shows an electrode to which the thin film has been transferred.

DETAILED DESCRIPTION

Figure 6A:
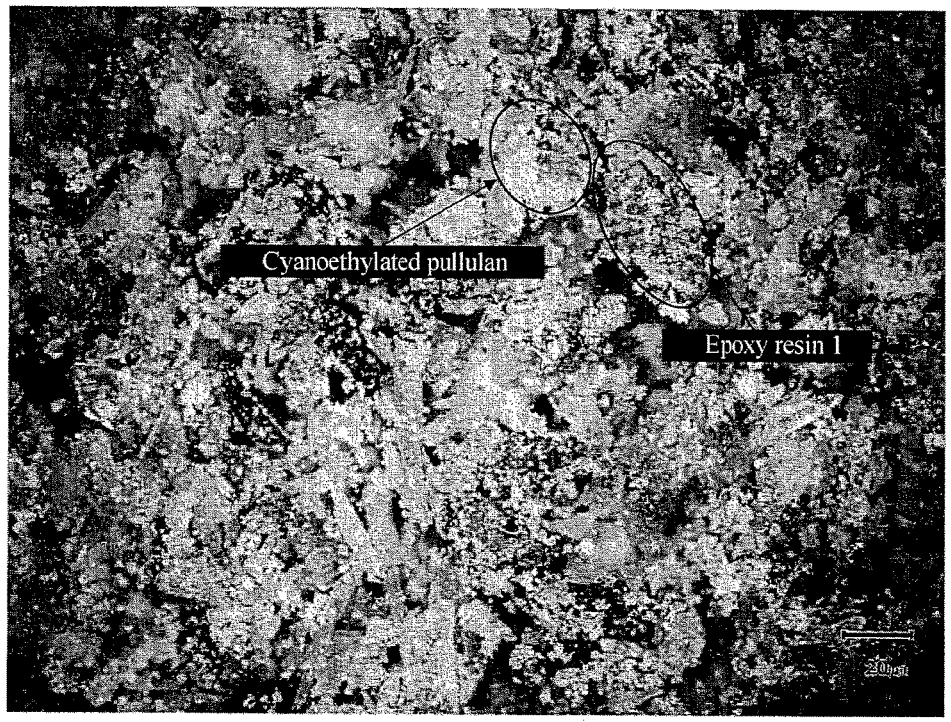
FIGS. 6A-6B show photographs of the two types of organic particles which cause substantial phase separation, which are actually subjected to fusion, wherein a) is a photograph before heating, and the dark portions indicate epoxy resin particles and bright portions indicate cyanoethylated pullulan particles, and b) is a photograph of the mixture of the organic particles obtained after fusion by heating at 130° C. for one minute. It is shown that the dark epoxy resin particles fuse with one another to form a continuous phase having no interface, and the whitish cyanoethylated pullulan particles fuse with one another to form a continuous phase having no interface, but the epoxy resin particles and the cyanoethylated pullulan particles are immiscible with each other and maintain the state of phase separation.
Figure 6B:
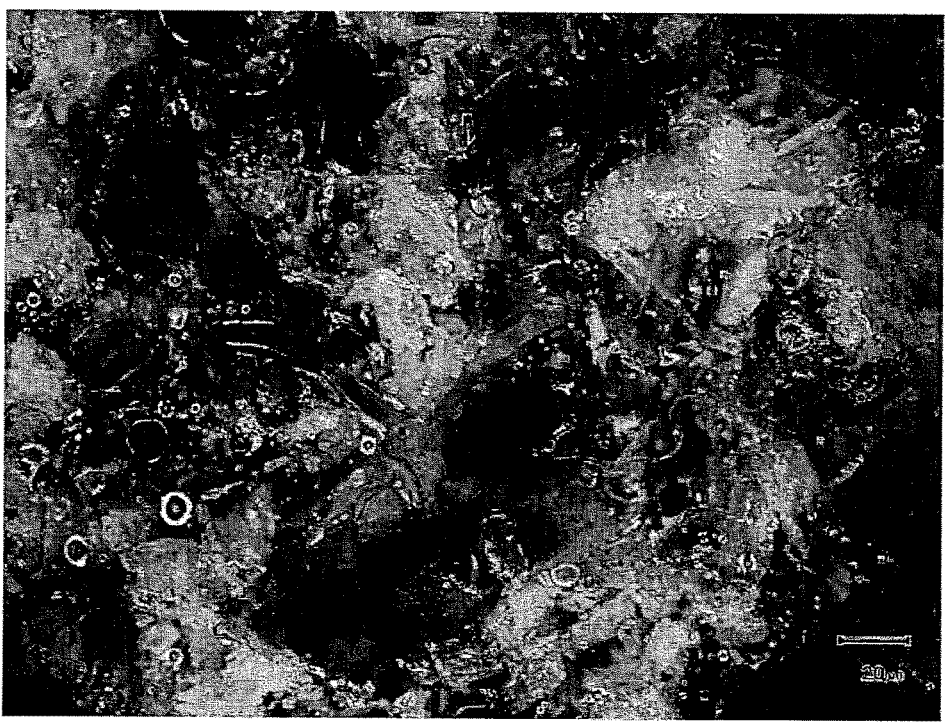

The battery electrode or separator surface protective agent composition of one or more embodiments of the present invention comprises (1) at least two types of organic particles comprising organic materials, wherein the organic particles of types different from each other are substantially incompatible with each other, (2) has fluidity, and (3) is capable of being solidified by hot melt, wherein (4) when the composition is solidified by hot melt, the organic particles of the same type thermally fuse with one another to form a continuous phase.

In the wording "(1) at least two types of organic particles comprising organic materials, wherein the organic particles of types different from each other are substantially incompatible with each other", the expression "substantially incompatible" means a combination of organic materials such that when two types of organic materials are solidified by hot melt in a state in which they are in contact with each other, the particles of types different from each other are immiscible and do not form a uniform phase, and indicates a combination such that the organic materials in an arbitrary ratio are not uniformly miscible and are incompatible with each other, and a combination such that the organic materials have high viscosity upon melting so that only the surfaces of the organic materials are miscible in the temperature range and time for use and can be solidified by cooling before the insides of the organic materials are uniformly miscible with each other. The phenomenon that two types of organic materials are substantially incompatible with each other can be determined by the method described later. In the at least two types of organic particles, one type of organic particles can be organic particles having excellent ionic conductivity, and the other type of organic particles can be organic particles having excellent mechanical strength and heat resistance.

The average particle diameter of the organic particles is preferably 100 to 0.001 µm, further preferably 50 to 0.002 µm, especially preferably 10 to 0.005 µm. With respect to the average particle diameter of the organic particles of types different from each other, there is no particular problem as long as the average particle diameter falls in the above-mentioned range, but the organic particles preferably have the same size from the viewpoint of facilitating the fusion of the particles.

With respect to two types of organic particles, for causing the organic particles of the same type to fuse with one another to form a continuous phase, the first organic particles:second organic particles weight ratio is preferably in the range of from 1:1,000 to 1,000:1, more preferably in the range of from 1:100 to 100:1, further preferably in the range of from 1:10 to 10:1.

The expression "(2) has fluidity" indicates a state in which the composition can become deformed to such an extent that the composition can be applied to a substrate using a known application apparatus, e.g., a bar coater, an applicator, a slit die coater, a gravure coater, a screen printing apparatus, a spray coater, or a powder coating apparatus. Even when the composition is in the form of a powder comprised only of organic particles, the powder containing gas therein can obtain fluidity. For obtaining fluidity, a solvent or a liquid binder may be added to the composition, or the composition in a molten state by heating may be used.

The wording "(3) is capable of being solidified by hot melt" means that (a) the particles are heated to melt at least the surface of the particles, and (b) then the particles fuse with one another, and (c) the particles in this state are solidified by cooling.

The wording "(4) when the composition is solidified by hot melt, the organic particles of the same type thermally fuse with one another to form a continuous phase" means that when the composition is solidified by hot melt, at least the surfaces of the organic particles of the same type fuse with one another and the particles are combined with one another, and they are solidified in this state by cooling, forming a state in which there is no interface between the fused particles of the same type due to the difference in formulation.

[Organic Particles]

In the battery electrode or separator surface protective agent composition of one or more embodiments of the present invention, with respect to the two types of organic particles comprising two types of organic materials being substantially incompatible with each other, by selecting as the organic materials a material having high ionic conductivity and/or high flexibility and a material having high mechanical strength or heat resistance in the method in which the organic particles of the same type thermally fuse with one another to form a continuous phase, there is an advantage in that a surface protective layer having both high ionic conductivity and high mechanical strength or heat resistance and further having a high effect of relaxing a stress of expansion and shrinkage of the active material or the like caused due to charging and discharging can be obtained. In a conventional composition in which one of or both of the organic materials are in a liquid state, for obtaining a state such that the organic materials of types different from each other cause phase separation and the organic materials of the same type together form a continuous phase, the types and mixing ratio of the organic materials which suffer phase separation are strictly limited. For example, when the amount of one of the organic materials is increased, an island-in-sea structure is disadvantageously formed, so that the island structure has no continuity. Further, the organic materials compatible with each other cannot maintain the state of phase separation, and therefore a phase separation structure cannot be obtained. In the method in one or more embodiments of the present invention, at least two types of organic particles are mixed together and the organic particles of the same type individually thermally fuse with one another to form a continuous phase, and therefore the limitation on the types and amounts of the organic materials used can be drastically reduced, and thus the range of the selection of the organic materials and the range of the mixing ratio for achieving excellent ionic conductivity, mechanical strength, and heat resistance and the ability to relax a stress can be increased. Further, the incorporation ratio of the organic material having high ionic conductivity and the organic material having high mechanical strength and heat resistance can be arbitrarily controlled. Furthermore, organic particles in an arbitrary shape can be used, and therefore the form of the phase separation structure can be controlled.

The battery electrode or separator surface protective agent composition one or more embodiments of the present invention comprises at least two types of organic particles wherein the particles comprising the same organic material thermally fuse with one another to form a continuous phase. For achieving heat fusion, it is necessary that at least part of the surface of the organic particles be melt by heat, and, in this state, in the at least two types of organic particles comprising organic materials and being substantially incompatible with each other, the particles comprising the same material fuse with one another to form a continuous phase, and then the particles are cooled and solidified in a continuous state. On the other hand, the particles comprising materials different from each other are not completely miscible even when they are in contact with one another in a molten state, and they are solidified in a state in which the particles cause substantial phase separation. A combination of organic materials such that the two types of organic materials are "substantially incompatible with each other", which determines whether phase separation occurs or not, can be selected, as described below in the Examples, by experimentally checking whether the particles (powder) of organic materials actually used mixed in an arbitrary ratio are uniformly dissolved in one another. In this case, a solubility parameter, such as a hydrogen bonding functional group value, can be used as an index of the compatibility.

As an example of a combination of the organic materials substantially incompatible with each other, there can be mentioned a combination of organic materials having polarities different from each other, and a group of organic materials having high polarity and a group of organic materials having low polarity are incompatible with each other. Further, it is likely that a group of organic materials having medium polarity and a group of organic materials having high polarity, or a group of organic materials having medium polarity and a group of organic materials having low polarity are incompatible with each other. On the other hand, it is likely that groups of organic materials having high polarity are compatible with each other, that groups of organic materials having medium polarity are compatible with each other, and that groups of organic materials having low polarity are compatible with each other. Examples of groups of organic materials having high polarity include water-soluble polymers having a hydrogen bonding functional group value of 0.001 mol/g or more, such as PVA and derivatives thereof, cellulose and derivatives thereof, starch and derivatives thereof, and polyethylene glycol and derivatives thereof. Examples of groups of organic materials having medium polarity include water-insoluble compounds having an ether linkage, an ester linkage, or an unsaturated bond, such as an epoxy resin or an acrylic resin, or prepolymer of an urethane resin, polyester, polyvinyl acetate, a styrene-butadiene rubber, polyisoprene, a chloroprene rubber, an acrylic rubber, a nitrile rubber, an urethane rubber, an ethylene-propylene rubber, an epichlorohydrin rubber, and a butadiene rubber. Examples of groups of organic materials having low polarity include polymers having a hydrogen bonding functional group value of 0.0005 mol/g or less, e.g., water-insoluble compounds having no polar functional group and having a long-chain alkyl group, a perfluoro group, or a silicone structure, such as polytetrafluoroethylene, a fluororubber, silicone, and a perfluoroalkoxy resin. As examples of groups of organic materials having medium polarity, there can be mentioned organic materials having a hydrogen bonding functional group value between those of the groups having high polarity and the groups having low polarity.

As the organic particles capable of thermally fusing upon hot melt heating, particles of any organic materials having, e.g., a melting temperature or a softening temperature, for example, organic particles of a polymer or crystals of an organic material can be used.

Examples of organic particles of a polymer include particles of polymers, such as polyethylene, polypropylene, polystyrene, polycarbonate, polyacetal, polyphenylene sulfide, a liquid crystalline polymer, polyvinyl chloride, celluloid, polyvinyl alcohol, polyester, polyvinyl acetate, polyethylene oxide, polyvinylidene fluoride, polytetrafluoroethylene, a styrene-butadiene rubber, polyisoprene, a chloroprene rubber, an acrylic rubber, a nitrile rubber, an urethane rubber, an ethylene-propylene rubber, an epichlorohydrin rubber, a butadiene rubber, a fluororubber, an ethylene-vinyl alcohol copolymer, an epoxy resin, an oxetane resin, an urethane resin, an acrylic resin, polysaccharides, polyimide, polyamideimide, silicone, and copolymers, prepolymers, alloys, or derivatives thereof. Of these, from the viewpoint of ionic conductivity, preferred are particles of polymer derivatives having a cyano group, such as cyanoethylated vinyl alcohol, cyanoethylated carboxymethyl cellulose, cyanoethylated pullulan, cyanoethylated cellulose, cyanoethylated starch, cyanoethylated esterified starch, cyanoethylated dextrin, cyanoethylated collagen, and a nitrile rubber; polymer derivatives having a polyethylene glycol structure, such as a polyethylene glycol-acrylic acid amide-styrene copolymer, a polyethylene glycol-polylactate copolymer, and polyvinyl alcohol having a pendant of polyethylene glycol chain; and particles of polymers having a β-diketone structure, such as a polyacrylic ester copolymer having a β-diketone structure, which can be prepared by subjecting a vinyl compound having a β-diketone structure, such as allyl acetoacetate, and an acrylate to radical polymerization, and polyvinyl alcohol copolymerized with vinyl acetate, because these polymer particles are likely to interact with ions. It is preferred that at least one type of the organic particles have a cyano group and/or a polyethylene glycol structure, which is highly effective in improving the ionic conductivity. These polymers can be controlled in molecular weight or crosslinking density so that they have a melting temperature or softening temperature in the range of from −40 to 300° C., and further those having the melting temperature controlled by adding thereto a high boiling point solvent having a boiling point of 80° C. or more, such as ethylene glycol, glycerol, diethylene glycol, N-methylpyrrolidone, dimethyl sulfoxide, or isophorone, can be used.

The above-mentioned particles can be used in the form of a dry powder or an aqueous emulsion as protective colloidal particles obtained using a surfactant or a water-soluble polymer.

The organic particles capable of thermally fusing upon heating can be crystals of an organic material, and examples of organic material crystals include hydrazides, such as adipic dihydrazide (melting temperature: 177 to 180° C.), 1,3-bis(hydrazinecarbonoethyl)-5-isopropylhydantoin (melting temperature: 120° C.), and 7,11-octadecadiene-1,18-dicarbohydrazide (melting temperature: 160° C.); acid anhydride crystals, such as maleic anhydride (melting temperature: 53° C.), phthalic anhydride (melting temperature: 131° C.), and pyromellitic anhydride (melting temperature: 286° C.); amine crystals, such as urea (melting temperature: 132° C.) and dicyandiamide (melting temperature: 208° C.); imidazole crystals, such as imidazole (melting temperature: 89 to 91° C.), 2-methylimidazole (melting temperature: 140 to 148° C.), and phenylimidazole (melting temperature: 174 to 184° C.); and triazine crystals, such as 2,4-diamino-6-vinyl-S-triazine (melting temperature: 240° C.) and 2,4-diamino-6-methacryloyloxyethyl-S-triazine (melting temperature: 170° C.). Two types or more of the above-mentioned organic materials can be mixed and used in the form of a solid solution for the purpose of controlling the melting temperature or softening temperature.

[Organic Particles Crosslinkable Upon Heat Fusion]

In the battery electrode or separator surface protective agent composition of one or more embodiments of the present invention, as the organic particles, organic particles crosslinkable upon heat fusion, such as particles of various types of known latent curable solid resins, can be used. For example, there can be used a material having a latent thermal initiator incorporated into a solid prepolymer comprising a solid epoxy resin, such as EPICLON 1050, manufactured by DIC Corporation (bisphenol A epoxy resin having a softening temperature of 64 to 74° C.), EPICLON N-660, manufactured by DIC Corporation (cresol novolak epoxy resin having a softening temperature of 62 to 70° C.), EPICLON N-770, manufactured by DIC Corporation (phenolic novolak epoxy resin having a softening temperature of 65 to 75° C.), HP-7200HH, manufactured by DIC Corporation (dicyclopentadiene epoxy resin having a softening temperature of 88 to 98° C.), EPICLON HP-4700, manufactured by DIC Corporation (naphthalene epoxy resin having a softening temperature of 85 to 95° C.), EX-721, manufactured by Nagase ChemteX Corporation (monofunctional solid epoxyphthalimide skeleton having a melting temperature of 94 to 96° C.), or EX-171, manufactured by Nagase ChemteX Corporation (lauryl alcohol (EO) 15 glycidyl ether having a melting temperature of 40° C.), or a mixture of the above solid epoxy resin and an oxirane compound, such as 3-ethyl-3-hydroxymethyloxetane, 3-(meth)allyloxymethyl-3-ethyloxetane, (3-ethyl-3-oxetanylmethoxy)methylbenzene, 4-fluoro-[1-(3-ethyl-3-oxetanylmethoxy)methyl]benzene, 4-methoxy-[1-(3-ethyl-3-oxetanylmethoxy)methyl]benzene, [1-(3-ethyl-3-oxetanylmethoxy)ethyl]phenyl ether, isobutoxymethyl (3-ethyl-3-oxetanylmethyl)ether, isobornyloxyethyl (3-ethyl-3-oxetanylmethyl)ether, isobornyl (3-ethyl-3-oxetanylmethyl)ether, 2-ethylhexyl (3-ethyl-3-oxetanylmethyl)ether, ethyldiethylene glycol (3-ethyl-3-oxetanylmethyl)ether, dicyclopentadiene (3-ethyl-3-oxetanylmethyl)ether, dicyclopentenyloxyethyl (3-ethyl-3-oxetanylmethyl)ether, dicyclopentenyl (3-ethyl-3-oxetanylmethyl)ether, tetrahydrofurfuryl (3-ethyl-3-oxetanylmethyl)ether, tetrabromophenyl (3-ethyl-3-oxetanylmethyl)ether, 2-tetrabromophenoxyethyl (3-ethyl-3-oxetanylmethyl)ether, tribromophenyl (3-ethyl-3-oxetanylmethyl)ether, 2-tribromophenoxyethyl (3-ethyl-3-oxetanylmethyl)ether, 2-hydroxyethyl (3-ethyl-3-oxetanylmethyl)ether, 2-hydroxypropyl (3-ethyl-3-oxetanylmethyl)ether, butoxyethyl (3-ethyl-3-oxetanylmethyl)ether, pentachlorophenyl (3-ethyl-3-oxetanylmethyl)ether, pentabromophenyl (3-ethyl-3-oxetanylmethyl)ether, bornyl (3-ethyl-3-oxetanylmethyl) ether, 3,7-bis(3-oxetanyl)-5-oxa-nonane, 3,3'-(1,3-(2-methylenyl)propanediylbis(oxymethylene))bis-(3-ethyloxetane), 1,4-bis[(3-ethyl-3-oxetanylmethoxy)methyl] benzene, 1,2-bis[(3-ethyl-3-oxetanylmethoxy)methyl] ethane, 1,3-bis[(3-ethyl-3-oxetanylmethoxy)methyl] propane, ethylene glycol bis(3-ethyl-3-oxetanylmethyl) ether, dicyclopentenyl bis(3-ethyl-3-oxetanylmethyl)ether, triethylene glycol bis(3-ethyl-3-oxetanylmethyl)ether, tetraethylene glycol bis(3-ethyl-3-oxetanylmethyl)ether, tricyclodecanediyldimethylene (3-ethyl-3-oxetanylmethyl)ether, trimethylolpropane tris(3-ethyl-3-oxetanylmethyl)ether, 1,4-bis(3-ethyl-3-oxetanylmethoxy)butane, 1,6-bis(3-ethyl-3-oxetanylmethoxy)hexane, pentaerythritol tris(3-ethyl-3-oxetanylmethyl)ether, pentaerythritol tetrakis(3-ethyl-3-oxetanylmethyl)ether, polyethylene glycol bis(3-ethyl-3-oxetanylmethyl)ether, dipentaerythritol hexakis(3-ethyl-3-oxetanylmethyl)ether, dipentaerythritol pentakis(3-ethyl-3-oxetanylmethyl)ether, dipentaerythritol tetrakis(3-ethyl-3-oxetanylmethyl)ether, caprolactone-modified dipentaerythritol hexakis(3-ethyl-3-oxetanylmethyl)ether, caprolactone-modified dipentaerythritol pentakis(3-ethyl-3-oxetanylmethyl)ether, ditrimethylolpropane tetrakis(3-ethyl-3-oxetanylmethyl)ether, ethylene oxide (EO)-modified bisphenol A bis(3-ethyl-3-oxetanylmethyl)ether, propylene oxide (PO)-modified bisphenol A bis(3-ethyl-3-oxetanylmethyl)ether, EO-modified hydrogenated bisphenol A bis(3-ethyl-3-oxetanylmethyl)ether, PO-modified hydrogenated bisphenol A bis(3-ethyl-3-oxetanylmethyl)ether, EO-modified bisphenol F (3-ethyl-3-oxetanylmethyl)ether, or an oxetane, e.g., oxetanylsilsesquioxane.

As a latent thermal initiator for an epoxy resin or an oxirane compound, there can be used a catalyst for cationic polymerization, e.g., an iodonium salt, such as diphenyliodonium hexafluorophosphate, diphenyliodonium hexafluoroantimonate, diphenyliodonium tetrafluoroborate, diphenyliodonium tetrakis(pentafluorophenyl)borate, bis (dodecylphenyl)iodonium hexafluorophosphate, bis(dodecylphenyl)iodonium hexafluoroantimonate, bis(dodecylphenyl)iodonium tetrafluoroborate, bis(dodecylphenyl) iodonium tetrakis(pentafluorophenyl)borate, 4-methylphenyl-4-(1-methylethyl)phenyliodonium hexafluorophosphate, 4-methylphenyl-4-(1-methylethyl) phenyliodonium hexafluoroantimonate, 4-methylphenyl-4-(1-methylethyl)phenyliodonium tetrafluoroborate, 4-methylphenyl-4-(1-methylethyl)phenyliodonium tetrakis (pentafluorophenyl)borate, 4-methoxydiphenyliodonium hexafluorophosphate, bis(4-methylphenyl)iodonium hexafluorophosphate, bis(4-tertiary-butylphenyl)iodonium hexafluorophosphate, bis(dodecylphenyl)iodonium, tolylcumyliodonium hexafluorophosphate, or iodonium; a sulfonium salt, such as triallylsulfonium hexafluoroantimonate; a phosphonium salt, such as a triphenylpyrenylmethylphosphonium salt; ($\eta$6-benzene)($\eta$5-cyclopentadienyl)iron(II) hexafluoroantimonate; a combination of o-nitrobenzyl silyl ether and aluminum acetylacetonate; or a combination of silsesquioxane and aluminum acetylacetonate, and particles prepared by incorporating the catalyst into the above-mentioned prepolymer and then pulverizing the resultant mixture can be used as organic particles crosslinkable upon heat fusion.

Further, the above prepolymer particles and curing agent particles, such as a carboxylic acid, a carboxylic anhydride, an amine, or a hydrazide, are mixed together, and the resultant mixture and the prepolymer are allowed to thermally fuse with each other, causing a crosslinking reaction. The thus prepared organic particles are subjected to crosslinking reaction simultaneously with heat fusion to obtain a structure in which the organic particles together form a continuous phase and are crosslinked. A mixture of an initiator or a curing agent and the prepolymer may be formed into particles, or particles of the prepolymer and initiator or curing agent particles may be mixed with each other.

As other combinations for the organic particles crosslinkable upon heat fusion, a system comprising a solid acrylic acid ester or methacrylic acid ester and a curing agent or an initiator can be used. As an example of thermosetting organic particles, there can be mentioned a mixture of a methacrylate and a thermal initiator (EBECRYL 767, manufactured by Daicel-Cytec Company Ltd.:PERHEXA HC, manufactured by NOF Corporation=100:5 mixture), and, as an example of photo-setting organic particles, there can be mentioned a mixture of a methacrylate and a photoinitiator (EBECRYL 740-40TP, manufactured by Daicel-Cytec Company Ltd.: 1-hydroxycyclohexyl phenyl ketone=100:5).

When utilizing photosetting in crosslinking, the organic particles can be allowed to undergo crosslinking by irradiating the particles with a light simultaneously with or after the heat fusion of the particles.

Another combination of a prepolymer having an active hydrogen group and a crosslinking agent, such as a carboxylic acid, a carboxylic anhydride, or a metal chelate, can be used. For example, there can be mentioned a mixture of polyvinyl alcohol and pyromellitic acid, and a mixture of polyvinyl alcohol and a metal chelate. The above mixture, or a material which is obtained by mixing a prepolymer and a curing agent and an initiator in a good solvent therefor for preventing a reaction due to heat caused upon mixing, and casting the mixture into a thin film and removing the solvent by drying at room temperature, is pulverized while cooling to prepare latent crosslinkable organic particles.

The thus prepared organic particles undergo crosslinking due to, e.g., heating or irradiation with energy radiation upon fusion and/or after fusion to form a protecting material having excellent mechanical strength and high heat resistance. The formed protecting material has a high crosslinking density and hence is reduced in ionic conductivity, but, by using crosslinkable organic particles and non-crosslinkable organic particles in combination, they thermally fuse with one another to form a continuous phase, making it possible to produce a material having both high ionic conductivity and high mechanical strength and heat resistance.

In the battery electrode or separator surface protective agent composition of one or more embodiments of the present invention, it is desired that the crosslinking of one type of organic particles occurs before the other type of thermally fusible organic particles thermally fuse together. The crosslinked particles have no melting properties because the molecular chains of the particles are three-dimensionally bonded, and therefore the crosslinked particles do not fuse when the other type of organic particles thermally fuse together, and hence they do not together form a continuous phase. Even a combination of two types of organic particles which are inherently miscible with one another before crosslinking can be used in the formation of a phase separation structure.

Further, when a crosslinking reaction of the first organic particles is caused at the heat fusion temperature of the second organic particles or lower, an effect such that when the second organic particles are molten, a continuous phase comprised of the first organic particles is not mixed with a continuous phase comprised of the second organic particles can be obtained. In other words, at a point in time when the temperature of the first organic particles has reached a temperature at which the second organic particles fuse, the three-dimensional crosslinking of the first organic particles has proceeded to such an extent that the first organic particles are not molten, and, even when the second organic particles are molten, the continuous phase comprised of the second organic particles is not mixed with the continuous phase comprised of the first organic particles, making it possible to prevent the second organic particles and first organic particles from together forming a continuous phase. Thus, by advancing the crosslinking reaction of the first organic particles to such an extent that the first organic particles are not molten and mixed with the second organic particles so that there is a time-lag between the crosslinking of the first organic particles and the heat fusion of the second organic particles, a phase separation structure can be formed even using a combination of materials which are generally miscible with each other.

[Organic Particles Comprising an Organic Material Having a Hydrogen Bonding Functional Group Value of 0.001 to 0.023 Mol/g]

In the battery electrode or separator surface protective agent composition of one or more embodiments of the present invention, it is preferred that one type of the organic particles contain in an amount of 5 wt % or more an organic material having a hydrogen bonding functional group value in the range of from 0.001 to 0.023 mol/g, and the other type of the organic particles contain in an amount of 5 wt % or more an organic material having a hydrogen bonding functional group value which is ½ or less of that of the above organic particles. As another component, e.g., an organic material having a hydrogen bonding functional group value falling outside of the above-mentioned range or inorganic particles can be contained. When another component is an organic material, one type of the organic particles contain in an amount of 10 wt % or more an organic material having a hydrogen bonding functional group value in the range of from 0.001 to 0.023 mol/g and the other type of the organic particles contain in an amount of 10 wt % or more an organic material having a hydrogen bonding functional group value which is ½ or less of that of the above organic particles. It is especially preferred that one type of the organic particles contain in an amount of 50 wt % or more an organic material having a hydrogen bonding functional group value in the range of from 0.001 to 0.023 mol/g and the other type of the organic particles contain in an amount of 50 wt % or more an organic material having a hydrogen bonding functional group value which is ½ or less of that of the above organic particles. It is most preferred that one type of the organic particles comprise 100% by weight of an organic material having a hydrogen bonding functional group value in the range of from 0.001 to 0.023 mol/g and the other type of the organic particles comprise 100 wt % of an organic material having a hydrogen bonding functional group value which is ½ or less of that of the above organic particles.

The hydrogen bonding functional group value is calculated by the following formula (1).

[Formula 1]

$$\text{Hydrogen bonding functional group value (mol/g)} = \text{(Number of hydrogen bonding functional groups per molecule)}/\text{(Molecular weight)} \quad (1)$$

The continuous phase comprised of the former organic particles (which comprise an organic material having a hydrogen bonding functional group value in the range of from 0.001 to 0.023 mol/g) has low ionic conductivity due to the effect of hydrogen bonding or dipole interaction and, however, is unlikely to swell with an electrolytic solution and hence is unlikely to be reduced in mechanical strength, heat resistance, and adhesion force to an electrode or separator surface due to the expansion of the phase. On the other hand, the latter organic particles (which comprise an organic material having a hydrogen bonding functional group value which is ½ or less of that of the above organic particles) have a hydrogen bonding functional group value smaller than that of the former, and hence have small hydrogen bonding properties so that an electrolytic solution easily penetrates the particles, and therefore have high ionic conductivity. Further, these two types of organic particles have polarities different from each other, and therefore, when they thermally fuse, the particles of types different from each other are unlikely to be mixed with one another, making it possible to prevent the phase separation structure from being ruined.

As examples of organic materials having excellent mechanical strength, excellent heat resistance, and excellent adhesion force, there can be mentioned polymer compounds having active hydrogen, which can strongly bond between the molecules due to hydrogen bonding or dipole interaction. Specific examples include polymers having a hydroxyl group (—OH), a carboxyl group (—COOH), an amino group (—$NH_2$, —$NHR_1$), a hydrazide group ($R_1R_2NN(R_3)C(=O)R_4$), a hydroxyamino group (—NHOH), a sulfonic group (—$SO_3H$), a thiol group (—SH), or a silanol group (—$SiOHR_1R_2$) (wherein, in the above formulae, each of $R_1$, $R_2$, $R_3$, and $R_4$ represents a hydrogen atom, a $C_1$-$C_8$ alkyl group, a hydroxyl group, an acyl group, a carboxyl group, an amino group, a vinyl group, an allyl group, an aryl group, a halogen, or a metal), and specific examples of compounds include completely saponified polyvinyl alcohol (such as KURARAY POVAL PVA-124, manufactured by Kuraray Co., Ltd.; and JC-25, manufactured by Japan Vam & Poval Co., Ltd.), partially saponified polyvinyl alcohol (such as KURARAY POVAL PVA-235, manufactured by Kuraray Co., Ltd.; and JP-33, manufactured by Japan Vam & Poval Co., Ltd.), modified polyvinyl alcohol (such as KURARAY K POLYMER KL-118, KURARAY C POLYMER CM-318, KURARAY R POLYMER R-1130, KURARAY LM POLYMER LM-10HD, manufactured by Kuraray Co., Ltd.; D Polymer DF-20, Anionic modified PVA AF-17, manufactured by Japan Vam & Poval Co., Ltd.; and Cyanoresin CR-V, manufactured by Shin-Etsu Chemical Co., Ltd.), carboxymethyl cellulose (such as H-CMC, DN-100L, 1120, 2200, manufactured by Daicel Chemical Industries, Ltd.; and MAC200HC, manufactured by Nippon Paper Chemicals Co., Ltd.), hydroxyethyl cellulose (such as SP-400, manufactured by Daicel Chemical Industries, Ltd.), polyacrylamide (ACCOFLOC A-102, manufactured by MT AquaPolymer, Inc.), an epoxy resin (such as EX-614, manufactured by Nagase ChemteX Corporation; and EPIKOTE 5003-W55, manufactured by Japan Chemtech Ltd.), episulfide (such as YL7000, manufactured by Japan Epoxy Resins Co., Ltd.), polyethyleneimine (EPOMIN P-1000, manufactured by Nippon Shokubai Co., Ltd.), polyacrylate (such as ACCOFLOC C-502, manufactured by MT AquaPolymer, Inc.), saccharides and derivatives thereof (such as Chitosan 5, manufactured by Wako Pure Chemical Industries, Ltd.; Esterified Starch Amycol, manufactured by Nippon Starch Chemical Co., Ltd.; Cluster Dextrin, manufactured by Glico Nutrition Co., Ltd.; Cellulose powder KC FLOCK W-400G, manufactured by Nippon Paper Chemicals Co., Ltd.), and polystyrenesulfonic acid (such as Poly-NaSS PS-100, manufactured by Tosoh Organic Chemical Co., Ltd.). The organic particles comprising the above organic materials have high polarity, and hence the organic particles of types different from each other do not thermally fuse and together form a continuous phase, except the organic particles having high polarity equivalent to the high polarity of the other organic particles. In addition, the organic particles comprising the above organic materials have low ionic conductivity due to strong hydrogen bonding. Therefore, by selecting, as the second organic particles which are substantially incompatible with the first organic particles, organic particles having relatively low polarity and comprising an organic material having a hydrogen bonding functional group value which is ½ or less of that of the first organic particles, the first organic particles comprising an organic material having a hydrogen bonding functional group value of 0.001 to 0.023 mol/g and the second organic particles can form a phase separation structure. In this case, the second organic particles have low hydrogen bonding properties and therefore are poor in adhesion force, mechanical strength, and heat resistance, but the second organic particles have excellent ionic conductivity and hence can function as a layer responsible for ionic conductivity.

Hydrogen bonding functional group values of various organic materials are shown below.
Polyvinyl Alcohol
  Polyvinyl alcohol (average degree of polymerization: 500; saponification degree: 100%)=$2.3\times10^{-2}$ mol/g
  Polyvinyl alcohol (average degree of polymerization: 1,000; saponification degree: 100%)=$2.3\times10^{-2}$ mol/g
  Polyvinyl alcohol (average degree of polymerization: 500; saponification degree: 80%)=$1.6\times10^{-2}$ mol/g
  Polyvinyl alcohol (average degree of polymerization: 1,000; saponification degree: 80%)=$1.6\times10^{-2}$ mol/g
Cellulose
  Carboxymethyl cellulose=$2.0\times10^{-2}$ mol/g
Polycarboxylic Acid
  Pyromellitic acid=$1.6\times10^{-2}$ mol/g
  Mellitic acid=$1.8\times10^{-2}$ mol/g
  Malonic acid=$1.9\times10^{-2}$ mol/g
Amine
  Diethylenetriamine=$4.0\times10^{-2}$ mol/g
Hydrazide
  Adipic dihydrazide=$1.1\times10^{-2}$ mol/g
  7,11-Octadecadiene-1.18-dicarbohydrazide=$6.5\times10^{-3}$ mol/g The organic material having a hydrogen bonding functional group value of 0.001 to 0.023 mol/g can further contain a curing agent capable of reacting with a hydrogen bonding functional group. As the curing agent, an acid, such as a polycarboxylic acid or a polysulfonic acid, can be used, and specific examples of curing agents include citric acid, butanetetracarboxylic acid, 3,3',4,4'-biphenyltetracarboxylic acid, hexahydrophthalic acid, 1,3,3a,4,5,9b-hexahydro-5 (tetrahydro-2,5-dioxo-3-furanyl)naphtho[1,2-c]furan-1,3-dione (acid anhydride), glycerol bisanhydrotrimellitate monoacetate (acid anhydride), 3,3',4,4'-diphenyl sulfone tetracarboxylic acid, ethylene glycol bisanhydrotrimellitate (acid anhydride), 3,3',4,4'-diphenyl sulfone tetracarboxylic acid, ethylene glycol bisanhydrotrimellitate, methylbicyclo[2.2.1]heptane-2,3-dicarboxylic acid, bicyclo[2.2.1]heptane-2,3-dicarboxylic acid, aspartic acid, pyromellitic acid, mellitic acid, a phosphate group-containing tetracarboxylic acid, phenylethynylphthalic acid, and oxydiphthalic acid. Of these, an aromatic carboxylic acid is preferred from the viewpoint of the reactivity, and one which is substituted with 3 or more carboxylic acids per molecule is preferred from the viewpoint of the reactivity and crosslinking density. Further, anhydrides of the above-mentioned polycarboxylic acids can be used.

The battery electrode or separator surface protective agent of one or more embodiments of the present invention contains, relative to 100 parts by weight of the organic material having a hydrogen bonding functional group value of 0.001 to 0.023 mol/g, preferably 1 to 300 parts by weight, more preferably 10 to 200 parts by weight, especially preferably 20 to 100 parts by weight of a polycarboxylic acid or a polysulfonic acid.

A curing agent, such as a polycarboxylic acid or a polysulfonic acid, a known acid, a metal alkoxide, or a metal chelate can be used as a crosslinking agent, and examples of compounds capable of causing a hydrogen bonding functional group to undergo crosslinking include boric acid, copper sulfate, chromium trifluoride, titanium tetraisopropoxide, titanium tetra-normal-butoxide, titanium butoxide dimer, titanium tetra-2-ethylhexoxide, titanium diisopropoxybis(acetylacetonate), titanium tetraacetylacetonate, titanium dioctyloxybis(octyleneglycolate), titanium diisopropoxybis(ethylacetoacetate), titanium diisopropoxybis(triethanolaminate), titanium lactate, polyhydroxytitanium stearate, zirconium tetra-normal-propoxide, zirconium tetra-normal-butoxide, zirconium tetraacetylacetonate, zirconium tributoxymonoacetylacetonate, zirconium monobutoxyacetylacetonate bis(ethylacetoacetate), zirconium dibutoxybis(ethylacetoacetate), zirconium tetraacetylacetonate, and zirconium tributoxymonostearate. The battery electrode protective agent of one or more embodiments of the present invention contains, relative to 100 parts by weight of the organic material having a hydrogen bonding functional group value of 0.001 to 0.023 mol/g, preferably 0.01 to 100 parts by weight, more preferably 0.1 to 80 parts by weight, especially preferably 1 to 50 parts by weight of the above crosslinking agent.

As the thermally fusible particles, composite particles of a core-shell structure having at least the surface covered with a thermally fusible organic material can be used. Of these, in the thermally fusible particles having a fiber structure and being capable of maintaining the fiber structure after the heat fusion, fibers having a core which is not molten at the heat fusion temperature can be used, and heat fusion of the fibers can improve the protective film in mechanical strength.

[Thermally Infusible Particles]

The battery electrode or separator surface protective agent composition of one or more embodiments of the present invention can further contain thermally infusible particles or fillers. Specific examples of thermally infusible particles or fillers include particles, fibers, and flakes of an acrylic resin, an epoxy resin, or a polymer, such as polyimide, which is three-dimensionally crosslinked to form a polymer having no melting temperature, or cellulose. One type of the thermally infusible particles or fillers can be used, or two types or more of the thermally infusible particles or fillers can be used in combination.

The size of the thermally infusible particles or fillers is preferably in the range of from 0.001 to 100 μm, further preferably in the range of from 0.01 to 10 μm.

[Inorganic Particles Having an Active Hydrogen Group]

The battery electrode or separator surface protective agent composition of one or more embodiments of the present invention can further comprise inorganic particles or fillers having an active hydrogen group. Specific examples of inorganic particles or fillers having an active hydrogen group include powders of a metal oxide, such as alumina, silica, zirconia, beryllia, magnesium oxide, titania, or iron oxide; sols, such as colloidal silica, a titania sol, and an alumina sol; clay minerals, such as talc, kaolinite, and smectite; carbides, such as silicon carbide and titanium carbide; nitrides, such as silicon nitride, aluminum nitride, and titanium nitride; borides, such as boron nitride, titanium boride, and boron oxide; composite oxides, such as mullite; hydroxides, such as aluminum hydroxide, magnesium hydroxide, and iron hydroxide; and barium titanate, strontium carbonate, magnesium silicate, lithium silicate, sodium silicate, potassium silicate, and glass. One type of these inorganic particles or fillers can be used, or two or more types of the inorganic particles or fillers can be used in combination.

Preferred are inorganic particles which are dried at a temperature as high as about 200° C. for one hour in order to activate the active hydrogen group on the surface of the particles. Activating the active hydrogen group improves the adhesion of the inorganic particles to the organic particles, and thus improves the mechanical strength and heat resistance, so that ions in the electrolyte are stabilized, improving the ionic conductivity.

These inorganic particles may be used in the form of a powder, in the form of a water-dispersed colloid, such as a silica sol or an aluminum sol, or in the state of being dispersed in an organic solvent, such as an organosol. The inorganic particles may be contained in the thermally fusible organic particles, or used in the state of adhering to the surface of the thermally fusible organic particles, or added in an independent state from the thermally fusible organic particles.

The amount of the active hydrogen group on the surface of the inorganic particles is directly proportional to the specific surface area of the particles, and therefore the size of the inorganic particles is advantageously smaller, preferably in the range of from 0.001 to 1 μm, further preferably in the range of from 0.005 to 0.5 μm. Further, the inorganic particles in a porous form are preferably used for increasing the specific surface area, and, for example, silica gel, porous alumina, or various types of zeolite can be used. The size of the inorganic particles is preferably smaller than that of the organic particles constituting the continuous phase so as not to prevent the formation of continuous phase by heat fusion of the organic particles, more preferably ½ or less, further preferably 1/10 or less of the size of the organic particles.

When the battery used is, for example, a lithium-ion, sodium-ion, calcium-ion, or magnesium-ion battery, inorganic particles having an alkaline surface potential such that the movement of ions of lithium or sodium which is an alkali metal or ions of calcium or magnesium which is an alkaline earth metal are not inhibited are preferably used, and therefore inorganic particles having a high pH for isoelectric point are preferred. With respect to the pH for isoelectric point of the inorganic particles, for example, with respect to the isoelectric point, a value as measured by the method described in JIS R1638 "Method for measuring an isoelectric point of fine ceramic powder" can be used, and examples of the inorganic particles include silica (pH: about 1.8), kaolin (pH: about 5.1), mullite (pH: about 6.3; the pH for isoelectric point can be appropriately controlled by changing the ratio of silicon and aluminum), titania; anatase (pH: about 6.2), tin oxide (pH: about 6.9), boehmite (pH: about 7.7), γ-alumina (pH: about 7.9), α-alumina (pH: about 9.1), beryllia (pH: about 10.1), iron hydroxide $Fe(OH)_2$ (pH: about 12.0), manganese hydroxide (pH: about 12.0), and magnesium hydroxide (pH: about 12.4).

Even the inorganic particles having a low isoelectric point can be improved in ionic conductivity by, e.g., reacting an active hydrogen group on the surface of the particles with a silane coupling agent to control the pH for isoelectric point. Examples of such coupling agents include fluorine silane coupling agents, such as (tridecafluoro-1,1,2,2-tetrahydrooctyl)triethoxysilane; epoxy-modified silane coupling agents, such as a coupling agent manufactured by Shin-Etsu Chemical Co., Ltd. (trade name: KBM-403); oxetane-modified silane coupling agents, such as a coupling agent manufactured by Toagosei Co., Ltd. (trade name: TESOX); silane coupling agents, such as vinyltrimethoxysilane, vinyltriethoxysilane, γ-chloropropyltrimethoxysilane, γ-aminopropyltriethoxysilane, N-(β-aminoethyl)-γ-aminopropyltrimethoxysilane, N-(β-aminoethyl)-γ-aminopropylmethyldimethoxysilane, γ-glycidoxypropyltrimethoxysilane, β-glycidoxypropylmethyldimethoxysilane, γ-methacryloyloxypropyltrimethoxysilane, γ-methacryloyloxypropylmethyldimethoxysilane, γ-mercaptopropyltrimethoxysilane, and cyanohydrin silyl ether; and titanium coupling agents, such as triethanolamine titanate, titanium acetylacetonate, titanium ethylacetoacetate, titanium lactate, titanium lactate ammonium salt, tetrastearyl titanate, isopropyltricumylphenyl titanate, isopropyltri(N-aminoethyl-aminoethyl)titanate, dicumylphenyl oxyacetate titanate, isopropyltrioctanoyl titanate, isopropyldimethacrylisostearoyl titanate, titanium lactate ethyl ester, octylene glycol titanate, isopropyltriisostearoyl titanate, triisostearylisopropyl titanate, isopropyltridodecylbenzenesulfonyl titanate, tetra(2-ethylhexyl)titanate, butyl titanate dimer, isopropylisostearoyldiacryl titanate, isopropyltri(dioctyl phosphate) titanate, isopropyltris(dioctyl pyrophosphate) titanate, tetraisopropylbis(dioctyl phosphite) titanate, tetraoctylbis(ditridecyl phosphite) titanate, tetra(2,2-diallyloxymethyl-1-butyl)bis(di-tridecyl)phosphite titanate, bis(dioctyl pyrophosphate)oxyacetate titanate, bis(dioctyl pyrophosphate) ethylene titanate, tetra-1-propyl titanate, tetra-n-butyl titanate, and diisostearoyl ethylene titanate. These coupling agents can be used individually or in combination. The coupling agent is preferably a titanium coupling agent or a silane coupling agent. The above coupling agent interacts with a battery electrode surface or a separator surface to improve the adhesion force, but, by covering the surface of the inorganic particles with the coupling agent, a repellent effect of the coupling agent molecules causes voids between the inorganic particles, so that ions conduct through the voids, thus improving the ionic conductivity.

A similar effect can be obtained by incorporating a dendrimer. For improving the ionic conductivity, a structure having a cyano group having a high permittivity or a polyoxyethylene group or the like which strongly interacts with ions is preferably introduced. A titanium coupling agent can be more advantageously used for the inorganic particles having a pH for isoelectric point of 7 or more, and a silane coupling agent can be more advantageously used for the inorganic particles having a pH for isoelectric point of less than 7. The battery electrode or separator surface protective agent composition of one or more embodiments of the present invention contains, relative to 100 parts by weight of the at least two types of organic particles, preferably 1 to 10,000 parts by weight, more preferably 5 to 5,000 parts by weight, especially preferably 10 to 1,000 parts by weight of the inorganic particles having an active hydrogen group. Two types or more of these inorganic particles can be used in combination, and especially a combination of the inorganic particles having a large difference in the pH for isoelectric point between them is likely to cause an acid-base interaction, and the inorganic particles are preferably mixed so that the amount of active hydrogen of one of the inorganic particles is larger than that of the other because the activity of the remaining active hydrogen is improved. Especially, a combination of silica having a small pH for isoelectric point and γ-alumina, α-alumina, beryllia, iron hydroxide, manganese hydroxide, or magnesium hydroxide having a large pH for isoelectric point is preferred, and a combination of silica and α-alumina, or a combination of silica and magnesium hydroxide is particularly preferred. In the case of a Li-ion battery, the amount of the silica added is preferably in the range of from 0.1 to 100% by weight, more preferably in the range of from 1 to 10% by weight, based on the weight of the inorganic particles having a large pH for isoelectric point.

[Organic Particles Covered with an Inorganic Material]

In the battery electrode or separator surface protective agent composition of one or more embodiments of the present invention, at least one type of the organic particles can be covered with an inorganic material. By designing the organic particles so that the organic particles are heated for hot melt to break the inorganic material covering layer, so that the organic particles thermally fuse with one another, the organic particles are prevented from thermally fusing together before being solidified, improving the stability of the protective agent composition. Further, the active hydrogen group on the surface of the inorganic component present between the organic particles serves as a counter ion in the ionic conductivity, thus efficiently improving the ionic conductivity. By covering the surface of the organic particles with an inorganic material, the reduction of, e.g., fluidity of the organic particles due to heat fusion before solidification can also be prevented.

Examples of such inorganic materials include metal oxides, such as alumina, silica, zirconia, beryllia, magnesium oxide, titania, and iron oxide; sols, such as colloidal silica, a titania sol, and an alumina sol; composite oxides, such as mullite; and hydroxides, such as aluminum hydroxide, magnesium hydroxide, and iron hydroxide. The above inorganic material can be fused on the surface of the organic particles by heating it to such an extent that a sol-gel reaction or fusion of the organic particles does not occur. The adhesion of the inorganic material to the organic particles can be improved by, before covering with an inorganic material, subjecting the surface to chromate treatment, plasma treatment, or surface treatment with a water-soluble polymer, such as PVA, carboxymethyl cellulose, or starch, or a compound material obtained by adding the above-mentioned polycarboxylic acid to a water-soluble polymer to effect ester crosslinking.

[Core-Shell Type Foaming Agent]

The battery electrode or separator surface protective agent composition of one or more embodiments of the present invention can comprise a core-shell type foaming agent. As the foaming agent, e.g., EXPANCEL, which is a trade name of Japan Fillite Co., Ltd., can be used. The shell of the foaming agent is formed from an organic material and hence has poor long-term reliability with respect to an electrolytic solution, and therefore the core-shell type foaming agent which is further covered with an inorganic material can be used. With respect to covering the core-shell type foaming agent with an inorganic material, the above-mentioned materials and methods can be used.

By using the core-shell type foaming agent having a combination of a shell which softens at a predetermined temperature or higher and a core comprising a material which is expanded in volume due to, e.g., evaporation by heating, when the battery suffers runaway heat generation, the distance between the electrodes is increased by virtue of the foaming agent, achieving a shutdown. The shell portion is remarkably expanded to increase the distance between the electrodes, making it possible to prevent the occurrence of, e.g., short-circuiting. Further, after the heat generation is stopped, the expanded shell portion maintains its shape, so that the space between the electrodes is not reduced, making it possible to prevent further occurrence of short-circuiting. Furthermore, covering the foaming agent with an inorganic material can reduce the effect of electrolysis during the charging and discharging, and further the active hydrogen group on the surface of the inorganic material serves as a counter ion in the ionic conductivity, making it possible to efficiently improve the ionic conductivity.

[Liquid Binder]

The battery electrode or separator surface protective agent composition of one or more embodiments of the present invention can contain a liquid binder in such an amount that the organic particles are not inhibited from thermally fusing with one another. Particularly, by using an energy radiation curing binder, the organic particles can fuse with one another in a state in which the positional relationship between the organic particles is fixed. Thus, the organic particles thermally fuse with one another, for example, in a state in which the organic particles are substantially oriented, e.g., in a magnetic field, making it possible to form a battery electrode protective layer having anisotropy in the ionic conductivity or mechanical strength.

As the liquid binder, various types of known liquid binders can be used. These liquid binders can be used in the form of, e.g., a mixture of a liquid prepolymer and a curing agent or a thermal initiator or an energy radiation initiator using a light or an electron beam, a solid polymer material dissolved in a solvent, or a liquid binder which undergoes a sol-gel reaction to form a solid inorganic material.

(Mixture of a Liquid Prepolymer and a Curing Agent or an Initiator)

Examples of mixtures of a liquid prepolymer and a thermal initiator or an energy radiation initiator using a light or an electron beam include combinations of a radical photoinitiator or a thermal radical generator and a compound having an acyl group, a methacryl group, an allyl group, a vinyl group, or a maleimide group, and combinations of a cationic photo (thermal) initiator and a compound having an oxirane ring, such as an epoxy group or an oxetane ring, a vinyl ether, or a cyclic acetal.

Examples of radical photoinitiators include acetophenones, such as 4-phenoxydichloroacetophenone, 4-t-butyl-dichloroacetophenone, 4-t-butyl-trichloroacetophenone, diethoxyacetophenone, 2-hydroxy-2-methyl-1-phenylpropan-1-one, 1-(4-isopropylphenyl)-2-hydroxy-2-methylpropan-1-one, 1-(4-dodecylphenyl)-2-hydroxy-2-methylpropan-1-one, 4-(2-hydroxyethoxy)phenyl (2-hydroxy-2-propyl)ketone, 1-hydroxycyclohexyl phenyl ketone, and 2-methyl-1-[4-(methylthio)phenyl]-2-morpholinopropane-1; benzoins, such as benzoin, benzoin methyl ether, benzoin ethyl ether, benzoin isopropyl ether, benzoin isobutyl ether, and benzyl dimethyl ketal; benzophenones, such as benzophenone, benzoylbenzoic acid, methyl benzoylbenzoate, 4-phenylbenzophenone, hydroxybenzophenone, acrylated benzophenone, 4-benzoyl-4'-methyldiphenyl sulfide, and 3,3'-dimethyl-4-methoxybenzophenone; thioxanthones, such as thioxanthone, 2-chlorothioxanthone, 2-methylthioxanthone, 2,4-dimethylthioxanthone, isopropylthioxanthone, 2,4-dichlorothioxanthone, 2,4-diethylthioxanthone, and 2,4-diisopropylthioxanthone; 1-phenyl-1,2-propanedione-2(O-ethoxycarbonyl)oxime, 2,4,6-trimethylbenzoyldiphenylphosphine oxide, methylphenyl oxylate, 9,10-phenanthrenequinone, camphorquinone, dibenzosuberone, 2-ethylanthraquinone, 4',4'''-diethylisophthalophenone, 3,3', 4,4'-tetra(t-butylperoxycarbonyl)benzophenone, 1-[4-(3-mercaptopropylthio)phenyl]-2-methyl-2-morpholin-4-yl-propan-1-one, 1-[4-(10-mercaptodecanylthio)phenyl]-2-methyl-2-morpholin-4-yl-propan-1-one, 1-(4-{2-[2-(2-mercaptoethoxy)ethoxy]ethylthio}phenyl)-2-methyl-2-morpholin-4-yl-propan-1-one, 1-[3-(mercaptopropylthio)phenyl]-2-dimethylamino-2-benzyl-propan-1-one, 1-[4-(3-mercaptopropylamino)phenyl]-2-dimethylamino-2-benzyl-propan-1-one, 1-[4-(3-mercaptopropoxy)phenyl]-2-methyl-2-morpholin-4-yl-propan-1-one, bis(η5-2,4-cyclopentadien-1-yl)bis[2,6-difluoro-3-(1H-pyrrol-1-yl) phenyl]titanium, α-allylbenzoin, α-allylbenzoin aryl ether, 1.2-octanedione, 1-4-(phenylthio)-2-(O-benzoyloxime)], ethanone, 1-[9-ethyl-6-(2-methylbenzoyl)-9H-carbazol-3-yl]-1-(O-acetyloxime), bis(2,4,6-trimethylbenzoyl)phenylphosphine oxide, and 1,3-bis(p-dimethylaminobenzylidene) acetone. Among the above radical photoinitiators, in the photoinitiator of an intermolecular hydrogen abstraction type, an electron donor (hydrogen donor) can be added as an initiator auxiliary agent, and an aliphatic amine or aromatic amine having active hydrogen can be used as an initiator auxiliary agent. Specific examples include triethanolamine, methyldiethanolamine, triisopropanolamine, 4,4'-dimethylaminobenzophenone, 4,4'-diethylaminobenzophenone, ethyl 2-dimethylaminobenzoate, and ethyl 4-dimethylaminobenzoate.

Examples of thermal radical generators include azides, such as 4-azidoaniline hydrochloride and 4,4'-dithiobis(1-azidobenzene); disulfides, such as 4,4'-diethyl-1,2-dithiolane, tetramethylthiuram disulfide, and tetraethylthiuram disulfide; diacyl peroxides, such as octanoyl peroxide, 3,5,5-trimethylhexanoyl peroxide, decanoyl peroxide, lauroyl peroxide, succinic peroxide, benzoyl peroxide, 2,4-dichlorobenzoyl peroxide, and m-toluoyl peroxide; peroxydicarbonates, such as di-n-propyl peroxydicarbonate, diisopropyl peroxydicarbonate, di-2-ethylhexyl peroxydicarbonate, and di-(2-ethoxyethyl)peroxydicarbonate; peroxy esters, such as tertiary-butyl peroxyisobutyrate, tertiary-butyl peroxypivalate, tertiary-butyl peroxyoctanoate, octyl peroxyoctanoate, tertiary-butyl peroxy-3,5,5-trimethylhexanoate, tertiary-butyl peroxyneododecanoate, octyl peroxyneododecanoate, tertiary-butyl peroxylaurate, and tertiary-butyl peroxybenzoate; dialkyl peroxides, such as di-tertiary-butyl peroxide, tertiary-butylcumyl peroxide, dicumyl peroxide, 2,5-dimethyl-2,5-(tertiary-butylperoxy)hexane, and 2,5-dimethyl-2,5-di(tertiary-butyl)hexyne-3; peroxy ketals, such as 2,2-bis(tertiary-butylperoxy)butane, 1,1-bis(tertiary-butylperoxy) cyclohexane, 1,1-bis(tertiary-butylperoxy)-3,3,5-trimethylcyclohexane, and n-butyl 4,4-bis(tertiary-butylperoxy)valerate; ketone peroxides, such as methyl ethyl ketone peroxide; peroxides, such as p-menthane hydroperoxide, and cumene hydroperoxide; azonitriles, such as 2,2'-azobis(4-methoxy-2,4-dimethylvaleronitrile), 2,2'-azobis(2,4-dimethylvaleronitrile), 2,2'-azobis(2-methylpropionitrile), 2,2'-azobis(2-methylbutylnitrile), 1,1'-azobis(cyclohexane-1-carbonitrile), 1-[(1-cyano-1-methylethyl)azo] formamide, and 2-phenylazo-4-methoxy-2,4-dimethylvaleronitrile; azoamides, such as 2,2'-azobis(2-methyl-N-phenylpropionamidine)dihydrochloride, 2,2'-azobis[N-(4-chlorophenyl)-2-methylpropionamidine] dihydrochloride, 2,2'-azobis[N-(4-hydroxyphenyl)-2-methylpropionamidine]dihydrochloride, 2,2'-azobis[2-methyl-N-(4-phenylmethyl)propionamidine] dihydrochloride, 2,2'-azobis[2-methyl-N-(2-propenyl) propionamidine]dihydrochloride, 2,2'-azobis(2-methylpropionamidine)dihydrochloride, 2,2'-azobis[N-(2-hydroxyethyl)-2-methylpropionamidine]dihydrochloride, 2,2'-azobis[2-(5-methyl-2-imidazolin-2-yl)propane]dihydrochloride, 2,2'-azobis{2-[1-(2-hydroxyethyl)-2-imidazolin-2-yl]propane}dihydrochloride, and 2,2'-azobis[2-(2-imidazolin-2-yl)propane]; alkyl azo compounds, such as 2,2'-azobis(2,4,4-trimethylpentane) and 2,2'-azobis(2-methylpropane); and azo compounds, such as dimethyl 2,2'-azobis(2-methylpropionate), 2,2'-azobis(4-cyanovaleric acid), and 2,2'-azobis[2-(hydroxymethyl)propionate].

A decomposition promoter can be used for the above-mentioned thermal radical generator, and examples of decomposition promoters include thiourea derivatives, such as N,N'-dimethylthiourea, tetramethylthiourea, N,N'-diethylthiourea, N,N'-dibutylthiourea, benzoylthiourea, acetylthiourea, ethylenethiourea, N,N'-diethylenethiourea, N,N'-diphenylthiourea, and N,N'-dilaurylthiourea, preferably tetramethylthiourea or benzoylthiourea; organometal complexes, such as cobalt naphthenate, vanadium naphthenate, copper naphthenate, iron naphthenate, manganese naphthenate, cobalt stearate, vanadium stearate, copper stearate, iron stearate, and manganese stearate; primary, secondary, or tertiary alkylamines or alkylenediamines having an alkyl group or alkylene group in which the number of carbon atoms is represented by an integer of 1 to 18, e.g., amines, such as diethanolamine, triethanolamine, dimethylbenzylamine, trisdimethylaminomethylphenol, trisdiethylaminomethylphenol, 1,8-diazabicyclo(5,4,0)undecene-7,1,8-diazabicyclo(5,4,0)undecene-7,1,5-diazabicyclo(4,3,0)-nonene-5,6-dibutylamino-1,8-diazabicyclo(5,4,0)-undecene-7,2-methylimidazole, and 2-ethyl-4-methylimidazole; phosphate compounds, such as methacryl phosphate, dimethacryl phosphate, monoalkyl acid phosphate, dialkyl phosphate, trialkyl phosphate, dialkyl phosphite, and trialkyl phosphite; toluidine derivatives, such as N,N-dimethyl-p-toluidine and N,N-diethyl-p-toluidine; and aniline derivatives, such as N,N-dimethylaniline and N,N-diethylaniline.

Examples of compounds having a (meth)acryl group as a reactive substituent which causes crosslinking due to the above-mentioned radical photoinitiator or thermal radical generator include butanediol mono(meth)acrylate, t-butylaminoethyl(meth)acrylate, N,N-dimethylaminoethyl(meth) acrylate, N,N-diethylaminoethyl(meth)acrylate, 2-ethoxyethyl(meth)acrylate, n-hexyl(meth)acrylate, 2-hydroxyethyl (meth)acrylate, 2-hydroxyethyl(meth)acrylate, hydroxypropyl(meth)acrylate, hydroxypropyl(meth)acrylate, 2-methoxyethyl(meth)acrylate, neopentyl glycol di(meth)acrylate, polyethylene glycol 400 di(meth)acrylate, polypropylene glycol mono(meth)acrylate, polyethylene glycol mono(meth)acrylate, tetrahydrofurfuryl(meth)acrylate, vinyl acetate, (meth)acryloyloxyethyl phthalate, N-(meth)acryloyloxy-N-carboxypiperidine, N-(meth)acryloyloxy-N,N-dicarboxymethyl-p-phenylenediamine, hydroxynaphthoxypropyl(meth)acrylate, (meth)acryloyloxyethylphosphorylphenyl, 4-(meth)acryloyloxyethyl trimellitate, (meth)acryloyloxyethyl phthalate, (meth)acryloyloxyethyl phosphate, a long-chain aliphatic(meth)acrylate, allyl(meth)acrylate, benzyl(meth)acrylate, butoxyethyl (meth)acrylate, butanediol mono(meth)acrylate, butoxytriethylene glycol(meth)acrylate, ECH-modified butyl(meth)acrylate, t-butylaminoethyl(meth)acrylate, caprolactone (meth)acrylate, 3-chloro-2-hydroxypropyl(meth)acrylate, 2-cyanoethyl(meth)acrylate, cyclohexyl(meth)acrylate, dicyclopentanyl(meth)acrylate, alicyclic modified neopentyl glycol(meth)acrylate, 2,3-dibromopropyl(meth)acrylate, dicyclopentenyl(meth)acrylate, dicyclopentenyloxyethyl (meth)acrylate, N,N-diethylaminoethyl(meth)acrylate, N,N-dimethylaminoethyl(meth)acrylate, 2-ethoxyethyl(meth)acrylate, 2(2-ethoxyethoxy)ethyl(meth)acrylate, 2-ethylhexyl(meth)acrylate, glycerol(meth)acrylate, glycidyl(meth)acrylate, heptadecafluorodecyl(meth)acrylate, 2-hydroxyethyl(meth)acrylate, caprolactone-modified 2-hydroxyethyl(meth)acrylate, 2-hydroxy-3-(meth)acryloyloxypropyltrimethylammonium chloride, 2-hydroxypropyl (meth)acrylate, isobornyl(meth)acrylate, isodecyl(meth)acrylate, isooctyl(meth)acrylate, lauryl(meth)acrylate, γ-(meth)acryloyloxypropyltrimethoxysilane, 2-methoxyethyl(meth)acrylate, methoxydiethylene glycol(meth)acrylate, methoxytriethylene glycol(meth)acrylate, methoxytetraethylene glycol(meth)acrylate, methoxypolyethylene glycol 1000 (meth)acrylate, methoxydipropylene glycol (meth)acrylate, methoxylated cyclodecatriene(meth)acrylate, morpholine(meth)acrylate, nonylphenoxypolyethylene glycol(meth)acrylate, octafluoropentyl(meth)acrylate, octyl (meth)acrylate, phenoxyhydroxypropyl(meth)acrylate, phenoxyethyl(meth)acrylate, phenoxydiethylene glycol(meth)acrylate, phenoxytetraethylene glycol(meth)acrylate, phenoxyhexaethylene glycol(meth)acrylate, EO (EO=ethylene oxide)-modified phenoxylated phosphate (meth)acrylate, phenoxy(meth)acrylate, EO-modified phosphate(meth)acrylate, EO-modified phosphate(meth)acrylate, EO-modified phthalate(meth)acrylate, EO, PO (PO=propylene oxide)-modified phthalate(meth)acrylate, polyethylene glycol 90 (meth)acrylate, polyethylene glycol 200 (meth)acrylate, polyethylene glycol 400 (meth)acrylate, polypropylene glycol(meth)acrylate, polypropylene glycol 500 (meth)acrylate, polypropylene glycol 800 (meth)acrylate, polyethylene glycol/polypropylene glycol(meth)acrylate, stearyl(meth)acrylate, EO-modified succinate(meth)acrylate, sodium sulfonate ethoxy(meth)acrylate, tetrafluoropropyl(meth)acrylate, tetrahydrofurfuryl(meth) EO-modified bisphenol A di(meth)acrylate, acrylate, caprolactone-modified tetrahydrofurfuryl(meth)acrylate, trifluoroethyl(meth)acrylate, vinyl acetate, allylcyclohexyl di(meth)acrylate, (meth)acrylated isocyanurate, bis(acryloyloxyneopentyl glycol) adipate, EO-modified bisphenol A di(meth)acrylate, EO-modified bisphenol S di(meth)acrylate, bisphenol F di(meth)acrylate, EO-modified bisphenol AD di(meth)acrylate, EO-modified bisphenol AF di(meth)acrylate, 1,4-butanediol di(meth)acrylate, 1,3-butylene glycol di(meth)acrylate, 1,3-butylene glycol di(meth)acrylate, 1,4-butanediol di(meth)acrylate, 1,3-butylene glycol di(meth)acrylate, dicyclopentanyl di(meth)acrylate, diethylene glycol di(meth)acrylate, ECH-modified diethylene glycol di(meth)acrylate, dipentaerythritol hexa(meth)acrylate, dipentaerythritol monohydroxypenta(meth)acrylate, silsesquioxane(meth)acrylate, alkyl-modified dipentaerythritol penta(meth)acrylate, caprolactone-modified dipentaerythritol hexa(meth)acrylate, ditrimethylolpropane tetra(meth) acrylate, ethylene glycol di(meth)acrylate, glycerol(meth)acrylate, glycerol di(meth)acrylate, 1,6-hexanediol diacrylate, 1,6-hexanediol dimethacrylate, methoxylated cyclohexyl di(meth)acrylate, neopentyl glycol di(meth)acrylate, hydroxypivalate neopentyl glycol diacrylate, caprolactone-modified hydroxypivalate neopentyl glycol di(meth)acrylate, pentaerythritol tri(meth)acrylate, pentaerythritol tetra(meth)acrylate, stearic acid-modified pentaerythritol di(meth)acrylate, EO-modified phosphate di(meth)acrylate, EO-modified phosphate tri(meth)acrylate, polyethylene glycol 200 di(meth)acrylate, tetraethylene glycol di(meth)acrylate, tetrabromobisphenol A di(meth)acrylate, triethylene glycol(meth)acrylate, triglycerol di(meth)acrylate, neopentyl glycol-modified trimethylolpropane di(meth)acrylate, trimethylolpropane tri(meth)acrylate, EO-modified trimethylolpropane tri(meth)acrylate, tripropylene glycol di(meth)acrylate, tris(acryloyloxyethyl)isocyanurate, caprolactone-modified tris(acryloyloxyethyl)isocyanurate, tris (methacryloyloxyethyl)isocyanurate, zinc di(meth)acrylate, isocyanate ethyl methacrylate, chlorendate di(meth)acrylate, and methoxy ether(meth)acrylate. These can be cured with an electron beam without the above-mentioned radical initiator.

Examples of the above-mentioned cationic photoinitiators include iodonium salts, such as diphenyliodonium hexafluorophosphate, diphenyliodonium hexafluoroantimonate, diphenyliodonium tetrafluoroborate, diphenyliodonium tetrakis(pentafluorophenyl)borate, bis(dodecylphenyl)iodonium hexafluorophosphate, bis(dodecylphenyl)iodonium hexafluoroantimonate, bis(dodecylphenyl)iodonium tetrafluoroborate, bis(dodecylphenyl)iodonium tetrakis(pentafluorophenyl)borate, 4-methylphenyl-4-(1-methylethyl)phenyliodonium hexafluorophosphate, 4-methylphenyl-4-(1-methylethyl)phenyliodonium hexafluoroantimonate, 4-methylphenyl-4-(1-methylethyl)phenyliodonium tetrafluoroborate, 4-methylphenyl-4-(1-methylethyl)phenyliodonium tetrakis(pentafluorophenyl)borate, 4-methoxydiphenyliodonium hexafluorophosphate, bis(4-methylphenyl) iodonium hexafluorophosphate, bis(4-tertiary-butylphenyl) iodonium hexafluorophosphate, bis(dodecylphenyl) iodonium, tolylcumyliodonium hexafluorophosphate, and iodonium; sulfonium salts, such as triallylsulfonium hexafluoroantimonate; phosphonium salts, such as a triphenylpyrenylmethylphosphonium salt; (η6-benzene)(η5-cyclopentadienyl)iron(II) hexafluoroantimonate, and a combination of o-nitrobenzyl silyl ether and aluminum acetylacetonate. A sensitizer can be added to the cationic photoinitiator, and examples of such sensitizers include 9,10-butoxyanthracene, acridine orange, acridine yellow, benzofravin, acetofravin T, perylene, pyrene, anthracene, phenothiazine, 1,2-benzanthracene, coronene, thioxanthone, fluorenone, benzophenone, and anthraquinone. Examples of anionic photoinitiators for polymerizing a compound having an epoxy group or a cyanoacrylate group include 2-nitrobenzyl carbamate compounds having a bifunctional or multifunctional isocyanate blocked with an o-nitrobenzyl alcohol compound, and a combination of a quinonediazidosulfonate compound and an N-alkylaziridine compound.

Examples of compounds having an epoxy group as a reactive substituent which causes crosslinking due to a cationic or anionic photoinitiator include (3',4'-epoxycyclohexane)methyl 3,4-epoxycyclohexanecarboxylate, 4-vinylcyclohexene oxide, 1-methyl-4-(2-methyloxiranyl)-7-oxabicyclo[4.1.0]heptane, tetrakis-(3-cyclohexenylmethyl) epoxidized butanetetracarboxylate-modified epsilon-caprolactone, epoxidized polybutadiene, a 1,2-epoxy-4-(2-oxiranyl)cyclohexane addition product of 2,2-bis(hydroxymethyl)-1-butanol, a 1,2-epoxy-4-(2-oxiranyl)cyclohexane addition product of 2,2-bis(hydroxymethyl)-1-butanol, 3,4-epoxycyclohexenylmethyl 3',4'-epoxycyclohexenecarboxylate, 3,4-epoxycyclohexylmethyl methacrylate, α-olefin epoxide, an epoxidization product of a styrene-butadiene block copolymer, an epoxidization product of a styrene-butadiene block copolymer, a bisphenol A epoxy resin, a bisphenol AD epoxy resin, a bisphenol F epoxy resin, a bisphenol AF epoxy resin, a phenolic novolak epoxy resin, a cresol novolak epoxy resin, an α-naphthol novolak epoxy resin, a bisphenol A novolak epoxy resin, a tetrabromobisphenol A epoxy resin, tetraglycidyldiaminodiphenylmethane, dihydroxynaphthalene diglycidyl ether, a biphenyl epoxy resin, a silsesquioxane epoxy resin, an isoprene epoxy resin, an isobornyl skeleton, a bisphenol S epoxy resin, a hydrogenated bisphenol A epoxy resin, a propylene oxide-added bisphenol A epoxy resin, a resorcinol epoxy resin, epoxy-modified silicone, and epoxy-modified silsesquioxane. As a compound having an episulfide as a reactive substituent, the above-mentioned epoxy resin having the oxygen atom replaced by a sulfur atom can be used. Examples of compounds having an oxetane ring as a reactive substituent include 3-ethyl-3-hydroxymethyloxetane, 3-(meth)allyloxymethyl-3-ethyloxetane, (3-ethyl-3-oxetanylmethoxy)methylbenzene, 4-fluoro-[1-(3-ethyl-3-oxetanylmethoxy)methyl]benzene, 4-methoxy-[1-(3-ethyl-3-oxetanylmethoxy)methyl]benzene, [1-(3-ethyl-3-oxetanylmethoxy)ethyl]phenyl ether, isobutoxymethyl (3-ethyl-3-oxetanylmethyl)ether, isobornyloxyethyl (3-ethyl-3-oxetanylmethyl)ether, isobornyl (3-ethyl-3-oxetanylmethyl)ether, 2-ethylhexyl (3-ethyl-3-oxetanylmethyl)ether, ethyl diethylene glycol (3-ethyl-3-oxetanylmethyl)ether, dicyclopentadiene (3-ethyl-3-oxetanylmethyl)ether, dicyclopentenyloxyethyl (3-ethyl-3-oxetanylmethyl)ether, dicyclopentenyl (3-ethyl-3-oxetanylmethyl)ether, tetrahydrofurfuryl (3-ethyl-3-oxetanylmethyl)ether, tetrabromophenyl (3-ethyl-3-oxetanylmethyl)ether, 2-tetrabromophenoxyethyl (3-ethyl-3-oxetanylmethyl)ether, tribromophenyl (3-ethyl-3-oxetanylmethyl)ether, 2-tribromophenoxyethyl (3-ethyl-3-oxetanylmethyl)ether, 2-hydroxyethyl (3-ethyl-3-oxetanylmethyl)ether, 2-hydroxypropyl (3-ethyl-3-oxetanylmethyl)ether, butoxyethyl (3-ethyl-3-oxetanylmethyl)ether, pentachlorophenyl (3-ethyl-3-oxetanylmethyl)ether, pentabromophenyl (3-ethyl-3-oxetanylmethyl)ether, bornyl (3-ethyl-3-oxetanylmethyl)ether, 3,7-bis(3-oxetanyl)-5-oxa-nonane, 3,3'-(1,3-(2-methylenyl)propanediylbis(oxymethylene))bis-(3-ethyloxetane), 1,4-bis[(3-ethyl-3-oxetanylmethoxy)methyl]benzene, 1,2-bis[(3-ethyl-3-oxetanylmethoxy)methyl]ethane, 1,3-bis[(3-ethyl-3-oxetanylmethoxy)methyl]propane, ethylene glycol bis(3-ethyl-3-oxetanylmethyl)ether, dicyclopentenyl bis(3-ethyl-3-oxetanylmethyl)ether, triethylene glycol bis(3-ethyl-3-oxetanylmethyl)ether, tetraethylene glycol bis(3-ethyl-3-oxetanylmethyl)ether, tricyclodecanediyldimethylene (3-ethyl-3-oxetanylmethyl)ether, trimethylolpropane tris(3-ethyl-3-oxetanylmethyl)ether, 1,4-bis(3-ethyl-3-oxetanylmethoxy)butane, 1,6-bis(3-ethyl-3-oxetanylmethoxy)hexane, pentaerythritol tris(3-ethyl-3-oxetanylmethyl)ether, pentaerythritol tetrakis(3-ethyl-3-oxetanylmethyl)ether, polyethylene glycol bis(3-ethyl-3-oxetanylmethyl)ether, dipentaerythritol hexakis(3-ethyl-3-oxetanylmethyl)ether, dipentaerythritol pentakis(3-ethyl-3-oxetanylmethyl)ether, dipentaerythritol tetrakis(3-ethyl-3-oxetanylmethyl)ether, caprolactone-modified dipentaerythritol hexakis(3-ethyl-3-oxetanylmethyl)ether, caprolactone-modified dipentaerythritol pentakis(3-ethyl-3-oxetanylmethyl)ether, ditrimethylolpropane tetrakis(3-ethyl-3-oxetanylmethyl)ether, ethylene oxide (EO)-modified bisphenol A bis(3-ethyl-3-oxetanylmethyl)ether, propylene oxide (PO)-modified bisphenol A bis(3-ethyl-3-oxetanylmethyl)ether, EO-modified hydrogenated bisphenol A bis(3-ethyl-3-oxetanylmethyl)ether, PO-modified hydrogenated bisphenol A bis(3-ethyl-3-oxetanylmethyl)ether, EO-modified bisphenol F (3-ethyl-3-oxetanylmethyl)ether, and oxetanylsilsesquioxane. Examples of compounds having a spiroorthocarbonate as a reactive substituent include spiroglycol diallyl ether and bicycloortho ester. Examples of compounds having an episulfide as a reactive substituent include ethylene sulfide, propylene sulfide, 1-butene sulfide, 2-butene sulfide, isobutylene sulfide, 1-pentene sulfide, 2-pentene sulfide, 1-hexene sulfide, 1-octene sulfide, 1-dodecene sulfide, cyclopentene sulfide, cyclohexene sulfide, styrene sulfide, vinylcyclohexene sulfide, 3-phenylpropylene sulfide, 3,3,3-trifluoropropylene sulfide, 3-naphthylpropylene sulfide, 3-phenoxypropylene sulfide, 3-naphthoxypropylene sulfide, butadiene monosulfide, and 3-trimethylsilyloxypropylene sulfide. Examples of compounds having a vinyl ether as a reactive substituent include n-propyl vinyl ether, isopropyl vinyl ether, n-butyl vinyl ether, isobutyl vinyl ether, 2-ethylhexyl vinyl ether, octadecyl vinyl ether, cyclohexyl vinyl ether, allyl vinyl ether, hydroxyethyl vinyl ether, hydroxybutyl vinyl ether, 9-hydroxynonyl vinyl ether, 4-hydroxycyclohexyl vinyl ether, cyclohexanedimethanol monovinyl ether, triethylene glycol monovinyl ether, triethylene glycol divinyl ether, 1,4-butanediol divinyl ether, nonanediol divinyl ether, cyclohexanediol divinyl ether, cyclohexanedimethanol divinyl ether, triethylene glycol divinyl ether, trimethylpropane trivinyl ether, and pentaerythritol tetravinyl ether.

Two or more of the above photoinitiators or thermal initiators can be used in combination. The amount of the photoinitiator or thermal initiator added is, relative to 100 parts by weight of the prepolymer, preferably 0.01 to 50 parts by weight, more preferably 0.1 to 20 parts by weight, further preferably 1 to 10 parts by weight.

(Liquid Binder Having a Solid Polymer Material Dissolved in a Solvent)

Examples of liquid binders having the above-mentioned solid polymer material dissolved in a solvent include those having the above-mentioned polymer dissolved in a solvent, and a water-soluble polymer, such as completely saponified polyvinyl alcohol (such as KURARAY POVAL PVA-124, manufactured by Kuraray Co., Ltd.; or JC-25, manufactured by Japan Vam & Poval Co., Ltd.), partially saponified polyvinyl alcohol (such as KURARAY POVAL PVA-235, manufactured by Kuraray Co., Ltd.; or JP-33, manufactured by Japan Vam & Poval Co., Ltd.), modified polyvinyl alcohol (KURARAY K POLYMER KL-118, KURARAY C POLYMER CM-318, KURARAY R POLYMER R-1130, KURARAY LM POLYMER LM-100HD, manufactured by Kuraray Co., Ltd.; or D Polymer DF-20, Anionic modified PVA AF-17, manufactured by Japan Vam & Poval Co., Ltd.), carboxymethyl cellulose (such as H-CMC, DN-100L, 1120, 2200, manufactured by Daicel Chemical Industries, Ltd.; or MAC200HC, manufactured by Nippon Paper Chemicals Co., Ltd.), hydroxyethyl cellulose (such as SP-400, manufactured by Daicel Chemical Industries, Ltd.), polyacrylamide (ACCOFLOC A-102, manufactured by MT AquaPolymer, Inc.), polyoxyethylene (ALKOX E-30, manufactured by Meisei Chemical Works, Ltd.), an epoxy resin (such as EX-614, manufactured by Nagase ChemteX Corporation; or EPIKOTE 5003-W55, manufactured by Japan Chemtech Ltd.), polyethyleneimine (EPOMIN P-1000, manufactured by Nippon Shokubai Co., Ltd.), polyacrylate (such as ACCOFLOC C-502, manufactured by MT AquaPolymer, Inc.), saccharide or a derivative thereof (Chitosan 5, manufactured by Wako Pure Chemical Industries, Ltd.; Esterified Starch Amycol, manufactured by Nippon Starch Chemical Co., Ltd.; or Cluster Dextrin, manufactured by Glico Nutrition Co., Ltd.), or polystyrenesulfonic acid (such as Poly-NaSS PS-100, manufactured by Tosoh Organic Chemical Co., Ltd.), can be used in the state of being dissolved in water, and a polymer, such as modified polyvinyl alcohol (Cyanoresin CR-V, manufactured by Shin-Etsu Chemical Co., Ltd.), modified pullulan (Cyanoresin CR-S, manufactured by Shin-Etsu Chemical Co., Ltd.), or polyvinylidene fluoride (Kureha KF Polymer #1120, manufactured by Kureha Corporation), can be used in the state of being dissolved in N-methylpyrrolidone. These liquid binders can be solidified by removing the solvent by heating and/or under a reduced pressure.

(Liquid Binder which Undergoes a Sol-Gel Reaction to Form a Solid Inorganic Material)

Examples of liquid binders which undergo a sol-gel reaction to form a solid inorganic material include triethoxysilane, trimethoxysilane, aluminum isopropoxide, titanium tetraisopropoxide, titanium tetra-normal-butoxide, titanium butoxide dimer, titanium tetra-2-ethylhexoxide, titanium diisopropoxybis(acetylacetonate), titanium tetraacetylacetonate, titanium dioctyloxybis(octyleneglycolate), titanium diisopropoxybis(ethylacetoacetate), titanium diisopropoxybis(triethanolaminate), titanium lactate, polyhydroxytitanium stearate, zirconium tetra-normal-propoxide, zirconium tetra-normal-butoxide, zirconium tetraacetylacetonate, zirconium tributoxymonoacetylacetonate, zirconium monobutoxyacetylacetonate bis(ethylacetoacetate), zirconium dibutoxybis(ethylacetoacetate), zirconium tetraacetylacetonate, and zirconium tributoxymonostearate. Further, a sol-gel reaction catalyst can be added to the above liquid binder, and examples of sol-gel reaction catalysts include compounds which hydrolyze the inorganic component to cause a condensation polymerization, e.g., acids, such as hydrochloric acid; alkalis, such as sodium hydroxide; amines; organotin compounds, such as dibutyltin diacetate, dibutyltin dioctate, dibutyltin dilaurate, dibutyltin dimaleate, dioctyltin dilaurate, dioctyltin dimaleate, and tin octylate; organic titanate compounds, such as isopropyltriisostearoyl titanate, isopropyl tris(dioctylpyrophosphate) titanate, bis(dioctylpyrophosphate)oxyacetate titanate, and tetraalkyl titanate; organozirconium compounds, such as tetrabutyl zirconate, zirconium tetrakis(acetylacetonate), tetraisobutyl zirconate, zirconium butoxytris(acetylacetonate), and zirconium naphthenate; organoaluminum compounds, such as aluminum tris(ethylacetoacetate) and aluminum tris(acetylacetonate); and organometal catalysts, such as zinc naphthenate, cobalt naphthenate, and cobalt octylate. Of these, specific examples of commercially available products include a dibutyltin compound (SCAT-24, manufactured by Sankyo Organic Chemicals Co., Ltd.). These compounds can be used individually or in combination. As an example of a liquid binder which undergoes a reaction other than the sol-gel reaction to form a solid inorganic material, there can be mentioned water glass, and water glass grade 1, water glass grade 2, water glass grade 3, sodium metasilicate class 1, sodium metasilicate class 2, potassium silicate grade 1, potassium silicate grade 2, or lithium silicate, described in JIS K1408, can be used.

The amount of the liquid binder added is required to be such an amount that the organic particles are not inhibited from thermally fusing with one another, and is preferably 50% by weight or less, further preferably 30% by weight or less, most preferably 20% by weight or less, based on the weight of the organic particles.

[Salt]

In the battery electrode protective agent composition of one or more embodiments of the present invention, a salt serving as a source for various ions can be incorporated. By virtue of this, the ionic conductivity can be improved. An electrolyte used for the battery can be added, and, in the case of a lithium-ion battery, examples include lithium hydroxide, lithium silicate, lithium hexafluorophosphate, lithium tetrafluoroborate, lithium perchlorate, lithium bis(trifluoromethanesulfonyl)imide, lithium bis(pentafluoroethanesulfonyl)imide, and lithium trifluoromethanesulfonate; in the case of a sodium-ion battery, examples include sodium hydroxide and sodium perchlorate; in the case of a calcium-ion battery, examples include calcium hydroxide and calcium perchlorate; in the case of a magnesium-ion battery, examples include magnesium perchlorate; and, in the case of an electrical double layer capacitor, examples include tetraethylammonium tetrafluoroborate, triethylmethylammonium bis(trifluoromethanesulfonyl)imide, and tetraethylammonium bis(trifluoromethanesulfonyl)imide. The battery electrode or separator surface protective agent composition of one or more embodiments of the present invention contains, relative to 100 parts by weight of the total of the organic particles and binder, preferably 0.1 to 300 parts by weight, more preferably 0.5 to 200 parts by weight, especially preferably 1 to 100 parts by weight of the above salt. The salt may be added in the form of a powder or a porous material, or may be used in the state of being dissolved in the component to be incorporated.

[Liquid Having Ionic Properties]

The battery electrode or separator surface protective agent composition of one or more embodiments of the present invention can contain a liquid having ionic properties. The liquid having ionic properties can be a solution having the above salt dissolved in a solvent or an ionic liquid. With respect to the solution having the salt dissolved in a solvent, when the solvent is water, examples of salts include sodium chloride, potassium chloride, and lithium chloride, and, when the solvent is an organic material, such as dimethyl carbonate, examples of salts include lithium hexafluorophosphate and tetraethylammonium borofluoride.

Examples of ionic liquids include imidazolium salt derivatives, such as 1,3-dimethylimidazolium methyl sulfate, 1-ethyl-3-methylimidazolium bis(pentafluoroethylsulfonyl)imide, and 1-ethyl-3-methylimidazolium bromide; pyridinium salt derivatives, such as 3-methyl-1-propylpyridinium bis(trifluoromethylsulfonyl)imide and 1-butyl-3-methylpyridinium bis(trifluoromethylsulfonyl)imide; alkylammonium derivatives, such as tetrabutylammonium heptadecafluorooctanesulfonate and tetraphenylammonium methanesulfonate; phosphonium salt derivatives, such as tetrabutylphosphonium methanesulfonate; and conductivity imparting composite agents, such as a composite of polyalkylene glycol and lithium perchlorate.

The battery electrode or separator surface protective agent composition of one or more embodiments of the present invention contains, relative to 100 parts by weight of the organic particles, preferably 0.01 to 1,000 parts by weight, more preferably 0.1 to 100 parts by weight, especially preferably 0.5 to 50 parts by weight of a liquid having ionic properties.

[Coupling Agent]

The battery electrode or separator surface protective agent composition of one or more embodiments of the present invention can further comprise a coupling agent, and the above-mentioned coupling agent can be used.

The battery electrode or separator surface protective agent composition of one or more embodiments of the present invention contains, relative to 100 parts by weight of the organic particles, preferably 0.01 to 100 parts by weight, especially preferably 0.01 to 5 parts by weight of a coupling agent.

[Solvent]

The battery electrode or separator surface protective agent composition of one or more embodiments of the present invention can contain a solvent for controlling the fluidity. The solvent can be used of a type and in an amount such that all the fusible organic particles are not dissolved in the solvent, and the solvent can be selected or the amount of the solvent can be determined from the result of dissolution by mixing the organic particles actually used into the solvent. In this case, the portion of the organic particles dissolved in the solvent serves as a liquid binder, and, when the amount of the organic particles dissolved in the solvent is too large, the organic particles are inhibited from fusing with one another, and therefore the amount of the organic particles dissolved in the solvent is preferably 50% or less, more preferably 20% or less of the organic particles. The solvent can be dried by heating, or subjected to vacuum drying or freeze drying, or dried by a combination thereof. Further, a solvent for the electrolytic solution to be used in a battery can be preliminarily added to assist the impregnation with the electrolyte. Examples of solvents include hydrocarbons (such as propane, n-butane, n-pentane, isohexane, cyclohexane, n-octane, isooctane, benzene, toluene, xylene, ethylbenzene, amylbenzene, turpentine oil, and pinene), halogen hydrocarbons (such as methyl chloride, chloroform, carbon tetrachloride, ethylene chloride, methyl bromide, ethyl bromide, chlorobenzene, chlorobromomethane, bromobenzene, fluorodichloromethane, dichlorodifluoromethane, and difluorochloroethane), alcohols (such as methanol, ethanol, n-propanol, isopropanol, n-amyl alcohol, isoamyl alcohol, n-hexanol, n-heptanol, 2-octanol, n-dodecanol, nonanol, cyclohexanol, and glycidol), ethers and acetals (such as ethyl ether, dichloroethyl ether, isopropyl ether, n-butyl ether, diisoamyl ether, methyl phenyl ether, ethyl benzyl ether, furan, furfural, 2-methylfuran, cineol, and methylal), ketones (such as acetone, methyl ethyl ketone, methyl n-propyl ketone, methyl n-amyl ketone, diisobutyl ketone, phorone, isophorone, cyclohexanone, and acetophenone), esters (such as methyl formate, ethyl formate, propyl formate, methyl acetate, ethyl acetate, propyl acetate, n-amyl acetate, methylcyclohexyl acetate, methyl butyrate, ethyl butyrate, propyl butyrate, butyl stearate, propylene carbonate, diethyl carbonate, ethylene carbonate, and vinylene carbonate), polyhydric alcohols and derivatives thereof (such as ethylene glycol, ethylene glycol monomethyl ether, ethylene glycol monomethyl ether acetate, ethylene glycol monoethyl ether, methoxymethoxyethanol, ethylene glycol monoacetate, diethylene glycol, diethylene glycol monomethyl ether, propylene glycol, and propylene glycol monoethyl ether), fatty acids and phenols (such as formic acid, acetic acid, acetic anhydride, propionic acid, propionic anhydride, butyric acid, isovaleric acid, phenol, cresol, o-cresol, and xylenol), nitrogen compounds (such as nitromethane, nitroethane, 1-nitropropane, nitrobenzene, monomethylamine, dimethylamine, trimethylamine, monoethylamine, diamylamine, aniline, monomethylaniline, o-toluidine, o-chloroaniline, cyclohexylamine, dicyclohexylamine, monoethanolamine, formamide, N,N-dimethylformamide, acetamide, acetonitrile, pyridine, α-picoline, 2,4-lutidine, quinoline, and morpholine), sulfur, phosphorus and other compounds (such as carbon disulfide, dimethyl sulfoxide, 4,4-diethyl-1,2-dithiolane, dimethyl sulfide, dimethyl disulfide, methanethiol, propane sultone, triethyl phosphate, triphenyl phosphate, diethyl carbonate, ethylene carbonate, and amyl borate), inorganic solvents (such as liquid ammonia and silicone oil), and liquids, such as water.

In the battery electrode or separator surface protective agent composition of one or more embodiments of the present invention, according to the coating apparatus, a solvent can be added in an arbitrary ratio for adjusting the viscosity of the composition, and, from the viewpoint of obtaining excellent coating properties, the composition preferably has a viscosity of 1 to 10,000 mPa·s, more preferably a viscosity of 10 to 5,000 mPa·s, especially preferably a viscosity of 100 to 3,000 mPa·s.

[Stabilizer]

The battery electrode or separator surface protective agent composition of one or more embodiments of the present invention can further contain, if necessary, a stabilizer appropriately selected. Specific examples of stabilizers include phenolic antioxidants, such as 2,6-di-tert-butylphenol, 2,4-di-tert-butylphenol, 2,6-di-tert-butyl-4-ethylphenol, and 2,4-bis-(n-octylthio)-6-(4-hydroxy-3,5-di-tert-butylanilino)-1,3,5-triazine; aromatic amine antioxidants, such as an alkyldiphenylamine, N,N'-diphenyl-p-phenylenediamine, 6-ethoxy-2,2,4-trimethyl-1,2-dihydroquinoline, and N-phenyl-N'-isopropyl-p-phenylenediamine; sulfide hydroperoxide decomposers, such as dilauryl 3,3'-thiodipropionate, ditridecyl 3,3'-thiodipropionate, bis[2-methyl-4-{3-n-alkylthiopropionyloxy}-5-tert-butylphenyl]sulfide, and 2-mercapto-5-methylbenzimidazole; phosphorus hydroperoxide decomposers, such as tris(isodecyl)phosphite, phenyldiisooctyl phosphite, diphenylisooctyl phosphite, di(nonylphenyl)pentaerythritol diphosphite, 3,5-di-tert-butyl-4-hydroxybenzyl phosphate diethyl ester, and sodium bis(4-tert-butylphenyl)phosphate; salicylate light stabilizers, such as phenyl salicylate and 4-tert-octylphenyl salicylate; benzophenone light stabilizers, such as 2,4-dihydroxybenzophenone and 2-hydroxy-4-methoxybenzophenone-5-sulfonic acid; benzotriazole light stabilizers, such as 2-(2'-hydroxy-5'-methylphenyl)benzotriazole and 2,2'-methylenebis[4-(1,1,3,3-tetramethylbutyl)-6-(2N-benzotriazol-2-yl)phenol]; hindered amine light stabilizers, such as phenyl-4-piperidinyl carbonate and bis-[2,2,6,6-tetramethyl-4-piperidinyl]sebacate; Ni light stabilizers, such as [2,2'-thio-bis(4-t-octylphenolato)]-2-ethylhexylamine-nickel(II); cyanoacrylate light stabilizers; oxalic anilide light stabilizers; and fullerene, hydrogenated fullerene, and fullerene hydroxide. These stabilizers can be used individually or in combination.

The battery electrode or separator surface protective agent composition of one or more embodiments of the present invention contains, relative to 100 parts by weight of the organic particles, preferably 0.01 to 10 parts by weight, more preferably 0.05 to 5 parts by weight, especially preferably 0.1 to 1 part by weight of a stabilizer.

[Surfactant]

The battery electrode or separator surface protective agent composition of one or more embodiments of the present invention can further contain a surfactant, and, by virtue of this, the wetting and antifoaming properties of the composition can be controlled. An ionic surfactant can be used for improving the ionic conductivity.

With respect to the surfactant, examples of anionic surfactants include a soap, lauryl sulfate, a polyoxyethylene alkyl ether sulfate, an alkylbenzenesulfonate, a polyoxyethylene alkyl ether phosphate, a polyoxyethylene alkyl phenyl ether phosphate, an N-acylamino acid salt, an α-olefinsulfonate, an alkyl sulfate salt, an alkyl phenyl ether sulfate salt, a methyltaurine salt, trifluoromethanesulfonate salt, pentafluoroethanesulfonate salt, heptafluoropropanesulfonate salt, and nonafluorobutanesulfonate salt, and, as counter cations, sodium ions or lithium ions can be used. In a lithium-ion battery, more preferred are those of a lithium ion type, and, in a sodium-ion battery, more preferred are those of a sodium ion type.

Examples of amphoteric surfactants include an alkyldiaminoethylglycine hydrochloride, a 2-alkyl-N-carboxymethyl-N-hydroxyethylimidazolinium betaine, betaine lauryldimethylaminoacetate, coconut oil fatty acid amide propylbetaine, fatty acid alkylbetaine, sulfobetaine, and amine oxide, and examples of nonionic surfactants include alkyl ester compounds of polyethylene glycol, alkyl ether compounds, such as triethylene glycol monobutyl ether, ester compounds, such as polyoxysorbitan ester, alkylphenol compounds, fluorine compounds, and silicone compounds.

These surfactants can be used individually or in combination.

The battery electrode or separator surface protective agent composition of one or more embodiments of the present invention contains, relative to 100 parts by weight of the organic particles, preferably 0.01 to 50 parts by weight, more preferably 0.1 to 20 parts by weight, especially preferably 1 to 10 parts by weight of a surfactant.

[Production of the Battery Electrode or Separator Surface Protective Agent Composition]

The battery electrode or separator surface protective agent composition of one or more embodiments of the present invention can be obtained in the form of, e.g., a powder mixture having fluidity or a solution or suspension by mixing together the above-mentioned components and stirring the resultant mixture. The stirring can be made by appropriately selecting a stirring apparatus, such as a propeller mixer, a planetary mixer, a hybrid mixer, a kneader, an emulsifying homogenizer, or an ultrasonic homogenizer. Further, the stirring can be made while heating or cooling if necessary.

[Method for Protecting a Battery Electrode or Separator Surface]

The method for protecting a battery electrode or separator surface of one or more embodiments of the present invention comprises forming at least one layer of the above-mentioned battery electrode or separator surface protective agent composition on a battery electrode or separator surface, and solidifying the resultant composition layer by hot melt, whereupon the organic particles of the same type thermally fuse with one another to form a continuous phase. These layers can be formed by successively stacking them in the order of from the layer having a higher melting temperature to the layer having a lower melting temperature.

[Orientation in a Magnetic Field and/or an Electric Field]

In the method for protecting a battery electrode or separator surface of one or more embodiments of the present invention, the composition can be solidified in a state in which the materials incorporated are oriented using a magnetic field and/or an electric field. By virtue of this, a protective film having anisotropy in the ionic conductivity or mechanical strength and heat resistance can be formed. With respect to the above-mentioned polymer material, by stretching the polymer material, anisotropy can be given to the magnetic susceptibility and/or permittivity, and therefore the material can be oriented in a magnetic field and/or an electric field. Further, fibers having anisotropy, such as cellulose, can be used. Fibers prepared by stretching the polymer are pulverized to obtain particles, and the particles are oriented so that the direction of the major axis is perpendicular to the electrode surface, making it possible to improve the ionic conductivity. With respect to organic material crystals, those having crystal magnetism and/or permittivity anisotropy can be oriented in a magnetic field and/or an electric field, so that they can exhibit the effect as mentioned above. The magnetic field and/or electric field may be either a static magnetic field and/or electric field or a time-varying magnetic field and/or electric field, such as a rotating magnetic field and/or electric field, and a magnetic field and an electric field may be applied at the same time.

[Method 1 for Forming a Layer of the Protective Agent Composition]

In the method for protecting a battery electrode or separator surface of one or more embodiments of the present invention, with respect to the formation of a coating layer of the protective agent composition on a battery electrode or separator, when the protective agent composition is in the form of a powder having fluidity, an electrostatic powder coating method can be used, and, when the protective agent composition is of a type having a solvent added thereto, for example, a gravure coater, a slit die coater, a spray coater, or dipping can be used. The thickness of the coating layer is preferably in the range of from 0.01 to 100 μm, further preferably in the range of from 0.05 to 50 μm from the viewpoint of achieving excellent electrical properties and excellent adhesion properties. When the coating layer has too small a thickness, the insulation with respect to electronic conductivity becomes poor, increasing a danger of the occurrence of short-circuiting. Conversely, when the coating layer has too large a thickness, the resistance to ionic conductivity, which is proportionally increased according to the thickness of the coating layer, is increased to cause the charge/discharge characteristics of the battery to be poor.

[Method 2 for Forming a Layer of the Protective Agent Composition (Method for Forming a Film Using a Hollow Frame)]

In the method for protecting a battery electrode or separator surface of one or more embodiments of the present invention, a coating layer of the protective agent composition can be formed from a film prepared using a hollow frame. By forming an ionic conductive film from the protective agent composition using a hollow frame and then subjecting the formed film to adhere to a battery electrode surface or a separator surface, there can be formed a protective film which has a more uniform thickness than that of a conventional protective layer, and which is unlikely to suffer generation of a pinhole even when the thickness of the film is reduced. A thin film is formed using a hollow frame according to a procedure for forming soap bubbles, and therefore there are advantages: in that a very thin protective layer having no defect, such as a pinhole, can be formed on a battery electrode or separator surface; that the film is supported by a surface tension and hence suffers no generation of pinhole; that the film is uniform on a nano-level and hence the uneven surface of an electrode or separator causes no thick or thin portion in the protective layer film, making the electrode reaction uniform and increasing the life of the battery; and that a film having a thickness of several tens to several hundred nm can be formed with ease, and therefore the resistance caused due to ion permeation through the film can be reduced and the film advantageously follows the shape of the surface of an electrode or a separator. As mentioned above, a thin film is formed and then transferred, and therefore, even when the thin film is transferred onto an electrode surface having a portion protruding therefrom, the film exhibits high coverage on the surface, making it possible to remove a disadvantage in that the electrode surface is exposed to cause a defect in the protective film. The film can be continuously formed and transferred to an electrode or a separator, and nothing is in contact with an electrode or a separator, except the hollow frame, and therefore a physical damage to the surface can be reduced. The formed film can be dried and attached to an electrode or a separator, and thermally fused or little dissolved with a solvent and dried. Further, the film in a semidried state can be transferred to an electrode or a separator and dried or thermally fused. There is an advantage in that a battery can be provided using an easy process wherein the battery is advantageous not only in that it has high ionic conductivity, but also in that an electrochemical reaction uniformly proceeds on the electrode or separator surface, suppressing the deterioration of the battery characteristics. The film may be dried and then attached to an electrode and/or a separator and thermally fused, or the film in a wet state may be attached to an electrode and/or a separator and then dried or thermally fused. The battery electrode or separator surface protective film is used in a state in which part of the film adheres to at least the electrode surface and/or separator surface, and further part of the film may penetrate the inside of the electrode and/or the inside of the separator.

[Heat Fusion Method]

In the method for protecting a battery electrode or separator surface of one or more embodiments of the present invention, the composition is solidified by hot melt, whereupon the organic particles of the same type thermally fuse with one another to form a continuous phase. In the heat fusion through solidification, solidification can be made, whereupon the organic particles thermally fuse at a temperature at which the organic particles are completely molten, and solidification can be made in a state in which there are voids between the particles adhering to one another at points, whereupon only the surface of the organic particles is thermally dissolved and the particles fuse and adhere to one another and are cooled. In the former solidification upon heat fusion, there are many portions comprised of a continuous phase, and high ionic conductivity, high mechanical strength, and high heat resistance are achieved. In the latter solidification upon heat fusion, there are a little portions comprised of a continuous phase, and hence the ionic conductivity through the fused organic particles, mechanical strength, and heat resistance are poor, but the voids formed between the particles can be impregnated with an electrolytic solution to improve the ionic conductivity. Further, in the latter, a structure having the voids randomly disposed is formed, and therefore, when dendrite is generated, the randomly disposed voids inhibit the linear growth of dendrite, improving the effect of prevention of the occurrence of short-circuiting. As a heating fusion method for the hot melt, a known method, such as a method using hot air, a hot plate, an oven, an infrared ray, or ultrasonic fusion, can be used, and pressing the film while heating can increase the density of the protective agent layer. As a cooling method, a known method, such as air cooling, a method using cooling gas, or a method of pressing the film against a radiator, can be used.

[Crosslinking Method for Organic Particles]

In the method for protecting a battery electrode or separator surface of one or more embodiments of the present invention, at least one type of the organic particles can be allowed to undergo crosslinking upon heat fusion, and, by virtue of this, a phase having high mechanical strength and high heat resistance can be formed. The crosslinking may be completed upon heat fusion, the crosslinking may proceed with the passage of time after the heat fusion, or the crosslinking may be further effected by heating or using energy radiation after the heat fusion. The crosslinking can prevent the phase separation structure from being ruined due to re-melting when further heated.

[Electrode and/or Separator]

One or more embodiments of the present invention is a battery electrode and/or separator which is protected by the above-mentioned battery electrode or separator surface protective agent composition, or which is produced by the above-mentioned method for protecting a battery electrode or separator surface.

The battery electrode or separator protected by the battery electrode or separator surface protective agent composition of one or more embodiments of the present invention can be produced by coating a battery electrode or separator with the composition obtained by incorporating the above-mentioned components, and solidifying the composition by hot melt. As examples of the battery electrodes, there can be mentioned positive electrodes and/or negative electrodes for various types of batteries and electrical double layer capacitors, and at least one side of the electrode can be coated or impregnated with the battery electrode or separator surface protective agent composition. Examples of separators include porous materials made of polypropylene or polyethylene, and nonwoven fabric made of cellulose, polypropylene, or polyethylene, and both sides or one side of the separator can be coated or impregnated with the composition. The battery electrode or separator surface protective agent composition of one or more embodiments of the present invention can be used in the state of adhering to the opposite separator or electrode, and can be thermally fused by hot-press after assembling the battery.

[Battery]

One or more embodiments of the present invention is directed to a battery comprising a battery electrode and/or separator protected by the above-mentioned battery electrode or separator surface protective agent composition. The battery can be produced by a known method. Further, in the battery, the surface protective agent composition can be impregnated with an electrolytic solution to impart ionic conductivity, or the surface protective agent composition in the form of a solid electrolyte membrane obtained by imparting ionic conductivity to the composition per se can be incorporated into the battery.

EXAMPLES

Hereinbelow, one or more embodiments of the present invention will be described in more detail with reference to the following Examples, which should not be construed as limiting the scope of one or more embodiments of the present invention. The indication "part(s)" for the amount is given by weight unless otherwise specified.

Test Example 1

With respect to at least two types of organic particles fusible with one another, the phenomenon that when the composition is solidified by hot melt, the organic particles of the same type thermally fuse together to form a continuous phase and the organic particles of types different from each other do not thermally fuse to form a continuous phase but cause substantial phase separation was confirmed by the method described below.

(Preparation of Particles)

Various types of organic particles were obtained by dry or wet pulverization or spray drying a material dissolved in a solvent, and passed through 200 mesh and 300 mesh to prepare organic particles having a predetermined size. Test compositions were individually prepared from these organic particles.

(Dissolution Test)

The above-prepared test composition was applied onto an aluminum sheet so that the applied composition had a 420 mm disk form and a thickness of 1 mm. The aluminum sheet having the composition applied thereonto was placed on a hot plate heated to a temperature 20° C. higher than the temperature at which the organic particles having the highest softening temperature or melting temperature thermally fuse, and heated for one minute and then removed from the hot plate, followed by air cooling.

(Observation)

The state of the fusion of organic particles was examined under an optical microscope, and the case where the organic particles of the same type thermally fuse with one another and the organic particles of types different from each other do not uniformly fuse to form a single phase was considered as the combination of organic particles in one or more embodiments of the present invention that the organic particles of the same type fuse together to form a continuous phase and the organic particles of types different from each other cause substantial phase separation, and the results were described in the Examples.

FIG. 6 shows:

(a) a mixture of two types of organic particles which show substantial phase separation, which mixture is not heated (before heating) {dark particles: solid epoxy resin 1 (EPICLON HP-7200HH, manufactured by DIC Corporation; melting temperature: 88 to 98° C.; hydrogen bonding functional group value: 0.0005 mol/g or less), whitish transparent particles: cyanoethylated pullulan (Cyanoresin CR-S, manufactured by Shin-Etsu Chemical Co., Ltd.; softening temperature: 90 to 110° C.; hydrogen bonding functional group value: 0.0005 mol/g or less)}, and (b) the organic particles which show substantial phase separation, obtained after the heat fusion by heating the above particle mixture at 130° C. for one minute (the dark epoxy resin particles fuse with one another to form a continuous phase and the whitish cyanoethylated pullulan particles fuse with one another to form a continuous phase, but the epoxy resin particles and the cyanoethylated pullulan particles do not fuse with one another cause suffer phase separation).

When the state of phase separation was difficult to observe, a test was performed by adding rhodamine red in an amount of 0.5% to one type of the organic particles to color them.

Test Example 2

With respect to the lithium-ion secondary batteries produced in the below-described Examples and Comparative Examples, the following characteristics were measured.

(Measurement of Initial Capacity)

For obtaining an initial capacity, charging was conducted at a constant current of 0.01 mA until the voltage became 4.2 V, and then charging was conducted at a constant voltage of 4.2 V for 2 hours. Subsequently, discharging was conducted at a constant current of 0.01 mA until the voltage became 3.5 V. A series of the above operations was repeated three times, and the discharge capacity at the 3rd cycle was taken as an initial capacity.

(Initial Internal Resistance)

The potential of the cell obtained after measuring an initial capacity was increased to 4.2 V, and, as an initial internal resistance, an impedance at 1 kHz was measured with a voltage change of ±15 mV from the above potential as a center.

(Rate Characteristics)

Discharge rates were individually determined from the initial capacity, and a discharge capacity was measured for each of the discharge rates. In each charging operation, charging was conducted at a constant current over 10 hours until the voltage was increased to 4.2 V, and then charging was conducted at a constant voltage of 4.2 V for 2 hours. Subsequently, discharging was conducted at a constant current over 10 hours until the voltage became 3.5 V, and the discharge capacity obtained at that time was taken as a discharge capacity for 0.1 C. Next, the same charging operation was conducted and then, discharging was conducted at a current at which discharging was completed in one hour from the discharge capacity determined for 0.1 C, and the discharge capacity determined at that time was taken as a discharge capacity for 1 C. Similarly, discharge capacities for 3 C, 10 C, and 30 C were individually determined, and, taking the discharge capacity for 0.1 C as 100%, a capacity maintaining ratio was determined by making a calculation.

(Cycle Life)

A charge/discharge test in which charging was conducted at 1 C until the voltage became 4.2 V and charging was conducted at a constant voltage of 4.2 V for 2 hours and then discharging was conducted at 1 C until the voltage became 3.5 V was performed. In this instance, a percentage of the discharge capacity to that in the first discharge was calculated, and the number of charge/discharge cycles at which the capacity was reduced to less than 80% was determined as a life.

(Heat Resistance Insulation Test)

A test was performed in which charging was conducted at 1 C until the voltage became 4.2 V, and charging was conducted at a constant voltage of 4.2 V for 2 hours, and the resultant battery in the full charge state was increased in temperature from 25 to 260° C. at a rate of 10° C. per hour, and then cooled to about 25° C. at a rate of 20° C. per hour, and a resistance after the durability test was checked by the above-mentioned (internal resistance) measurement method. Evaluations were made in accordance with the following criteria.

The impedance at 1 kHz is:
A 10 MΩ or more
B: 100 to 10 MΩ
C: 1 to 100 kΩ
D: Less than 1 kΩ

(Observation of Heat Resistance Appearance)

A test method was the same as the above-mentioned heat resistance insulation test, and the battery obtained after the test was disassembled to examine the state of the inside. Evaluations were made in accordance with the following criteria.

A: The positive electrode and negative electrode are not directly touching and the insulating state is maintained, and the battery electrode protective layer is adhering to the electrode and/or separator.

B: The positive electrode and negative electrode are not directly touching and the insulating state is maintained, but the battery electrode protective layer suffers partial lifting and is not peeled off.

C: The removal proceeds and a part of the positive and negative electrodes is exposed.

D: The positive and negative electrodes are touching, so that short-circuiting occurs.

Example 1

In Example 1, a method is described in which a lithium-ion secondary battery is produced using an electrode having a negative electrode coated with the battery electrode or separator surface protective agent composition which comprises two types of organic particles.

(Production of the Battery Electrode or Separator Surface Protective Agent Composition)
(Preparation of Fusible Organic Particles 1)

Cyanoethylated pullulan (Cyanoresin CR-S, manufactured by Shin-Etsu Chemical Co., Ltd.; softening temperature: 90 to 110° C.; hydrogen bonding functional group value: 0.0005 mol/g or less) was pulverized by means of Nano Jetmizer (NJ-30, manufactured by Aishin Nano Technologies Co., Ltd.) to prepare cyanoethylated pullulan particles having an average particle diameter of 3 μm.

(Preparation of Fusible Organic Particles 2)

A partially saponified polyvinyl alcohol (PVA-205, manufactured by Kuraray Co., Ltd.; hydrogen bonding functional group value: about 0.019 mol/g):ethylene glycol=70:30 mixture (softening temperature: 150 to 170° C.) was pulverized by means of Nano Jetmizer (NJ-30, manufactured by Aishin Nano Technologies Co., Ltd.) to prepare particles having an average particle diameter of 2 μm.

(Mixing of the Two Types of Fusible Particles)

In a V blender were placed 700 g of the above-prepared organic particles 1 and 300 g of the above-prepared organic particles 2, and the resultant mixture was stirred until it became uniform to obtain a powder mixture having fluidity as the battery electrode or separator surface protective agent composition.

(Production of a Positive Electrode)

In a 10 L planetary mixer equipped with a cooling jacket were placed 540 parts of a 15% NMP solution of PVdF (Kureha KF Polymer #1120, manufactured by Kureha Corporation), 1,150 parts of lithium cobalt oxide (C-5H, manufactured by Nippon Chemical Industrial Co., Ltd.), 110 parts of acetylene black (DENKA BLACK HS-100, manufactured by Denki Kagaku Kogyo Kabushiki Kaisha), and 5,200 parts of NMP, and the resultant mixture was stirred while cooling so that the temperature of the mixture did not exceed 30° C. until the mixture became uniform. The resultant active material was applied to a rolled aluminum current collector (manufactured by Nippon Foil Mfg. Co., Ltd.; width: 300 mm; thickness: 20 μm) so that the applied material had a width of 180 mm and a thickness of 200 μm, and dried in a hot-air oven at 160° C. for 30 seconds. The resultant current collector was roll-pressed at a linear pressure of 600 kgf/cm. The positive electrode active material layer formed after pressed had a thickness of 21 μm.

(Production of a Negative Electrode)

In a 10 L planetary mixer equipped with a cooling jacket were placed 540 parts of a 15% NMP solution of PVdF (Kureha KF Polymer #9130, manufactured by Kureha Corporation), 1,180 parts of graphite (GR-15, manufactured by Nippon Graphite Industries, Ltd.), and 4,100 parts of NMP, and the resultant mixture was stirred while cooling so that the temperature of the mixture did not exceed 30° C. until the mixture became uniform. The resultant active material was applied to a rolled copper foil current collector (manufactured by Nippon Foil Mfg. Co., Ltd.; width: 300 mm; thickness: 20 μm) so that the applied material had a width of 180 mm and a thickness of 200 μm, and dried in a hot-air oven at 100° C. for 2 minutes. The resultant current collector was roll-pressed at a linear pressure of 400 kgf/cm. The negative electrode active material layer formed after pressed had a thickness of 27 μm.

(Production of a Negative Electrode Coated with the Battery Electrode or Separator Surface Protective Agent Composition)

The negative electrode was sprayed for powder coating with the above-prepared powder mixture, and heated in a nitrogen gas atmosphere at 180° C. for 60 seconds to produce a negative electrode coated with the battery electrode or separator surface protective agent composition having a thickness of 15 μm.

(Examination of Mutual Fusion State)

Examination under an optical microscope confirmed that organic particles 1 fused with one another to form a continuous phase and organic particles 2 fused with one another to form a continuous phase, but organic particles 1 and organic particles 2 caused phase separation and did not together form a continuous phase.

(Production of a Lithium-Ion Secondary Battery)

Each of the positive electrode and the negative electrode coated with the battery electrode protective agent composition was cut into 40 mm×50 mm so that a 10 mm width region having no active material layer in both ends was included at the short side, and an aluminum tab and a nickel tab were welded by resistance welding to the metal exposed portions of the positive electrode and the negative electrode, respectively. A separator (#2400, manufactured by Celgard Co., Ltd.) was cut into a size having a width of 45 mm and a length of 120 mm, and folded in three and the positive electrode and negative electrode were disposed between the folded separator so that the positive electrode and negative electrode faced to each other, and the resultant material was disposed between an aluminum laminate cell folded in half having a width of 50 mm and a length of 100 mm, and a sealant was placed between the portions with which the tabs for the individual electrodes were in contact, and then the sealant portion and the sides perpendicular to the sealant portion were subjected to heat lamination to obtain the cell in a bag form. The resultant cell was subjected to vacuum drying in a vacuum oven at 100° C. for 12 hours, and then vacuum-impregnated with a 1 M electrolytic solution comprising lithium hexafluorophosphate/EC:DEC=1:1 (LBG-96533, manufactured by Kishida Chemical Co., Ltd.) in a dry glove box, and then the excess electrolytic solution was withdrawn, followed by sealing using a vacuum sealer, to produce a lithium-ion battery.

Example 2

In Example 2, a method is described in which a lithium-ion secondary battery is produced using an electrode having a negative electrode coated with the battery electrode or separator surface protective agent composition which comprises two types of organic particles.

(Production of the Protective Agent Composition for a Battery Electrode)
(Preparation of Fusible Organic Particles 1)

A 15% N-methylpyrrolidone solution of polyvinylidene fluoride (Kureha KF Polymer #1120, manufactured by Kureha Corporation; softening temperature: 160 to 180° C.; hydrogen bonding functional group value: 0.0001 mol/g or less) was subjected to spray drying to prepare polyvinylidene fluoride particles having an average particle diameter of 3 μm.
(Preparation of Fusible Organic Particles 2)
Organic particles 2 were prepared by the same method as in Example 1.
(Mixing of the Two Types of Fusible Particles)
A powder mixture was prepared as the battery electrode or separator surface protective agent composition by the same method as in Example 1.
(Production of a Positive Electrode)
A positive electrode was produced by the same method as in Example 1.
(Production of a negative electrode)
A negative electrode was produced by the same method as in Example 1.
(Production of a Negative Electrode Coated with the Battery Electrode or Separator Surface Protective Agent Composition)
The negative electrode was sprayed for powder coating with the above-prepared powder mixture, and heated in a nitrogen gas atmosphere at 180° C. for 60 seconds to produce a negative electrode coated with the battery electrode or separator surface protective agent composition having a thickness of 15 μm.
(Examination of Mutual Fusion State)
Examination under an optical microscope confirmed that organic particles 1 fused with one another to form a continuous phase and organic particles 2 fused with one another to form a continuous phase, but organic particles 1 and organic particles 2 caused phase separation and did not together form a continuous phase.
(Production of a Lithium-Ion Secondary Battery)
A lithium-ion secondary battery was produced by substantially the same method as in Example 1 except that the above-prepared mixture of the two types of particles was used.

Example 3

In Example 3, a method is described in which a lithium-ion secondary battery is produced using an electrode having a negative electrode coated with the battery electrode or separator surface protective agent composition which comprises two types of organic particles and a solvent.
(Preparation of Fusible Organic Particles 1)
Organic particles 1 were prepared by the same method as in Example 2.
(Preparation of Fusible Organic Particles 2)
Organic particles 2 were prepared by the same method as in Example 1.
(Preparation of a Composition Comprising the Two Types of Fusible Particles)
6,000 g of 2-methoxyethoxyethyl acetate, 700 g of the above-prepared organic particles 1, and 300 g of the above-prepared organic particles 2 were placed in a 10 L beaker and stirred by means of a propeller mixer until the resultant mixture became uniform to obtain a liquid composition as the battery electrode or separator surface protective agent composition.
(Production of a Positive Electrode)
A positive electrode was produced by the same method as in Example 1.
(Production of a Negative Electrode)
A negative electrode was produced by the same method as in Example 1.
(Production of a Negative Electrode Coated with the Battery Electrode or Separator Surface Protective Agent Composition)
The above-obtained liquid composition was applied to the negative electrode using an applicator, and heated in a nitrogen gas atmosphere at 180° C. for 60 seconds to produce a negative electrode coated with the battery electrode or separator surface protective agent composition having a thickness of 15 μm.
(Examination of Mutual Fusion State)
Examination under an optical microscope confirmed that organic particles 1 fused with one another to form a continuous phase and organic particles 2 fused with one another to form a continuous phase, but organic particles 1 and organic particles 2 caused phase separation and did not together form a continuous phase.
(Production of a Lithium-Ion Secondary Battery)
A lithium-ion secondary battery was produced by substantially the same method as in Example 1 except that the above-produced negative electrode coated with the battery electrode or separator surface protective agent composition was used.

Example 4

In Example 4, a method is described in which a lithium-ion secondary battery is produced using an electrode having a negative electrode coated with the battery electrode or separator surface protective agent composition which comprises three types of organic particles and a solvent, wherein, among the three types of organic particles, particles 2 and particles 3 react with each other upon heating to cause crosslinking.
(Preparation of Fusible Organic Particles 1)
Organic particles 1 were prepared by the same method as in Example 2.
(Preparation of Fusible Organic Particles 2)
Organic particles 2 were prepared by the same method as in Example 1.
(Preparation of Fusible Organic Particles 3)
Butanetetracarboxylic acid (melting temperature: 180° C.; hydrogen bonding functional group value: 0.017 mol/g) was pulverized by means of Nano Jetmizer (NJ-30, manufactured by Aishin Nano Technologies Co., Ltd.) to prepare butanetetracarboxylic acid particles having an average particle diameter of 3 μm.
(Preparation of a Composition Comprising the Three Types of Fusible Particles)
6,000 g of 2-methoxyethoxyethyl acetate, 700 g of the above-prepared organic particles 1,300 g of the above-prepared organic particles 2, and 100 g of the above-prepared organic particles 3 were placed in a 10 L beaker and stirred by means of a propeller mixer until the resultant mixture became uniform to obtain a liquid composition as the battery electrode or separator surface protective agent composition.
(Production of a Positive Electrode)
A positive electrode was produced by the same method as in Example 1.
(Production of a Negative Electrode)
A negative electrode was produced by the same method as in Example 1.

(Production of a Negative Electrode Coated with the Battery Electrode or Separator Surface Protective Agent Composition)

The above-obtained liquid composition was applied to the negative electrode using an applicator, and heated in a nitrogen gas atmosphere at 180° C. for 60 seconds to produce a negative electrode coated with the battery electrode or separator surface protective agent composition having a thickness of 15 μm.

(Examination of Mutual Fusion State)

Examination under an optical microscope confirmed that organic particles 1 fused with one another to form a continuous phase and organic particles 2 fused with one another to form a continuous phase, but organic particles 1 and organic particles 2 caused phase separation and did not together form a continuous phase.

(Production of a Lithium-Ion Secondary Battery)

A lithium-ion secondary battery was produced by substantially the same method as in Example 1 except that the above-produced negative electrode coated with the battery electrode protective agent composition was used.

Example 5

In Example 5, a method is described in which a lithium-ion secondary battery is produced using an electrode having a negative electrode coated with the battery electrode or separator surface protective agent composition which comprises three types of organic particles and water, wherein, among the three types of organic particles, particles 2 and particles 3 react with each other upon heating to cause crosslinking.

(Preparation of Fusible Organic Particles 1)

Cyanoethylated pullulan particles were prepared by the same method as in Example 1.

(Preparation of Fusible Organic Particles 2)

Solid epoxy resin 1 (EPICLON HP-7200HH, manufactured by DIC Corporation; melting temperature: 88 to 98° C.; hydrogen bonding functional group value: 0.0005 mol/g or less) was pulverized by means of Nano Jetmizer (NJ-30, manufactured by Aishin Nano Technologies Co., Ltd.) to prepare particles having an average particle diameter of 2 μm.

(Preparation of Fusible Organic Particles 3)

7,11-Octadecadiene-1,18-dicarbohydrazide (AJICURE UDH, manufactured by Ajinomoto Fine-Techno Co., Inc.; melting temperature: 160° C.; hydrogen bonding functional group value: 0.016 mol/g) was pulverized by means of Nano Jetmizer (NJ-30, manufactured by Aishin Nano Technologies Co., Ltd.) to prepare 7,11-octadecadiene-1,18-dicarbohydrazide particles having an average particle diameter of 3 m.

(Preparation of a Composition Comprising the Three Types of Fusible Particles)

6,000 g of water, 700 g of the above-prepared organic particles 1, 300 g of the above-prepared organic particles 2, and 150 g of the above-prepared organic particles 3 were placed in a 10 L beaker and stirred by means of a propeller mixer until the resultant mixture became uniform to obtain a liquid composition as the battery electrode or separator surface protective agent composition.

(Production of a Positive Electrode)

A positive electrode was produced by the same method as in Example 1.

(Production of a Negative Electrode)

A negative electrode was produced by the same method as in Example 1.

(Production of a Negative Electrode Coated with the Battery Electrode or Separator Surface Protective Agent Composition)

The above-obtained liquid composition was applied to the negative electrode using an applicator, and heated in a nitrogen gas atmosphere at 180° C. for 60 seconds to produce a negative electrode coated with the battery electrode or separator surface protective agent composition having a thickness of 15 μm.

(Examination of Mutual Fusion State)

Examination under an optical microscope confirmed that organic particles 1 fused with one another to form a continuous phase and organic particles 2 fused with one another to form a continuous phase, but organic particles 1 and organic particles 2 caused phase separation and did not together form a continuous phase.

(Production of a Lithium-Ion Secondary Battery)

A lithium-ion secondary battery was produced by substantially the same method as in Example 1 except that the above-produced negative electrode coated with the battery electrode or separator surface protective agent composition was used.

Example 6

In Example 6, a method is described in which a lithium-ion secondary battery is produced using an electrode having a negative electrode coated with the battery electrode or separator surface protective agent composition which comprises two types of organic particles and water, wherein, among the two types of organic particles, one type of the organic particles contain a thermal initiation catalyst and undergo a reaction upon heating to cause crosslinking.

(Preparation of Fusible Organic Particles 1)

Cyanoethylated pullulan particles were prepared by the same method as in Example 1.

(Preparation of Fusible, Thermally Crosslinkable Organic Particles 2)

1,000 Parts of toluene and 100 parts of solid epoxy resin 1 (EPICLON HP-7200HH, manufactured by DIC Corporation; melting temperature: 88 to 98° C.; hydrogen bonding functional group value: 0.0005 mol/g or less) were placed in a 10 L beaker and stirred by means of a propeller mixer until the resultant mixture became uniform, and then 5 parts of a latent photoinitiator (San-Aid SI-180L, manufactured by Sanshin Chemical Industry Co., Ltd.; thermal cure starting temperature: about 180° C.) was added thereto and the resultant mixture was further stirred until the mixture became uniform. Then, toluene was removed from the mixture under a reduced pressure at room temperature under light shielding conditions to obtain a solid material. The obtained solid material was pulverized by means of the above-mentioned pulverizer to prepare thermally crosslinkable organic particles having an average particle diameter of 3 μm.

(Preparation of a Composition Comprising the Two Types of Fusible Particles)

6,000 g of water, 700 g of the above-prepared organic particles 1, and 300 g of the above-prepared organic particles 2 were placed in a 10 L beaker and stirred by means of a propeller mixer until the resultant mixture became uniform to obtain a liquid composition as the battery electrode or separator surface protective agent composition.

(Production of a Positive Electrode)

A positive electrode was produced by the same method as in Example 1.

(Production of a Negative Electrode)

A negative electrode was produced by the same method as in Example 1.

(Production of a Negative Electrode Coated with the Battery Electrode or Separator Surface Protective Agent Composition)

The above-obtained liquid composition was applied to the negative electrode using an applicator, and heated in a nitrogen gas atmosphere at 180° C. for 60 seconds to produce a negative electrode coated with the battery electrode or separator surface protective agent composition having a thickness of 15 μm.

(Examination of Mutual Fusion State)

Examination under an optical microscope confirmed that organic particles 1 fused with one another to form a continuous phase and organic particles 2 fused with one another to form a continuous phase, but organic particles 1 and organic particles 2 caused phase separation and did not together form a continuous phase.

(Production of a Lithium-Ion Secondary Battery)

A lithium-ion secondary battery was produced by substantially the same method as in Example 1 except that the above-produced negative electrode coated with the battery electrode or separator surface protective agent composition was used.

Example 7

In Example 7, a method is described in which a lithium-ion secondary battery is produced using an electrode having a negative electrode coated with the battery electrode or separator surface protective agent composition which comprises two types of organic particles and water, and which is of a type such that, among the two types of organic particles, one type of the organic particles contain a thermal initiation catalyst and the crosslinking proceeds before heat fusion of the other type of the organic particles.

(Preparation of Fusible Organic Particles 1)

Cyanoethylated pullulan particles were prepared by the same method as in Example 1.

(Preparation of Fusible, Thermally Crosslinkable Organic Particles 2)

1,000 Parts of toluene, 100 parts of solid epoxy resin 1 (EPICLON HP-7200HH, manufactured by DIC Corporation; melting temperature: 88 to 98° C.; hydrogen bonding functional group value: 0.0005 mol/g or less), and 10 parts of an oxetane (ARON OXETANE OXT-211, manufactured by Toagosei Co., Ltd.; liquid state; hydrogen bonding functional group value: 0.0005 mol/g or less) were placed in a 10 L beaker and stirred by means of a propeller mixer until the resultant mixture became uniform, and then 8 parts of a latent photoinitiator (San-Aid SI-60, manufactured by Sanshin Chemical Industry Co., Ltd.; thermal cure starting temperature: about 60° C.) was added thereto and the resultant mixture was further stirred until the mixture became uniform. Then, toluene was removed from the mixture under a reduced pressure at room temperature under light shielding conditions to obtain a solid material (melting temperature: 40 to 50° C.). The obtained solid material was pulverized by means of the above-mentioned pulverizer to prepare thermally crosslinkable organic particles having an average particle diameter of 3 μm.

(Preparation of a Composition Comprising the Two Types of Fusible Particles)

6,000 g of water, 700 g of the above-prepared organic particles 1, and 300 g of the above-prepared organic particles 2 were placed in a 10 L beaker and stirred by means of a propeller mixer until the resultant mixture became uniform to obtain a liquid composition as the battery electrode or separator surface protective agent composition.

(Production of a Positive Electrode)

A positive electrode was produced by the same method as in Example 1.

(Production of a Negative Electrode)

A negative electrode was produced by the same method as in Example 1.

(Production of a Negative Electrode Coated with the Battery Electrode or Separator Surface Protective Agent Composition)

The above-obtained liquid composition was applied to the negative electrode using an applicator, and heated in a nitrogen gas atmosphere at 120° C. for 60 seconds to produce a negative electrode coated with the battery electrode or separator surface protective agent composition having a thickness of 15 μm.

(Examination of Mutual Fusion State)

Examination under an optical microscope confirmed that organic particles 1 fused with one another to form a continuous phase and organic particles 2 fused with one another to form a continuous phase, but organic particles 1 and organic particles 2 caused phase separation and did not together form a continuous phase.

(Production of a Lithium-Ion Secondary Battery)

A lithium-ion secondary battery was produced by substantially the same method as in Example 1 except that the above-produced negative electrode coated with the battery electrode or separator surface protective agent composition was used.

Example 8

In Example 8, a method is described in which a lithium-ion secondary battery is produced using an electrode having a negative electrode coated with the battery electrode or separator surface protective agent composition which comprises two types of organic particles and water, and which is of a type such that, among the two types of organic particles, one type of the organic particles contain a thermal initiation catalyst and the crosslinking proceeds before heat fusion of the other type of the organic particles.

(Preparation of Fusible Organic Particles 1)

Polyethylene oxide (ALKOX E-300, manufactured by Meisei Chemical Works, Ltd.; softening temperature: 65 to 70° C.; hydrogen bonding functional group value: 0.0005 mol/g or less) was pulverized by means of Nano Jetmizer (NJ-30, manufactured by Aishin Nano Technologies Co., Ltd.) to prepare polyethylene oxide particles having an average particle diameter of 4 μm.

(Preparation of Fusible, Thermally Crosslinkable Organic Particles 2)

Thermally crosslinkable epoxy resin particles were prepared by the same method as in Example 7.

(Preparation of a Composition Comprising the Two Types of Fusible Particles)

A liquid composition was obtained as the battery electrode or separator surface protective agent composition by substantially the same method as in Example 7 except that the above-prepared fusible organic particles 1 were used.

(Production of a Positive Electrode)

A positive electrode was produced by the same method as in Example 1.

(Production of a Negative Electrode)

A negative electrode was produced by the same method as in Example 1.

(Production of a Negative Electrode Coated with the Battery Electrode or Separator Surface Protective Agent Composition)

A negative electrode coated with the battery electrode or separator surface protective agent composition having a thickness of 15 μm was produced by substantially the same method as in Example 7 except that the above-obtained liquid composition was used.

(Examination of Mutual Fusion State)

Examination under an optical microscope confirmed that organic particles 1 fused with one another to form a continuous phase and organic particles 2 fused with one another to form a continuous phase, but organic particles 1 and organic particles 2 caused phase separation and did not together form a continuous phase.

(Production of a Lithium-Ion Secondary Battery)

A lithium-ion secondary battery was produced by substantially the same method as in Example 1 except that the above-produced negative electrode coated with the battery electrode or separator surface protective agent composition was used.

Example 9

In Example 9, a method is described in which a lithium-ion secondary battery is produced using an electrode having a negative electrode coated with the battery electrode or separator surface protective agent composition which comprises two types of organic particles and water, and which is of a type such that, among the two types of organic particles, one type of the organic particles contain a thermal initiation catalyst and the crosslinking proceeds before heat fusion of the other type of the organic particles.

(Preparation of Fusible Organic Particles 1)

Polyethylene oxide particles were prepared by the same method as in Example 8.

(Preparation of Fusible, Thermally Crosslinkable Organic Particles 2)

1,000 Parts of toluene, 100 parts of a solid urethane resin (Art-Resin UN-905, manufactured by Negami Chemical Industrial Co., Ltd.; melting temperature: 35 to 45° C.; hydrogen bonding functional group value: 0.0045 mol/g or less), and 8 parts of a peroxide (PERCURE O, manufactured by NOF Corporation; thermal reaction temperature: about 40° C.) were placed in a 10 L beaker and stirred by means of a propeller mixer until the resultant mixture became uniform. Then, toluene was removed from the mixture under a reduced pressure at room temperature under light shielding conditions to obtain a semisolid material (melting temperature: 35 to 45° C.). The obtained semisolid material was frozen using liquid nitrogen and pulverized by a high-speed rotary cutter pulverizer to obtain particles.

(Preparation of a Composition Comprising the Two Types of Fusible Particles)

6,000 g of water and 300 g of the above-prepared coarse particles were placed in a 10 L beaker, and pulverized by stirring using a homogenizer until the resultant particles had a particle diameter of 5 μm, and then the above-prepared organic particles 1 were added to the resultant mixture and stirred by means of a propeller mixer until the mixture became uniform to obtain a liquid composition as the battery electrode or separator surface protective agent composition.

(Production of a Positive Electrode)

A positive electrode was produced by the same method as in Example 1.

(Production of a Negative Electrode)

A negative electrode was produced by the same method as in Example 1.

(Production of a Negative Electrode Coated with the Battery Electrode or Separator Surface Protective Agent Composition)

A negative electrode coated with the battery electrode or separator surface protective agent composition having a thickness of 15 μm was produced by substantially the same method as in Example 7 except that the above-obtained liquid composition was used.

(Examination of Mutual Fusion State)

Examination under an optical microscope confirmed that organic particles 1 fused with one another to form a continuous phase and organic particles 2 fused with one another to form a continuous phase, but organic particles 1 and organic particles 2 caused phase separation and did not together form a continuous phase.

(Production of a Lithium-Ion Secondary Battery)

A lithium-ion secondary battery was produced by substantially the same method as in Example 1 except that the above-produced negative electrode coated with the battery electrode or separator surface protective agent composition was used.

Example 10

In Example 10, a method is described in which a lithium-ion secondary battery is produced using an electrode having a negative electrode coated with the battery electrode or separator surface protective agent composition which comprises two types of organic particles and water, wherein, among the two types of organic particles, one type of the organic particles contain a photoinitiation catalyst and cause photo-crosslinking before heat fusion of the other type of the organic particles.

(Preparation of Fusible Organic Particles 1)

Polyethylene oxide particles were prepared by the same method as in Example 8.

(Preparation of Fusible, Photo-Crosslinkable Organic Particles 2)

1,000 Parts of toluene, 100 parts of a solid urethane resin (Art-Resin UN-905, manufactured by Negami Chemical Industrial Co., Ltd.; melting temperature: 35 to 45° C.; hydrogen bonding functional group value: 0.0005 mol/g or less), and 10 parts of a photoinitiator (IRGACURE 184, manufactured by BASF SE) were placed in a 10 L beaker and stirred by means of a propeller mixer until the resultant mixture became uniform. Then, toluene was removed from the mixture under a reduced pressure at room temperature under light shielding conditions to obtain a semisolid material (melting temperature: 35 to 45° C.). The obtained semisolid material was frozen using liquid nitrogen and pulverized by a high-speed rotary cutter pulverizer to obtain particles.

(Preparation of a Composition Comprising the Two Types of Fusible Particles)

A liquid composition was obtained as the battery electrode or separator surface protective agent composition by substantially the same method as in Example 9 except that the above-prepared photo-crosslinkable organic particles 2 were used.

(Production of a Positive Electrode)

A positive electrode was produced by the same method as in Example 1.

(Production of a Negative Electrode)

A negative electrode was produced by the same method as in Example 1.

(Production of a Negative Electrode Coated with the Battery Electrode or Separator Surface Protective Agent Composition)

The above-obtained liquid composition was applied to the negative electrode using an applicator, and heated in a nitrogen gas atmosphere at 55° C. for 60 seconds, and then irradiated with an ultraviolet light (365 nm, 100 mW/cm$^2$× 100 seconds) to photoset the fusing phase in the photo-crosslinkable organic particles, and then heated with hot air at 80° C. for 60 seconds so that the organic particles 2 fused with one another, followed by cooling, to produce a negative electrode coated with the battery electrode or separator surface protective agent composition having a thickness of 15 μm.

(Examination of Mutual Fusion State)

Examination under an optical microscope confirmed that organic particles 1 fused with one another to form a continuous phase and organic particles 2 fused with one another to form a continuous phase, but organic particles 1 and organic particles 2 caused phase separation and did not together form a continuous phase.

(Production of a Lithium-Ion Secondary Battery)

A lithium-ion secondary battery was produced by substantially the same method as in Example 1 except that the above-produced negative electrode coated with the battery electrode or separator surface protective agent composition was used.

Example 11

In Example 11, a method is described in which a lithium-ion secondary battery is produced using an electrode having a negative electrode coated with the battery electrode or separator surface protective agent composition which comprises two types of organic particles and water, wherein both the two types of thermally fusible organic particles are thermally crosslinkable.

(Preparation of Fusible, Thermally Crosslinkable Organic Particles 1)

Thermally fusible epoxy resin particles were prepared by the same method as in Example 7 for thermally fusible organic particles 2.

(Preparation of Fusible, Thermally Crosslinkable Organic Particles 2)

Thermally crosslinkable urethane acrylate resin coarse particles were obtained by the same method as in Example 9.

(Preparation of a Composition Comprising the Two Types of Fusible Particles)

A liquid composition was obtained as the battery electrode or separator surface protective agent composition by substantially the same method as in Example 9 except that the above-prepared organic particles 1 and organic particles 2 were used.

(Production of a Positive Electrode)

A positive electrode was produced by the same method as in Example 1.

(Production of a Negative Electrode)

A negative electrode was produced by the same method as in Example 1.

(Production of a Negative Electrode Coated with the Battery Electrode or Separator Surface Protective Agent Composition)

A negative electrode coated with the battery electrode or separator surface protective agent composition having a thickness of 15 μm was produced by substantially the same method as in Example 7 except that the above-obtained liquid composition was used, and that the heating conditions were changed to those at 100° C. for 60 seconds.

(Examination of Mutual Fusion State)

Examination under an optical microscope confirmed that organic particles 1 fused with one another to form a continuous phase and organic particles 2 fused with one another to form a continuous phase, but organic particles 1 and organic particles 2 caused phase separation and did not together form a continuous phase.

(Production of a Lithium-Ion Secondary Battery)

A lithium-ion secondary battery was produced by substantially the same method as in Example 1 except that the above-produced negative electrode coated with the battery electrode or separator surface protective agent composition was used.

Example 12

In Example 12, a method is described in which a lithium-ion secondary battery is produced using an electrode having a negative electrode coated with the battery electrode or separator surface protective agent composition which comprises organic particles containing inorganic particles.

(Preparation of Fusible Organic Particles 1 Containing Inorganic Particles)

4,000 g of water, 20 g of the above-mentioned cyanoethylated pullulan, and 180 g of silica particles (NanoTek SiO$_2$, manufactured by C. I. Kasei Co., Ltd.; pH for isoelectric point: 1.8) were placed in a 10 L beaker and stirred by means of a propeller mixer until the resultant mixture became uniform to obtain a dispersion. The obtained dispersion was dispersed using a bead mill (dispersed in a manner of circulation using 0.3 mm zirconia beads at a circumferential speed of 15 m at a temperature of 25° C. for one hour). The resultant dispersion was dried in a vacuum oven at 80° C. to obtain a mixture solid. The obtained mixture solid was coarsely pulverized by a high-speed rotary cutter pulverizer, and then pulverized by means of Nano Jetmizer (NJ-30, manufactured by Aishin Nano Technologies Co., Ltd.) to prepare mixture particles having an average particle diameter of 4 μm.

(Preparation of Fusible, Thermally Crosslinkable Organic Particles 2)

Thermally crosslinkable epoxy resin particles were obtained by the same method as in Example 7.

(Preparation of a Composition Comprising the Two Types of Fusible Particles)

A liquid composition was obtained as the battery electrode or separator surface protective agent composition by substantially the same method as in Example 7 except that the above-prepared organic particles 1 and organic particles 2 were used.

(Production of a Positive Electrode)

A positive electrode was produced by the same method as in Example 1.

(Production of a Negative Electrode)

A negative electrode was produced by the same method as in Example 1.

(Production of a Negative Electrode Coated with the Battery Electrode or Separator Surface Protective Agent Composition)

A negative electrode coated with the battery electrode or separator surface protective agent composition having a thickness of 15 μm was produced by substantially the same method as in Example 7 except that the above-obtained liquid composition was used.

(Examination of Mutual Fusion State)

Examination under an optical microscope confirmed that organic particles 1 fused with one another to form a continuous phase and organic particles 2 fused with one another to form a continuous phase, but organic particles 1 and organic particles 2 caused phase separation and did not together form a continuous phase.

(Production of a Lithium-Ion Secondary Battery)

A lithium-ion secondary battery was produced by substantially the same method as in Example 1 except that the above-produced negative electrode coated with the battery electrode or separator surface protective agent composition was used.

Example 13

A lithium-ion secondary battery was produced by substantially the same method as in Example 11 except that, instead of the silica in Example 12, boehmite (C01, manufactured by Taimei Chemicals Co., Ltd.; pH for isoelectric point: 7.5) was used.

(Examination of Mutual Fusion State)

Examination under an optical microscope confirmed that organic particles 1 fused with one another to form a continuous phase and organic particles 2 fused with one another to form a continuous phase, but organic particles 1 and organic particles 2 caused phase separation and did not together form a continuous phase.

Example 14

A lithium-ion secondary battery was produced by substantially the same method as in Example 11 except that, instead of the silica in Example 12, synthetic smectite (Lucentite SWN, manufactured by Co-op Chemical Co., Ltd.; pH for isoelectric point: 10.5) was used.

(Examination of Mutual Fusion State)

Examination under an optical microscope confirmed that organic particles 1 fused with one another to form a continuous phase and organic particles 2 fused with one another to form a continuous phase, but organic particles 1 and organic particles 2 caused phase separation and did not together form a continuous phase.

Example 15

A lithium-ion secondary battery was produced by substantially the same method as in Example 11 except that, instead of the silica in Example 12, mullite (KM101, manufactured by KCM Corporation; pH for isoelectric point: 5.8) was used.

(Examination of Mutual Fusion State)

Examination under an optical microscope confirmed that organic particles 1 fused with one another to form a continuous phase and organic particles 2 fused with one another to form a continuous phase, but organic particles 1 and organic particles 2 caused phase separation and did not together form a continuous phase.

Example 16

A lithium-ion secondary battery was produced by substantially the same method as in Example 11 except that, instead of the silica in Example 12, titania (PW-1010, manufactured by JGC C & C; pH for isoelectric point: 6.1) was used.

(Examination of Mutual Fusion State)

Examination under an optical microscope confirmed that organic particles 1 fused with one another to form a continuous phase and organic particles 2 fused with one another to form a continuous phase, but organic particles 1 and organic particles 2 caused phase separation and did not together form a continuous phase.

Example 17

A lithium-ion secondary battery was produced by substantially the same method as in Example 11 except that, instead of the silica in Example 12, tin oxide (NanoTek $SnO_2$, manufactured by C. I. Kasei Co., Ltd.; pH for isoelectric point: 6.9) was used.

(Examination of Mutual Fusion State)

Examination under an optical microscope confirmed that organic particles 1 fused with one another to form a continuous phase and organic particles 2 fused with one another to form a continuous phase, but organic particles 1 and organic particles 2 caused phase separation and did not together form a continuous phase.

Example 18

A lithium-ion secondary battery was produced by substantially the same method as in Example 11 except that, instead of the silica in Example 12, γ-alumina (TAIMICRON TM-300, manufactured by Taimei Chemicals Co., Ltd.; pH for isoelectric point: 7.9) was used.

(Examination of Mutual Fusion State)

Examination under an optical microscope confirmed that organic particles 1 fused with one another to form a continuous phase and organic particles 2 fused with one another to form a continuous phase, but organic particles 1 and organic particles 2 caused phase separation and did not together form a continuous phase.

Example 19

A lithium-ion secondary battery was produced by substantially the same method as in Example 11 except that, instead of the silica in Example 12, α-alumina (TAIMICRON TM-D, manufactured by Taimei Chemicals Co., Ltd.; pH for isoelectric point: 9.1) was used.

(Examination of Mutual Fusion State)

Examination under an optical microscope confirmed that organic particles 1 fused with one another to form a continuous phase and organic particles 2 fused with one another to form a continuous phase, but organic particles 1 and organic particles 2 caused phase separation and did not together form a continuous phase.

Example 20

A lithium-ion secondary battery was produced by substantially the same method as in Example 11 except that, instead of the silica in Example 12, magnesium hydroxide (ECOMAG PZ-1, manufactured by Tateho Chemical Industries Co., Ltd.; pH for isoelectric point: 12.4) was used.

(Examination of Mutual Fusion State)

Examination under an optical microscope confirmed that organic particles 1 fused with one another to form a continuous phase and organic particles 2 fused with one another to form a continuous phase, but organic particles 1 and organic particles 2 caused phase separation and did not together form a continuous phase.

Example 21

A lithium-ion secondary battery was produced by substantially the same method as in Example 11 except that, instead of the silica in Example 12, a mixture of 1.8 part of the above-mentioned silica and 178.2 parts of the above-mentioned α-alumina was used.
(Examination of Mutual Fusion State)

Examination under an optical microscope confirmed that organic particles 1 fused with one another to form a continuous phase and organic particles 2 fused with one another to form a continuous phase, but organic particles 1 and organic particles 2 caused phase separation and did not together form a continuous phase.

Example 22

A lithium-ion secondary battery was produced by substantially the same method as in Example 11 except that, instead of the silica in Example 12, a mixture of 18 parts of the above-mentioned silica and 162 parts of the above-mentioned α-alumina was used.
(Examination of Mutual Fusion State)

Examination under an optical microscope confirmed that organic particles 1 fused with one another to form a continuous phase and organic particles 2 fused with one another to form a continuous phase, but organic particles 1 and organic particles 2 caused phase separation and did not together form a continuous phase.

Example 23

A lithium-ion secondary battery was produced by substantially the same method as in Example 11 except that, instead of the silica in Example 12, a mixture of 90 parts of the above-mentioned silica and 90 parts of the above-mentioned α-alumina was used.
(Examination of Mutual Fusion State)

Examination under an optical microscope confirmed that organic particles 1 fused with one another to form a continuous phase and organic particles 2 fused with one another to form a continuous phase, but organic particles 1 and organic particles 2 caused phase separation and did not together form a continuous phase.

Example 24

A lithium-ion secondary battery was produced by substantially the same method as in Example 11 except that, instead of the silica in Example 12, a mixture of 18 parts of the above-mentioned silica and 162 parts of the above-mentioned α-alumina was used.
(Examination of Mutual Fusion State)

Examination under an optical microscope confirmed that organic particles 1 fused with one another to form a continuous phase and organic particles 2 fused with one another to form a continuous phase, but organic particles 1 and organic particles 2 caused phase separation and did not together form a continuous phase.

Example 25

A lithium-ion secondary battery was produced by substantially the same method as in Example 11 except that, instead of the silica in Example 12, a mixture of 178.2 parts of the above-mentioned silica and 1.8 part of the above-mentioned α-alumina was used.
(Examination of Mutual Fusion State)

Examination under an optical microscope confirmed that organic particles 1 fused with one another to form a continuous phase and organic particles 2 fused with one another to form a continuous phase, but organic particles 1 and organic particles 2 caused phase separation and did not together form a continuous phase.

Example 26

A lithium-ion secondary battery was produced by substantially the same method as in Example 11 except that, instead of the silica in Example 22, a dendrimer (HPEMA, manufactured by Nissan Chemical Industries, Ltd.) was used.
(Examination of Mutual Fusion State)

Examination under an optical microscope confirmed that organic particles 1 fused with one another to form a continuous phase and organic particles 2 fused with one another to form a continuous phase, but organic particles 1 and organic particles 2 caused phase separation and did not together form a continuous phase.

Example 27

In Example 27, a method is described in which a lithium-ion secondary battery is produced using an electrode having a negative electrode coated with the battery electrode or separator surface protective agent composition which comprises crosslinkable organic particles containing inorganic particles.
(Preparation of Fusible Organic Particles 1)

Cyanoethylated pullulan particles were obtained by the same method as in Example 1.
(Preparation of Fusible, Thermally Crosslinkable Organic Particles 2)

1,000 Parts of toluene, 100 parts of the above-mentioned solid epoxy resin 1, parts of the above-mentioned oxetane, and 990 parts of the above-mentioned α-alumina were placed in a 10 L beaker and stirred by means of a propeller mixer until the resultant mixture became uniform, and then 8 parts of a latent photoinitiator (San-Aid SI-60, manufactured by Sanshin Chemical Industry Co., Ltd.; thermal cure starting temperature: about 60° C.) was added thereto and the resultant mixture was further stirred until the mixture became uniform. Then, toluene was removed from the mixture under a reduced pressure at room temperature under light shielding conditions to obtain a solid material (melting temperature: 40 to 50° C.). The obtained solid material was pulverized by means of the above-mentioned pulverizer to prepare thermally crosslinkable organic particles having an average particle diameter of 3 μm.
(Preparation of a Composition Comprising the Two Types of Fusible Particles)

A liquid composition was obtained as the battery electrode or separator surface protective agent composition by substantially the same method as in Example 7 except that the above-prepared organic particles 1 and organic particles 2 were used.
(Production of a Positive Electrode)
A positive electrode was produced by the same method as in Example 1.
(Production of a Negative Electrode)
A negative electrode was produced by the same method as in Example 1.
(Production of a Negative Electrode Coated with the Battery Electrode or Separator Surface Protective Agent Composition)
A negative electrode coated with the battery electrode or separator surface protective agent composition having a thickness of 15 μm was produced by substantially the same method as in Example 7 except that the above-obtained liquid composition was used.
(Examination of Mutual Fusion State)
Examination under an optical microscope confirmed that organic particles 1 fused with one another to form a continuous phase and organic particles 2 fused with one another to form a continuous phase, but organic particles 1 and organic particles 2 caused phase separation and did not together form a continuous phase.
(Production of a Lithium-Ion Secondary Battery)
A lithium-ion secondary battery was produced by substantially the same method as in Example 1 except that the above-produced negative electrode coated with the battery electrode or separator surface protective agent composition was used.

Example 28

In Example 28, a method is described in which a lithium-ion secondary battery is produced using an electrode having a negative electrode coated with the battery electrode or separator surface protective agent composition which comprises organic particles covered with an inorganic material.
(Preparation of Fusible Organic Particles 1 Covered with an Inorganic Material)
Cyanoethylated pullulan was coarsely pulverized by a high-speed rotary cutter pulverizer, and then pulverized by means of Nano Jetmizer (NJ-30, manufactured by Aishin Nano Technologies Co., Ltd.) to prepare mixture particles having an average particle diameter of 4 μm. 1,000 Parts of the pulverized organic particles were dispersed in 100,000 parts of ethanol, and then 6,000 parts of aluminum ethylate was dissolved in the resultant dispersion. The dispersion in this state was heated to 70° C. and stirred for one hour to cause the surfaces of the resin particles to be swelled with aluminum ethylate. Then, 20,000 parts of a 28% aqueous ammonia was dropwise added to the resultant solution and stirred at room temperature for 48 hours to effect a sol-gel reaction. After completion of the reaction, the resultant particles were washed with purified water and then washed with ethanol, and then subjected to filtration and drying to obtain particles comprising resin particles coated with aluminum hydroxide.
(Preparation of Fusible, Thermally Crosslinkable Organic Particles 2)
Thermally crosslinkable epoxy resin particles were obtained by the same method as in Example 7.
(Preparation of a Composition Comprising the Two Types of Fusible Particles)
A liquid composition was obtained as the battery electrode or separator surface protective agent composition by substantially the same method as in Example 7 except that water and the above-prepared organic particles 1 and organic particles 2 were used.
(Production of a Positive Electrode)
A positive electrode was produced by the same method as in Example 1.
(Production of a Negative Electrode)
A negative electrode was produced by the same method as in Example 1.
(Production of a Negative Electrode Coated with the Battery Electrode or Separator Surface Protective Agent Composition)
A negative electrode coated with the battery electrode or separator surface protective agent composition having a thickness of 15 μm was produced by substantially the same method as in Example 7 except that the above-obtained liquid composition was used.
(Examination of Mutual Fusion State)
Examination under an optical microscope confirmed that organic particles 1 fused with one another to form a continuous phase and organic particles 2 fused with one another to form a continuous phase, but organic particles 1 and organic particles 2 caused phase separation and did not together form a continuous phase.
(Production of a Lithium-Ion Secondary Battery)
A lithium-ion secondary battery was produced by substantially the same method as in Example 1 except that the above-produced negative electrode coated with the battery electrode or separator surface protective agent composition was used.

Example 29

In Example 29, a method is described in which a lithium-ion secondary battery is produced using an electrode having a negative electrode coated with the battery electrode or separator surface protective agent composition which contains a core-shell type foaming agent.
(Preparation of Fusible Organic Particles 1)
Composite particles of cyanoethylated pullulan, α-alumina, and silica were prepared by the same method as in Example 21.
(Preparation of Fusible, Thermally Crosslinkable Organic Particles 2)
Thermally crosslinkable epoxy resin particles were obtained by the same method as in Example 7.
(Preparation of a Composition Comprising the Two Types of Fusible Particles)
A liquid composition was obtained as the battery electrode or separator surface protective agent composition by substantially the same method as in Example 7 except that, in addition to the above-prepared organic particles 1 and organic particles 2, 1,000 parts of a core-shell type foaming agent (909-80, manufactured by Expancel Co., Ltd.; foaming temperature: 175 to 190° C.) was incorporated.
(Production of a Positive Electrode)
A positive electrode was produced by the same method as in Example 1.
(Production of a Negative Electrode)
A negative electrode was produced by the same method as in Example 1.
(Production of a Negative Electrode Coated with the Battery Electrode or Separator Surface Protective Agent Composition)
A negative electrode coated with the battery electrode or separator surface protective agent composition having a thickness of 15 μm was produced by substantially the same method as in Example 7 except that the above-obtained liquid composition was used {a) of FIG. 4}.
(Examination of Mutual Fusion State)
Examination under an optical microscope confirmed that organic particles 1 fused with one another to form a continuous phase and organic particles 2 fused with one another to form a continuous phase, but organic particles 1 and organic particles 2 caused phase separation and did not together form a continuous phase.
(Production of a Lithium-Ion Secondary Battery)
A lithium-ion secondary battery was produced by substantially the same method as in Example 1 except that the above-produced negative electrode coated with the battery electrode or separator surface protective agent composition was used.
(Examination of Foaming State)
The battery obtained after the heat resistance insulation test was disassembled to examine the surface of the negative electrode. As a result, the examination has confirmed that, as seen in b) of FIG. 4, the foaming agent foams and is expanded in volume to increase the space between the electrodes, thus improving the insulation.

Example 30

In Example 30, a method is described in which a lithium-ion secondary battery is produced using an electrode having a negative electrode coated with the battery electrode or separator surface protective agent composition which further comprises a liquid binder.
(Preparation of Fusible Organic Particles 1)
Composite particles of cyanoethylated pullulan, α-alumina, and silica were prepared by the same method as in Example 21.
(Preparation of Fusible, Thermally Crosslinkable Organic Particles 2)
Thermally crosslinkable epoxy resin particles were obtained by the same method as in Example 7.
(Preparation of a Composition Comprising the Two Types of Fusible Particles)
6,000 Parts of water and 100 parts of the above-mentioned polyoxyethylene were placed in a 10 L beaker and stirred by means of a propeller mixer at 80° C. for one hour to obtain a uniform solution. The obtained solution was cooled to room temperature. To the solution were added 700 parts of the above-prepared organic particles 1 and 300 parts of the above-prepared organic particles 2, and the resultant mixture was further stirred by means of a propeller mixer until the mixture became uniform to obtain a liquid composition as the battery electrode or separator surface protective agent composition.
(Production of a Positive Electrode)
A positive electrode was produced by the same method as in Example 1.
(Production of a Negative Electrode)
A negative electrode was produced by the same method as in Example 1.
(Production of a Negative Electrode Coated with the Battery Electrode or Separator Surface Protective Agent Composition)
A negative electrode coated with the battery electrode or separator surface protective agent composition having a thickness of 15 μm was produced by substantially the same method as in Example 7 except that the above-obtained liquid composition was used.
(Examination of Mutual Fusion State)
Examination under an optical microscope confirmed that organic particles 1 fused with one another to form a continuous phase and organic particles 2 fused with one another to form a continuous phase, but organic particles 1 and organic particles 2 caused phase separation and did not together form a continuous phase.
(Production of a Lithium-Ion Secondary Battery)
A lithium-ion secondary battery was produced by substantially the same method as in Example 1 except that the above-produced negative electrode coated with the battery electrode or separator surface protective agent composition was used.

Example 31

In Example 31, a method is described in which a lithium-ion secondary battery is produced using an electrode having a negative electrode coated with the battery electrode or separator surface protective agent composition which further comprises inorganic particles in a liquid binder.
(Preparation of Fusible Organic Particles 1)
Composite particles of cyanoethylated pullulan, α-alumina, and silica were prepared by the same method as in Example 21.
(Preparation of Fusible, Thermally Crosslinkable Organic Particles 2)
Thermally crosslinkable epoxy resin particles were obtained by the same method as in Example 7.
(Preparation of a Composition Comprising the Two Types of Fusible Particles)
6,000 Parts of water and 100 parts of the above-mentioned polyoxyethylene were placed in a 10 L beaker and stirred by means of a propeller mixer at 80° C. for one hour to obtain a uniform solution. The obtained solution was cooled to room temperature. To the solution were added 700 parts of the above-prepared organic particles 1, 300 parts of the above-prepared organic particles 2, and 900 parts of the above-mentioned α-alumina particles, and the resultant mixture was further stirred by means of a propeller mixer until the mixture became uniform, and then further dispersed using a bead mill (continuously dispersed in a manner of circulation using 0.3 mm zirconia beads at a circumferential speed of 15 m for 24 hours) to obtain a liquid composition as the battery electrode or separator surface protective agent composition. The particles contained in the composition had an average particle diameter of about 0.5 μm.
(Production of a Positive Electrode)
A positive electrode was produced by the same method as in Example 1.
(Production of a Negative Electrode)
A negative electrode was produced by the same method as in Example 1.
(Production of a Negative Electrode Coated with the Battery Electrode or Separator Surface Protective Agent Composition)
A negative electrode coated with the battery electrode or separator surface protective agent composition having a thickness of 15 μm was produced by substantially the same method as in Example 7 except that the above-obtained liquid composition was used.
(Examination of Mutual Fusion State)
Examination under an optical microscope confirmed that organic particles 1 fused with one another to form a continuous phase and organic particles 2 fused with one another to form a continuous phase, but organic particles 1 and organic particles 2 caused phase separation and did not together form a continuous phase.

(Production of a Lithium-Ion Secondary Battery)

A lithium-ion secondary battery was produced by substantially the same method as in Example 1 except that the above-produced negative electrode coated with the battery electrode or separator surface protective agent composition was used.

Example 32

In Example 32, a method is described in which a lithium-ion secondary battery is produced using an electrode having a negative electrode coated with the battery electrode or separator surface protective agent composition which further comprises a liquid binder.

(Preparation of Fusible Organic Particles 1)

Composite particles of cyanoethylated pullulan, α-alumina, and silica were prepared by the same method as in Example 21.

(Preparation of Fusible, Thermally Crosslinkable Organic Particles 2)

Thermally crosslinkable epoxy resin particles were obtained by the same method as in Example 7.

(Preparation of a Composition Comprising the Two Types of Fusible Particles)

6,000 Parts of water and 100 parts of a silyl group-modified polyvinyl alcohol (KURARAY POVAL R-1130, manufactured by Kuraray Co., Ltd.; hydrogen bonding functional group value: 0.02 mol/g) were placed in a 10 L beaker and stirred by means of a propeller mixer at 80° C. for one hour to obtain a uniform solution. The obtained solution was cooled to room temperature. To the solution were added 700 parts of the above-prepared organic particles 1 and 300 parts of the above-prepared organic particles 2, and the resultant mixture was further stirred by means of a propeller mixer until the mixture became uniform to obtain a liquid composition as the battery electrode or separator surface protective agent composition.

(Production of a Positive Electrode)

A positive electrode was produced by the same method as in Example 1.

(Production of a Negative Electrode)

A negative electrode was produced by the same method as in Example 1.

(Production of a Negative Electrode Coated with the Battery Electrode or Separator Surface Protective Agent Composition)

A negative electrode coated with the battery electrode or separator surface protective agent composition having a thickness of 15 μm was produced by substantially the same method as in Example 7 except that the above-obtained liquid composition was used.

(Examination of Mutual Fusion State)

Examination under an optical microscope confirmed that organic particles 1 fused with one another to form a continuous phase and organic particles 2 fused with one another to form a continuous phase, but organic particles 1 and organic particles 2 caused phase separation and did not together form a continuous phase.

(Production of a Lithium-Ion Secondary Battery)

A lithium-ion secondary battery was produced by substantially the same method as in Example 1 except that the above-produced negative electrode coated with the battery electrode or separator surface protective agent composition was used.

Example 33

In Example 33, a method is described in which a lithium-ion secondary battery is produced using an electrode having a negative electrode coated with the battery electrode or separator surface protective agent composition which further comprises a thermally crosslinkable liquid binder.

(Preparation of Fusible Organic Particles 1)

Composite particles of cyanoethylated pullulan, α-alumina, and silica were prepared by the same method as in Example 21.

(Preparation of Fusible, Thermally Crosslinkable Organic Particles 2)

Thermally crosslinkable epoxy resin particles were obtained by the same method as in Example 7.

(Preparation of a Composition Comprising the Two Types of Fusible Particles)

6,000 Parts of water and 100 parts of a silyl group-modified polyvinyl alcohol (KURARAY POVAL R-1130, manufactured by Kuraray Co., Ltd.; hydrogen bonding functional group value: 0.02 mol/g) were placed in a 10 L beaker and stirred by means of a propeller mixer at 80° C. for one hour to obtain a uniform solution. 50 Parts of pyromellitic acid was added to the obtained solution and further stirred at 80° C. for one hour, followed by cooling to room temperature. To the solution were added 700 parts of the above-prepared organic particles 1 and 300 parts of the above-prepared organic particles 2, and the resultant mixture was further stirred by means of a propeller mixer until the mixture became uniform to obtain a liquid composition as the battery electrode or separator surface protective agent composition.

(Production of a Positive Electrode)

A positive electrode was produced by the same method as in Example 1.

(Production of a Negative Electrode)

A negative electrode was produced by the same method as in Example 1.

(Production of a Negative Electrode Coated with the Battery Electrode or Separator Surface Protective Agent Composition)

A negative electrode coated with the battery electrode or separator surface protective agent composition having a thickness of 15 μm was produced by substantially the same method as in Example 7 except that the above-obtained liquid composition was used.

(Examination of Mutual Fusion State)

Examination under an optical microscope confirmed that organic particles 1 fused with one another to form a continuous phase and organic particles 2 fused with one another to form a continuous phase, but organic particles 1 and organic particles 2 caused phase separation and did not together form a continuous phase.

(Production of a Lithium-Ion Secondary Battery)

A lithium-ion secondary battery was produced by substantially the same method as in Example 1 except that the above-produced negative electrode coated with the battery electrode or separator surface protective agent composition was used.

Example 34

In Example 34, a method is described in which a lithium-ion secondary battery is produced using an electrode having a negative electrode coated with the battery electrode or separator surface protective agent composition which contains a photo-setting binder.

(Preparation of Fusible Organic Particles 1)

Composite particles of cyanoethylated pullulan, α-alumina, and silica were prepared by the same method as in Example 21.

(Preparation of Fusible, Thermally Crosslinkable Organic Particles 2)

Thermally crosslinkable epoxy resin particles were obtained by the same method as in Example 7.
(Preparation of a Photo-Setting Composition Comprising the Two Types of Fusible Particles)

6,000 Parts of water and 50 parts of a water-soluble acrylate (HOB, manufactured by Kyoseisha Chemical Co., Ltd.) were placed in a 10 L beaker and stirred by means of a propeller mixer at room temperature for one hour to obtain a uniform solution. 4 Parts of the above-mentioned radical photoinitiator was added to the obtained solution, and further stirred at 80° C. for one hour, followed by cooling to room temperature. To the solution were added 700 parts of the above-prepared organic particles 1, 300 parts of the above-prepared organic particles 2, and 150 parts of cellulose fibers (KC FLOCK W-400G, manufactured by Nippon Paper Chemicals Co., Ltd.), and the resultant mixture was further stirred by means of a propeller mixer until the mixture became uniform to obtain a liquid composition as the battery electrode or separator surface protective agent composition.
(Production of a Positive Electrode)

A positive electrode was produced by the same method as in Example 1.
(Production of a Negative Electrode)

A negative electrode was produced by the same method as in Example 1.
(Production of a Negative Electrode Coated with the Battery Electrode or Separator Surface Protective Agent Composition)

The above-obtained liquid composition was applied to the negative electrode using an applicator, and air-dried for one hour and irradiated with an ultraviolet light (365 nm, 100 mW/cm$^2$×100 seconds) to cure the binder, and then heated in a nitrogen gas atmosphere at 120° C. for 60 seconds so that the organic particles fused with one another, followed by cooling, to produce a negative electrode coated with the battery electrode or separator surface protective agent composition having a thickness of 15
(Examination of Mutual Fusion State)

Examination under an optical microscope confirmed that organic particles 1 fused with one another to form a continuous phase and organic particles 2 fused with one another to form a continuous phase, but organic particles 1 and organic particles 2 caused phase separation and did not together form a continuous phase.
(Production of a Lithium-Ion Secondary Battery)

A lithium-ion secondary battery was produced by substantially the same method as in Example 1 except that the above-produced negative electrode coated with the battery electrode or separator surface protective agent composition was used.

Example 35

In Example 35, a method is described in which a lithium-ion secondary battery is produced using an electrode having a negative electrode coated with the battery electrode or separator surface protective agent composition from which the solvent is removed by freeze-drying.
(Preparation of Fusible Organic Particles 1)

Composite particles of cyanoethylated pullulan, α-alumina, and silica were prepared by the same method as in Example 21.
(Preparation of Fusible, Thermally Crosslinkable Organic Particles 2)

Thermally crosslinkable epoxy resin particles were obtained by the same method as in Example 7.
(Preparation of a Photo-Setting Composition Comprising the Two Types of Fusible Particles)

A photo-setting composition was prepared as the battery electrode or separator surface protective agent composition by the same method as in Example 34.
(Production of a Positive Electrode)

A positive electrode was produced by the same method as in Example 1.
(Production of a Negative Electrode)

A negative electrode was produced by the same method as in Example 1.
(Production of a Negative Electrode Coated with the Battery Electrode or Separator Surface Protective Agent Composition)

The above-obtained liquid composition was applied to the negative electrode using an applicator, and frozen at −40° C. for 60 seconds and irradiated with an ultraviolet light (365 nm, 100 mW/cm$^2$×100 seconds) to cure the binder and simultaneously evaporate the frozen ice using the generated heat of polymerization, and then heated in a nitrogen gas atmosphere at 120° C. for 60 seconds so that the organic particles fused with one another, followed by cooling, to produce a negative electrode coated with the battery electrode or separator surface protective agent composition having a thickness of 15 μm.
(Examination of Mutual Fusion State)

Examination under an optical microscope confirmed that organic particles 1 fused with one another to form a continuous phase and organic particles 2 fused with one another to form a continuous phase, but organic particles 1 and organic particles 2 caused phase separation and did not together form a continuous phase. Further, water used for dilution was frozen and then removed, and therefore the crystallite structure of ice was transferred to the protecting composition, so that the binder had a porous structure.
(Production of a Lithium-Ion Secondary Battery)

A lithium-ion secondary battery was produced by substantially the same method as in Example 1 except that the above-produced negative electrode coated with the battery electrode or separator surface protective agent composition was used.

Example 36

In Example 36, a method is described in which a lithium-ion secondary battery is produced using an electrode having a negative electrode coated with the battery electrode or separator surface protective agent composition in which the materials incorporated are oriented in a magnetic field.
(Preparation of Fusible Organic Particles 1)

Composite particles of cyanoethylated pullulan, α-alumina, and silica were prepared by the same method as in Example 21.
(Preparation of Fusible, Thermally Crosslinkable Organic Particles 2)

Thermally crosslinkable epoxy resin particles were obtained by the same method as in Example 7.
(Preparation of a Photo-Setting Composition Comprising the Two Types of Fusible Particles)

A photo-setting composition was prepared as the battery electrode or separator surface protective agent composition by the same method as in Example 34.
(Production of a Positive Electrode)

A positive electrode was produced by the same method as in Example 1.

(Production of a Negative Electrode)

A negative electrode was produced by the same method as in Example 1.

(Production of a Negative Electrode Coated with the Battery Electrode or Separator Surface Protective Agent Composition)

The above-obtained liquid composition was applied to the negative electrode using an applicator, and air-dried for one hour while applying a perpendicular magnetic field at 12 T to the coated surface, and then irradiated with an ultraviolet light (365 nm, 100 mW/cm$^2$×100 seconds) to cure the binder, and then heated in a nitrogen gas atmosphere at 120° C. for 60 seconds so that the organic particles fused with one another, followed by cooling, to produce a negative electrode coated with the battery electrode or separator surface protective agent composition having a thickness of 15 μm.

(Examination of Mutual Fusion State)

Examination under an optical microscope confirmed that organic particles 1 fused with one another to form a continuous phase and organic particles 2 fused with one another to form a continuous phase, but organic particles 1 and organic particles 2 caused phase separation and did not together form a continuous phase.

(Production of a Lithium-Ion Secondary Battery)

A lithium-ion secondary battery was produced by substantially the same method as in Example 1 except that the above-produced negative electrode coated with the battery electrode or separator surface protective agent composition was used.

Example 37

In Example 37, a method is described in which a lithium-ion secondary battery is produced using an electrode having a negative electrode coated with the battery electrode or separator surface protective agent composition which further comprises a surfactant.

(Preparation of Fusible Organic Particles 1)

4,000 Parts of water and 5 parts of lithium dodecylbenzenesulfonate were placed in a 10 L beaker and mixed by means of a propeller mixer until the resultant mixture became uniform, and then 20 parts of the above-mentioned cyanoethylated pullulan, 1.8 part of the above-mentioned silica particles, and 178.2 parts of the above-mentioned α-alumina particles were added thereto and stirred by means of a propeller mixer until the resultant mixture became uniform to obtain a dispersion. The obtained dispersion was dispersed using a bead mill (dispersed in a manner of circulation using 0.3 mm zirconia beads at a circumferential speed of 15 m at a temperature of 25° C. for one hour). The resultant dispersion was dried in a vacuum oven at 80° C. to obtain a mixture solid. The obtained mixture solid was coarsely pulverized by a high-speed rotary cutter pulverizer, and then pulverized by means of Nano Jetmizer (NJ-30, manufactured by Aishin Nano Technologies Co., Ltd.) to prepare mixture particles having an average particle diameter of 4 μm.

(Preparation of Fusible, Thermally Crosslinkable Organic Particles 2)

Thermally crosslinkable epoxy resin particles were obtained by the same method as in Example 7.

(Preparation of a Composition Comprising the Two Types of Fusible Particles)

6,000 Parts of water, 50 parts of lithium dodecylbenzenesulfonate, 900 parts of the above-mentioned α-alumina particles, and 100 parts of the above-mentioned polyoxyethylene were placed in a 10 L beaker and stirred by means of a propeller mixer at 80° C. for one hour to obtain a uniform solution. The obtained solution was cooled to room temperature. To the solution were added 700 parts of the above-prepared organic particles 1 and 300 parts of the above-prepared organic particles 2, and the resultant mixture was further stirred by means of a propeller mixer until the mixture became uniform, and then further dispersed using a bead mill (continuously dispersed in a manner of circulation using 0.3 mm zirconia beads at a circumferential speed of 15 m for 24 hours) to obtain a liquid composition as the battery electrode or separator surface protective agent composition. The particles contained in the composition had an average particle diameter of about 0.15 μm.

(Production of a Positive Electrode)

A positive electrode was produced by the same method as in Example 1.

(Production of a Negative Electrode)

A negative electrode was produced by the same method as in Example 1.

(Production of a Negative Electrode Coated with the Battery Electrode or Separator Surface Protective Agent Composition)

A negative electrode coated with the battery electrode or separator surface protective agent composition was produced by the same method as in Example 7.

(Examination of Mutual Fusion State)

Examination under an optical microscope confirmed that organic particles 1 fused with one another to form a continuous phase and organic particles 2 fused with one another to form a continuous phase, but organic particles 1 and organic particles 2 caused phase separation and did not together form a continuous phase.

(Production of a Lithium-Ion Secondary Battery)

A lithium-ion secondary battery was produced by substantially the same method as in Example 1 except that the above-produced negative electrode coated with the battery electrode or separator surface protective agent composition was used.

Example 38

In Example 38, a method is described in which a lithium-ion secondary battery is produced using an electrode having a negative electrode coated with the battery electrode or separator surface protective agent composition using a hollow frame.

(Preparation of Fusible Organic Particles 1)

Organic particles 1 were prepared by the same method as in Example 37.

(Preparation of Fusible, Thermally Crosslinkable Organic Particles 2)

Thermally crosslinkable epoxy resin particles were obtained by the same method as in Example 7.

(Preparation of a Composition Comprising the Two Types of Fusible Particles)

A battery electrode or separator surface protective agent composition was prepared by the same method as in Example 37.

(Production of a Positive Electrode)

A positive electrode was produced by the same method as in Example 1.

(Production of a Negative Electrode)

A negative electrode was produced by the same method as in Example 1.

(Production of a Negative Electrode Coated with the Battery Electrode or Separator Surface Protective Agent Composition)

A hollow frame made of an aluminum wire having a diameter of 2 mm, which had been processed into a rectangular frame having a width of 30 cm and a length of 60 cm (left-hand view of a) of FIG. 5), was dipped in the above-prepared composition, and the frame was drawn at a speed of 5 cm/second so that the short sides of the frame were vertical to form a film of the composition in the hollow frame (right-hand view of a) of FIG. 5). The frame was allowed to stand in that state for 5 seconds, and then turned upside down and allowed to stand for 7 seconds and then, further turned upside down and allowed to stand for 5 seconds, and subsequently the frame was rotated at 90° round the long axis as a center and supported so that the film plane was perpendicular to the vertical direction, and, after 5 seconds, the frame having the film therein was pressed against the surface of the negative electrode to transfer the film to the surface of the negative electrode. Then, the resultant negative electrode was heated in a nitrogen gas atmosphere at 120° C. for 60 seconds to produce a negative electrode coated with the battery electrode or separator surface protective agent composition having a thickness of 0.15 μm {b) of FIG. 5}.

(Examination of Mutual Fusion State)

Examination under an optical microscope confirmed that organic particles 1 fused with one another to form a continuous phase and organic particles 2 fused with one another to form a continuous phase, but organic particles 1 and organic particles 2 caused phase separation and did not together form a continuous phase.

(Production of a Lithium-Ion Secondary Battery)

A lithium-ion secondary battery was produced by substantially the same method as in Example 1 except that the above-produced negative electrode coated with the battery electrode or separator surface protective agent composition was used.

Example 39

A lithium-ion secondary battery was produced by substantially the same method as in Example 38 except that 100 parts of polyoxyethylene was changed to 100 parts of lithium silicate.

Example 40

A lithium-ion secondary battery was produced by substantially the same method as in Example 39 except that the electrode or separator surface protective agent composition was applied to the negative electrode using an applicator so that the applied composition had a thickness of 1.5 μm.

Example 41

In Example 41, a method is described in which a lithium-ion secondary battery is produced using an electrode having a negative electrode coated with the battery electrode or separator surface protective agent composition which contains a surfactant.

(Preparation of Fusible Organic Particles 1)

Organic particles 1 were prepared by substantially the same method as in Example 37 except that, instead of the lithium dodecylbenzenesulfonate in Example 37, lithium perfluorosulfonate was used.

(Preparation of Fusible, Thermally Crosslinkable Organic Particles 2)

Thermally crosslinkable epoxy resin particles were obtained by the same method as in Example 7.

(Preparation of a Composition Comprising the Two Types of Fusible Particles)

A battery electrode or separator surface protective agent composition was prepared by substantially the same method as in Example 36 except that the above-prepared two types of thermally fusible particles were used.

(Production of a Positive Electrode)

A positive electrode was produced by the same method as in Example 1.

(Production of a Negative Electrode)

A negative electrode was produced by the same method as in Example 1.

(Production of a Negative Electrode Coated with the Battery Electrode or Separator Surface Protective Agent Composition)

A negative electrode coated with the battery electrode or separator surface protective agent composition was produced by the same method as in Example 7.

(Examination of Mutual Fusion State)

Examination under an optical microscope confirmed that organic particles 1 fused with one another to form a continuous phase and organic particles 2 fused with one another to form a continuous phase, but organic particles 1 and organic particles 2 caused phase separation and did not together form a continuous phase.

(Production of a Lithium-Ion Secondary Battery)

A lithium-ion secondary battery was produced by substantially the same method as in Example 1 except that the above-produced negative electrode coated with the battery electrode or separator surface protective agent composition was used.

Example 42

In Example 42, a method is described in which a lithium-ion secondary battery is produced using an electrode having a negative electrode coated with the battery electrode or separator surface protective agent composition which contains a surfactant.

(Preparation of Fusible Organic Particles 1)

Organic particles 1 were prepared by substantially the same method as in Example 37 except that, instead of the lithium dodecylbenzenesulfonate in Example 37, lithium hydroxystearate was used.

(Preparation of Fusible, Thermally Crosslinkable Organic Particles 2)

Thermally crosslinkable epoxy resin particles were obtained by the same method as in Example 7.

(Preparation of a Composition Comprising the Two Types of Fusible Particles)

A battery electrode or separator surface protective agent composition was prepared by substantially the same method as in Example 37 except that the above-prepared two types of thermally fusible particles were used.

(Production of a Positive Electrode)

A positive electrode was produced by the same method as in Example 1.

(Production of a Negative Electrode)

A negative electrode was produced by the same method as in Example 1.

(Production of a Negative Electrode Coated with the Battery Electrode or Separator Surface Protective Agent Composition)

A negative electrode coated with the battery electrode or separator surface protective agent composition was produced by the same method as in Example 7.
(Examination of Mutual Fusion State)

Examination under an optical microscope confirmed that organic particles 1 fused with one another to form a continuous phase and organic particles 2 fused with one another to form a continuous phase, but organic particles 1 and organic particles 2 caused phase separation and did not together form a continuous phase.
(Production of a Lithium-Ion Secondary Battery)

A lithium-ion secondary battery was produced by substantially the same method as in Example 1 except that the above-produced negative electrode coated with the battery electrode or separator surface protective agent composition was used.

Example 43

In Example 43, a method is described in which a lithium-ion secondary battery is produced using an electrode having a negative electrode coated with the battery electrode or separator surface protective agent composition which further comprises a silane coupling agent and silica.
(Preparation of Fusible Organic Particles 1 Containing Inorganic Particles)

4,000 Parts of water, 20 parts of the above-mentioned cyanoethylated pullulan, and 180 parts of silica particles (NanoTek $SiO_2$, manufactured by C. I. Kasei Co., Ltd.; pH for isoelectric point: 1.8) were placed in a 10 L beaker and stirred by means of a propeller mixer until the resultant mixture became uniform to obtain a dispersion. The obtained dispersion was dispersed using a bead mill (dispersed in a manner of circulation using 0.3 mm zirconia beads at a circumferential speed of 15 m at a temperature of 25° C. for one hour). 50 Parts of an epoxy silane coupling agent (KBM-403, manufactured by Shin-Etsu Chemical Co., Ltd.) was added to the dispersion and stirred by means of a propeller mixer for one hour. The resultant dispersion was dried in a vacuum oven at 80° C. to obtain a mixture solid. The obtained mixture solid was coarsely pulverized by a high-speed rotary cutter pulverizer, and then pulverized by means of Nano Jetmizer (NJ-30, manufactured by Aishin Nano Technologies Co., Ltd.) to prepare mixture particles having an average particle diameter of 4 μm.
(Preparation of Fusible, Thermally Crosslinkable Organic Particles 2)

Thermally crosslinkable epoxy resin particles were obtained by the same method as in Example 7.
(Preparation of a Composition Comprising the Two Types of Fusible Particles)

A liquid composition was obtained as the battery electrode or separator surface protective agent composition by substantially the same method as in Example 42 except that the above-prepared organic particles 1 and organic particles 2 were used.
(Production of a Positive Electrode)

A positive electrode was produced by the same method as in Example 1.
(Production of a Negative Electrode)

A negative electrode was produced by the same method as in Example 1.
(Production of a Negative Electrode Coated with the Battery Electrode or Separator Surface Protective Agent Composition)

A negative electrode coated with the battery electrode or separator surface protective agent composition having a thickness of 15 μm was produced by substantially the same method as in Example 7 except that the above-obtained liquid composition was used.
(Examination of Mutual Fusion State)

Examination under an optical microscope confirmed that organic particles 1 fused with one another to form a continuous phase and organic particles 2 fused with one another to form a continuous phase, but organic particles 1 and organic particles 2 caused phase separation and did not together form a continuous phase.
(Production of a Lithium-Ion Secondary Battery)

A lithium-ion secondary battery was produced by substantially the same method as in Example 1 except that the above-produced negative electrode coated with the battery electrode or separator surface protective agent composition was used.

Example 44

In Example 44, a method is described in which a lithium-ion secondary battery is produced using an electrode having a negative electrode coated with the battery electrode or separator surface protective agent composition which further comprises a titanium coupling agent and silica.
(Preparation of Fusible Organic Particles 1 Containing Inorganic Particles)

Organic particles were prepared by substantially the same method as in Example 43 except that, instead of the epoxy silane coupling agent in Example 41, a titanium coupling agent (Orgatix TC-400, manufactured by Matsumoto Trading Co., Ltd.) was used.
(Preparation of Fusible, Thermally Crosslinkable Organic Particles 2)

Thermally crosslinkable epoxy resin particles were obtained by the same method as in Example 7.
(Preparation of a Composition Comprising the Two Types of Fusible Particles)

A liquid composition was obtained as the battery electrode or separator surface protective agent composition by substantially the same method as in Example 42 except that the above-prepared organic particles 1 and organic particles 2 were used.
(Production of a Positive Electrode)

A positive electrode was produced by the same method as in Example 1.
(Production of a Negative Electrode)

A negative electrode was produced by the same method as in Example 1.
(Production of a Negative Electrode Coated with the Battery Electrode or Separator Surface Protective Agent Composition)

A negative electrode coated with the battery electrode or separator surface protective agent composition having a thickness of 15 μm was produced by substantially the same method as in Example 7 except that the above-obtained liquid composition was used.
(Examination of Mutual Fusion State)

Examination under an optical microscope confirmed that organic particles 1 fused with one another to form a continuous phase and organic particles 2 fused with one another to form a continuous phase, but organic particles 1 and organic particles 2 caused phase separation and did not together form a continuous phase.
(Production of a Lithium-Ion Secondary Battery)
A lithium-ion secondary battery was produced by substantially the same method as in Example 1 except that the above-produced negative electrode coated with the battery electrode or separator surface protective agent composition was used.

Example 45

In Example 45, a method is described in which a lithium-ion secondary battery is produced using an electrode having a negative electrode coated with the battery electrode or separator surface protective agent composition which further comprises a silane coupling agent and α-alumina.
(Preparation of Fusible Organic Particles 1 Containing Inorganic Particles)
Organic particles were prepared by substantially the same method as in Example 43 except that, instead of the silica in Example 43, the above-mentioned α-alumina was used.
(Preparation of Fusible, Thermally Crosslinkable Organic Particles 2)
Thermally crosslinkable epoxy resin particles were obtained by the same method as in Example 7.
(Preparation of a Composition Comprising the Two Types of Fusible Particles)
A liquid composition was obtained as the battery electrode or separator surface protective agent composition by substantially the same method as in Example 42 except that the above-prepared organic particles 1 and organic particles 2 were used.
(Production of a Positive Electrode)
A positive electrode was produced by the same method as in Example 1.
(Production of a Negative Electrode)
A negative electrode was produced by the same method as in Example 1.
(Production of a Negative Electrode Coated with the Battery Electrode or Separator Surface Protective Agent Composition)
A negative electrode coated with the battery electrode or separator surface protective agent composition having a thickness of 15 μm was produced by substantially the same method as in Example 7 except that the above-obtained liquid composition was used.
(Examination of Mutual Fusion State)
Examination under an optical microscope confirmed that organic particles 1 fused with one another to form a continuous phase and organic particles 2 fused with one another to form a continuous phase, but organic particles 1 and organic particles 2 caused phase separation and did not together form a continuous phase.
(Production of a Lithium-Ion Secondary Battery)
A lithium-ion secondary battery was produced by substantially the same method as in Example 1 except that the above-produced negative electrode coated with the battery electrode or separator surface protective agent composition was used.

Example 46

In Example 46, a method is described in which a lithium-ion secondary battery is produced using an electrode having a negative electrode coated with the battery electrode or separator surface protective agent composition which further comprises a titanium coupling agent and α-alumina.
(Preparation of Fusible Organic Particles 1 Containing Inorganic Particles)
Organic particles were prepared by substantially the same method as in Example 45 except that, instead of the epoxy silane coupling agent in Example 45, the above-mentioned titanium coupling agent was used.
(Preparation of Fusible, Thermally Crosslinkable Organic Particles 2)
Thermally crosslinkable epoxy resin particles were obtained by the same method as in Example 7.
(Preparation of a Composition Comprising the Two Types of Fusible Particles)
A liquid composition was obtained as the battery electrode or separator surface protective agent composition by substantially the same method as in Example 42 except that the above-prepared organic particles 1 and organic particles 2 were used.
(Production of a Positive Electrode)
A positive electrode was produced by the same method as in Example 1.
(Production of a Negative Electrode)
A negative electrode was produced by the same method as in Example 1.
(Production of a Negative Electrode Coated with the Battery Electrode or Separator Surface Protective Agent Composition)
A negative electrode coated with the battery electrode or separator surface protective agent composition having a thickness of 15 μm was produced by substantially the same method as in Example 7 except that the above-obtained liquid composition was used.
(Examination of Mutual Fusion State)
Examination under an optical microscope confirmed that organic particles 1 fused with one another to form a continuous phase and organic particles 2 fused with one another to form a continuous phase, but organic particles 1 and organic particles 2 caused phase separation and did not together form a continuous phase.
(Production of a Lithium-Ion Secondary Battery)
A lithium-ion secondary battery was produced by substantially the same method as in Example 1 except that the above-produced negative electrode coated with the battery electrode or separator surface protective agent composition was used.

Example 47

In Example 47, a method is described in which a lithium-ion secondary battery is produced using an electrode having a negative electrode coated with the battery electrode or separator surface protective agent composition which further comprises a salt.
(Preparation of Fusible Organic Particles 1 Containing Inorganic Particles)
Cyanoethylated pullulan particles were obtained by the same method as in Example 37.
(Preparation of Fusible, Thermally Crosslinkable Organic Particles 2)
Thermally crosslinkable epoxy resin particles were obtained by the same method as in Example 7.
(Preparation of a Composition Comprising the Two Types of Fusible Particles)
6,000 parts of water, 100 parts of the above-mentioned polyoxyethylene, and 900 parts of the above-mentioned α-alumina were placed in a 10 L beaker and stirred by means of a propeller mixer at 80° C. for one hour to obtain a uniform solution. The obtained solution was cooled to room temperature, and to the solution were added 10 parts of lithium perchlorate, 700 parts of the above-prepared organic particles 1, and 300 parts of the above-prepared organic particles 2, and the resultant mixture was further stirred by means of a propeller mixer until the mixture became uniform to obtain a liquid composition as the battery electrode or separator surface protective agent composition.

(Production of a Positive Electrode)

A positive electrode was produced by the same method as in Example 1.

(Production of a Negative Electrode)

A negative electrode was produced by the same method as in Example 1.

(Production of a Negative Electrode Coated with the Battery Electrode or Separator Surface Protective Agent Composition)

A negative electrode coated with the battery electrode or separator surface protective agent composition having a thickness of 15 μm was produced by substantially the same method as in Example 7 except that the above-obtained liquid composition was used.

(Examination of Mutual Fusion State)

Examination under an optical microscope confirmed that organic particles 1 fused with one another to form a continuous phase and organic particles 2 fused with one another to form a continuous phase, but organic particles 1 and organic particles 2 caused phase separation and did not together form a continuous phase.

(Production of a Lithium-Ion Secondary Battery)

A lithium-ion secondary battery was produced by substantially the same method as in Example 1 except that the above-produced negative electrode coated with the battery electrode or separator surface protective agent composition was used.

Example 48

In Example 48, a method is described in which a lithium-ion secondary battery is produced using an electrode having a negative electrode coated with the battery electrode or separator surface protective agent composition which further comprises a salt.

(Preparation of Fusible Organic Particles 1 Containing Inorganic Particles)

Cyanoethylated pullulan particles were obtained by the same method as in Example 37.

(Preparation of Fusible, Thermally Crosslinkable Organic Particles 2)

Thermally crosslinkable epoxy resin particles were obtained by the same method as in Example 7.

(Preparation of a Composition Comprising the Two Types of Fusible Particles)

A battery electrode or separator surface protective agent composition was prepared by substantially the same method as in Example 47 except that, instead of the lithium perchlorate, a composite of lithium perchlorate, lithium trifluoromethanesulfonate, and PEO-PPO (PEL-25, manufactured by Japan Carlit Co., Ltd.) was used.

(Production of a Positive Electrode)

A positive electrode was produced by the same method as in Example 1.

(Production of a Negative Electrode)

A negative electrode was produced by the same method as in Example 1.

(Production of a Negative Electrode Coated with the Battery Electrode or Separator Surface Protective Agent Composition)

A negative electrode coated with the battery electrode or separator surface protective agent composition having a thickness of 15 μm was produced by substantially the same method as in Example 7 except that the above-obtained liquid composition was used.

(Examination of Mutual Fusion State)

Examination under an optical microscope confirmed that organic particles 1 fused with one another to form a continuous phase and organic particles 2 fused with one another to form a continuous phase, but organic particles 1 and organic particles 2 caused phase separation and did not together form a continuous phase.

(Production of a Lithium-Ion Secondary Battery)

A lithium-ion secondary battery was produced by substantially the same method as in Example 1 except that the above-produced negative electrode coated with the battery electrode or separator surface protective agent composition was used.

Example 49

In Example 49, a method is described in which a lithium-ion secondary battery is produced using an electrode having a negative electrode coated with the battery electrode or separator surface protective agent composition which further comprises rubber particles.

(Preparation of Fusible Organic Particles 1 Containing Inorganic Particles)

Cyanoethylated pullulan particles were obtained by the same method as in Example 37.

(Preparation of Fusible, Thermally Crosslinkable Organic Particles 2)

Thermally crosslinkable epoxy resin particles were obtained by the same method as in Example 7.

(Preparation of a Composition Comprising the Two Types of Fusible Particles)

A battery electrode or separator surface protective agent composition was prepared by substantially the same method as in Example 47 except that, instead of the lithium perchlorate, a composite of lithium perchlorate, lithium trifluoromethanesulfonate, and PEO-PPO (PEL-25, manufactured by Japan Carlit Co., Ltd.) was used, and that 300 parts of silicone rubber particles (TORAYFIL E-500, manufactured by Dow Corning Toray Co., Ltd.; particle diameter: 3 μm; Tg: −20° C. or lower; hydrogen bonding functional group value: 0.0005 mol/g or less) were incorporated simultaneously with the organic particles.

(Production of a Positive Electrode)

A positive electrode was produced by the same method as in Example 1.

(Production of a Negative Electrode)

A negative electrode was produced by the same method as in Example 1.

(Production of a Negative Electrode Coated with the Battery Electrode or Separator Surface Protective Agent Composition)

A negative electrode coated with the battery electrode or separator surface protective agent composition having a thickness of 15 μm was produced by substantially the same method as in Example 7 except that the above-obtained liquid composition was used.

(Examination of Mutual Fusion State)

Examination under an optical microscope confirmed that organic particles 1 fused with one another to form a continuous phase and organic particles 2 fused with one another to form a continuous phase, but organic particles 1 and organic particles 2 caused phase separation and did not together form a continuous phase.
(Production of a Lithium-Ion Secondary Battery)

A lithium-ion secondary battery was produced by substantially the same method as in Example 1 except that the above-produced negative electrode coated with the battery electrode or separator surface protective agent composition was used.

Example 50

A lithium-ion secondary battery was produced by substantially the same method as in Example 49 except that the silicone rubber particles were changed to nitrile rubber particles (acrylonitrile-butadiene rubber particles; particle diameter: 0.5 μm; Tg: −20° C. or lower; hydrogen bonding functional group value: 0.0005 mol/g or less; acrylonitrile:butadiene=1:1).

Example 51

A lithium-ion secondary battery was produced by substantially the same method as in Example 50 except that the battery electrode or separator surface protective agent composition was used for the positive electrode under the same application conditions as those for the negative electrode.
(Examination of Mutual Fusion State)

Examination under an optical microscope confirmed that organic particles 1 fused with one another to form a continuous phase and organic particles 2 fused with one another to form a continuous phase, but organic particles 1 and organic particles 2 caused phase separation and did not together form a continuous phase.

Example 52

A lithium-ion secondary battery was produced by substantially the same method as in Example 50 except that the battery electrode or separator surface protective agent composition was used for both the positive electrode and negative electrode.
(Examination of Mutual Fusion State)

Examination under an optical microscope confirmed that organic particles 1 fused with one another to form a continuous phase and organic particles 2 fused with one another to form a continuous phase, but organic particles 1 and organic particles 2 caused phase separation and did not together form a continuous phase.

Example 53

In Example 53, a method is described in which a lithium-ion secondary battery is produced using an electrode having a separator coated with the battery electrode or separator surface protective agent composition.
(Preparation of Fusible, Thermally Crosslinkable Organic Particles 1)

Epoxy particles were obtained by the same method as in Example 11.
(Preparation of Fusible, Thermally Crosslinkable Organic Particles 2)

Urethane resin particles were obtained by the same method as in Example 11.

(Preparation of a Composition Comprising the Two Types of Fusible Particles)

A battery electrode or separator surface protective agent composition was prepared by the same method as in Example 11.
(Production of a Positive Electrode)

A positive electrode was produced by the same method as in Example 1, but was not coated with the electrode or separator surface protective agent composition.
(Production of a Negative Electrode)

A negative electrode was produced by the same method as in Example 1, but was not coated with the electrode or separator surface protective agent composition.
(Production of a Separator)

A separator was coated with the above-prepared composition, and dried at 100° C. for 60 seconds to produce a separator coated with the battery electrode or separator surface protective agent composition.
(Examination of Mutual Fusion State)

Examination under an optical microscope confirmed that organic particles 1 fused with one another to form a continuous phase and organic particles 2 fused with one another to form a continuous phase, but organic particles 1 and organic particles 2 caused phase separation and did not together form a continuous phase.
(Production of a Lithium-Ion Secondary Battery)

A lithium-ion secondary battery was produced by substantially the same method as in Example 1 except that the above-produced separator coated with the battery electrode or separator surface protective agent composition was used, and that the positive and negative electrodes which are not coated with the battery electrode or separator surface protective agent composition were used.

Example 54

In Example 54, a method is described in which a lithium-ion secondary battery is produced using an electrode having a separator coated with the battery electrode or separator surface protective agent composition.
(Preparation of Fusible Organic Particles 1)

An ethylene-vinyl acetate copolymer emulsion (Panflex OM-4000NT, manufactured by Kuraray Co., Ltd.; average particle diameter: 0.7 μm; solids content: 55%) was used.
(Preparation of Fusible, Thermally Crosslinkable Organic Particles 2)

Epoxy particles were obtained by the same method as in Example 11.
(Preparation of a Composition Comprising the Two Types of Fusible Particles)

A battery electrode or separator surface protective agent composition was prepared by substantially the same method as in Example 11 except that the above-prepared fusible organic particles 1 were used as particles 1.
(Production of a Positive Electrode)

A positive electrode was produced by the same method as in Example 1, but was not coated with the electrode or separator surface protective agent composition.
(Production of a Negative Electrode)

A negative electrode was produced by the same method as in Example 1, but was not coated with the electrode or separator surface protective agent composition.
(Production of a Separator)

A separator was coated with the above-prepared composition, and dried at 100° C. for 60 seconds to produce a separator coated with the battery electrode or separator surface protective agent composition.

(Examination of Mutual Fusion State)

Examination under an optical microscope confirmed that organic particles 1 fused with one another to form a continuous phase and organic particles 2 fused with one another to form a continuous phase, but organic particles 1 and organic particles 2 caused phase separation and did not together form a continuous phase.

(Production of a Lithium-Ion Secondary Battery)

A lithium-ion secondary battery was produced by substantially the same method as in Example 1 except that the above-produced separator coated with the battery electrode or separator surface protective agent composition was used, and that the positive and negative electrodes which are not coated with the battery electrode or separator surface protective agent composition were used.

Comparative Example 1

A lithium-ion secondary battery was produced by substantially the same method as in Example 1 except that an electrode which is not coated with the battery electrode or separator surface protective agent composition was used.

Comparative Example 2

A lithium-ion secondary battery was produced by substantially the same method as in Example 5 except that N-methylpyrrolidone was used as a solvent instead of water and the thermally fusible organic particles were used in the state of being dissolved in the solvent.

(Examination of Mutual Fusion State)

Examination under an optical microscope confirmed that the organic particles of types different from each other thermally fused together, and no phase separation structure was found. The reason why no phase separation occurred is presumed that there is no insolubilization by thermal cross-linking, and that the organic particles were used in the uniform phase preliminarily formed using a good solvent of the organic particles.

TABLE 1

Evaluation with respect to lithium-ion secondary battery

| Example/Comparative Example | Initial capacity (mAh) | Initial internal resistance (Ω) | Rate characteristics: Capacity maintaining ratio (%) | | | | Cycle life (Cycle) | Float resistance | Heat resistance | Heat resistance appearance |
|---|---|---|---|---|---|---|---|---|---|---|
| | | | 1 C | 3 C | 10 C | 30 C | | | | |
| Example 1 | 6 | 4.5 | 98 | 91 | 73 | 37 | 680 | 860 | C | B |
| Example 2 | 6 | 4.8 | 98 | 90 | 70 | 36 | 660 | 840 | C | B |
| Example 3 | 6 | 5.1 | 98 | 89 | 68 | 35 | 650 | 820 | C | B |
| Example 4 | 6 | 5.3 | 97 | 87 | 66 | 32 | 670 | 1200 | C | B |
| Example 5 | 6 | 5.4 | 97 | 86 | 64 | 31 | 660 | 1400 | B | B |
| Example 6 | 6 | 5.3 | 98 | 88 | 68 | 34 | 650 | 1300 | B | B |
| Example 7 | 7 | 4.2 | 98 | 92 | 75 | 39 | 750 | 1400 | B | B |
| Example 8 | 7 | 4 | 98 | 93 | 78 | 41 | 760 | 1600 | B | B |
| Example 9 | 7 | 3.9 | 98 | 93 | 79 | 43 | 770 | 1500 | C | B |
| Example 10 | 7 | 3.8 | 98 | 93 | 79 | 45 | 780 | 1500 | C | B |
| Example 11 | 6 | 5.7 | 96 | 85 | 63 | 29 | 640 | 1600 | A | A |
| Example 12 | 7 | 4.2 | 98 | 93 | 76 | 40 | 760 | 1400 | B | A |
| Example 13 | 8 | 3.7 | 99 | 94 | 80 | 41 | 810 | 2100 | A | A |
| Example 14 | 8 | 3.6 | 99 | 94 | 81 | 40 | 820 | 2200 | A | A |
| Example 15 | 8 | 3.5 | 99 | 95 | 82 | 42 | 850 | 2400 | A | A |
| Example 16 | 8 | 3.5 | 99 | 94 | 83 | 43 | 870 | 2500 | A | A |
| Example 17 | 8 | 3.6 | 99 | 95 | 82 | 44 | 860 | 2300 | A | A |
| Example 18 | 8 | 3.4 | 99 | 95 | 84 | 45 | 900 | 2500 | A | A |
| Example 19 | 9 | 3.1 | 99 | 97 | 88 | 51 | 1200 | 2900 | A | A |
| Example 20 | 8 | 3.3 | 99 | 96 | 87 | 49 | 1100 | 2600 | A | A |
| Example 21 | 9 | 2.7 | 99 | 97 | 90 | 55 | 1400 | 3100 | A | A |
| Example 22 | 8 | 3.2 | 99 | 96 | 85 | 48 | 1000 | 2700 | A | A |
| Example 23 | 8 | 4.1 | 98 | 94 | 77 | 41 | 780 | 1500 | A | A |
| Example 24 | 7 | 4.2 | 98 | 93 | 77 | 41 | 770 | 1400 | B | A |
| Example 25 | 7 | 4.2 | 98 | 92 | 75 | 42 | 760 | 1300 | B | A |
| Example 26 | 8 | 2.9 | 98 | 97 | 88 | 53 | 1300 | 2900 | A | A |
| Example 27 | 7 | 4.1 | 98 | 92 | 76 | 40 | 770 | 1500 | B | A |
| Example 28 | 7 | 3 | 99 | 97 | 89 | 53 | 1300 | 2900 | A | A |

TABLE 2

| Example/Comparative Example | Initial capacity (mAh) | Initial internal resistance (Ω) | Rate characteristics: Capacity maintaining ratio (%) | | | | Cycle life (Cycle) | Float resistance | Heat resistance | Heat resistance appearance |
|---|---|---|---|---|---|---|---|---|---|---|
| | | | 1 C | 3 C | 10 C | 30 C | | | | |
| Example 29 | 7 | 4.3 | 98 | 91 | 76 | 38 | 740 | 1500 | A | A |
| Example 30 | 7 | 4.5 | 97 | 90 | 71 | 35 | 760 | 1600 | B | B |
| Example 31 | 7 | 3.8 | 98 | 93 | 74 | 43 | 800 | 1900 | A | A |
| Example 32 | 6 | 4.8 | 96 | 88 | 70 | 34 | 750 | 1800 | B | A |

TABLE 2-continued

| Example/Comparative Example | Initial capacity (mAh) | Initial internal resistance (Ω) | Rate characteristics: Capacity maintaining ratio (%) | | | | Cycle life (Cycle) | Float resistance | Heat resistance | Heat resistance appearance |
|---|---|---|---|---|---|---|---|---|---|---|
| | | | 1 C | 3 C | 10 C | 30 C | | | | |
| Example 33 | 6 | 5.2 | 96 | 85 | 68 | 32 | 760 | 2000 | A | A |
| Example 34 | 7 | 4.8 | 97 | 91 | 72 | 38 | 770 | 1500 | B | B |
| Example 35 | 8 | 3.9 | 98 | 95 | 75 | 44 | 850 | 1800 | B | B |
| Example 36 | 8 | 4.1 | 98 | 94 | 73 | 41 | 860 | 1900 | B | B |
| Example 37 | 9 | 2.1 | 99 | 98 | 93 | 67 | 2100 | 4200 | A | A |
| Example 38 | 10 | 1.8 | 99 | 98 | 96 | 85 | 3800 | 4500 | A | A |
| Example 39 | 10 | 2.3 | 99 | 98 | 92 | 65 | 3100 | 4600 | A | A |
| Example 40 | 7 | 4.8 | 97 | 90 | 73 | 32 | 850 | 2100 | A | A |
| Example 41 | 9 | 2 | 99 | 98 | 94 | 71 | 2500 | 4300 | A | A |
| Example 42 | 9 | 2 | 99 | 98 | 93 | 69 | 2400 | 4200 | A | A |
| Example 43 | 7 | 4.1 | 98 | 93 | 78 | 42 | 780 | 1500 | A | A |
| Example 44 | 7 | 4.3 | 98 | 92 | 75 | 41 | 770 | 1300 | B | A |
| Example 45 | 9 | 3.2 | 99 | 96 | 89 | 48 | 1200 | 2800 | A | A |
| Example 46 | 9 | 3 | 99 | 98 | 89 | 53 | 1300 | 3000 | A | A |
| Example 47 | 9 | 1.9 | 99 | 98 | 94 | 71 | 2600 | 4300 | A | A |
| Example 48 | 10 | 1.8 | 99 | 98 | 94 | 72 | 2700 | 4600 | A | A |
| Example 49 | 10 | 1.7 | 99 | 98 | 94 | 75 | 2600 | 4500 | A | A |
| Example 50 | 10 | 1.6 | 99 | 98 | 95 | 77 | 2700 | 4500 | A | A |
| Example 51 | 6 | 5.9 | 95 | 88 | 62 | 29 | 590 | 680 | A | A |
| Example 52 | 10 | 1.7 | 99 | 98 | 95 | 75 | 2800 | 4600 | A | A |
| Example 53 | 6 | 6.8 | 94 | 82 | 58 | 20 | 540 | 680 | A | A |
| Example 54 | 8 | 2.4 | 99 | 98 | 91 | 66 | 2900 | 4400 | A | A |
| Comparative Example 1 | 6 | 6.3 | 94 | 83 | 59 | 21 | 520 | 650 | D | D |
| Comparative Example 2 | 5 | 8.5 | 91 | 72 | 51 | 10 | 530 | 680 | D | C |

INDUSTRIAL APPLICABILITY

By using the battery electrode or separator surface protective agent composition of one or more embodiments of the present invention, there can be provided a battery which exhibits low internal resistance and excellent heat resistance safety and more excellent electrochemical durability than that of a conventional battery, and thus exhibits excellent long-term reliability.

While the invention has been described with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

DESCRIPTION OF THE REFERENCE NUMERALS

1: Layer of battery electrode or separator surface protective agent composition
2: Active material layer
3: Current collector
4: Separator
5: First particle
6: Second particle

The invention claimed is:

1. A battery electrode or separator surface protective agent composition having fluidity and being capable of being solidified by hot melt, and comprising:
at least two types of organic particles comprising organic materials, and
inorganic particles having an active hydrogen group and having a pH for isoelectric point in a range of 4 to 13;
wherein the organic particles of types different from each other are substantially incompatible with each other,
wherein when the composition is solidified by hot melt, the organic particles of the same type thermally fuse with one another to form a continuous phase.

2. The battery electrode or separator surface protective agent composition according to claim 1, wherein at least one type of the organic particles undergo crosslinking upon heat fusion.

3. The battery electrode or separator surface protective agent composition according to claim 2, wherein the crosslinking upon heat fusion occurs at a temperature below a heat fusion temperature of the organic particles of the other type(s).

4. The battery electrode or separator surface protective agent composition according to claim 1, wherein, in the at least two types of organic particles comprising organic materials and being substantially incompatible with each other, one type of the organic particles include, in an amount of 5 wt % or more, an organic material having a hydrogen bonding functional group value of 0.001 to 0.023 mol/g, and the other at least one type of the organic particles include, in an amount of 5 wt % or more, an organic material having a hydrogen bonding functional group value which is ½ or less of that of the above particles.

5. The battery electrode or separator surface protective agent composition according to claim 1, wherein at least one type of the organic particles have a cyano group and/or a polyethylene glycol structure.

6. The battery electrode or separator surface protective agent composition according to claim 1, further comprising a core-shell type foaming agent.

7. The battery electrode or separator surface protective agent composition according to claim 1, further comprising a liquid binder in an amount of 50 wt % or less, based on a weight of the at least two types of organic particles comprising organic materials and being substantially incompatible with each other.

8. The battery electrode or separator surface protective agent composition according to claim 7, wherein the liquid binder is an energy radiation curable resin.

9. A battery electrode or separator which is protected by the battery electrode or separator surface protective agent composition according to claim 1.

10. A battery having the battery electrode or separator according to claim 9.

11. A battery electrode or separator surface protective agent composition having fluidity and being capable of being solidified by hot melt, and comprising:
   at least two types of organic particles comprising organic materials,
   wherein the organic particles of types different from each other are substantially incompatible with each other,
   wherein when the composition is solidified by hot melt, the organic particles of the same type thermally fuse with one another to form a continuous phase,
   wherein at least one type of the organic particles are covered with an inorganic material covering layer, and
   wherein the organic particles covered with an inorganic material break at least part of the inorganic material covering layer by heating, so that the organic particles fuse with one another.

12. A battery electrode or separator surface protective agent composition having fluidity and being capable of being solidified by hot melt, and comprising:
   at least two types of organic particles comprising organic materials, and
   a core-shell type foaming agent,
   wherein the organic particles of types different from each other are substantially incompatible with each other, and
   wherein when the composition is solidified by hot melt, the organic particles of the same type thermally fuse with one another to form a continuous phase.

13. A battery electrode or separator surface protective agent composition having fluidity and being capable of being solidified by hot melt, and comprising:
   at least two types of organic particles comprising organic materials, and
   a liquid binder in an amount of 50 wt % or less, based on a weight of the at least two types of organic particles comprising organic materials,
   wherein the organic particles of types different from each other are substantially incompatible with each other, and
   wherein when the composition is solidified by hot melt, the organic particles of the same a type thermally fuse with one another to form a continuous phase.

14. The battery electrode or separator surface protective agent composition according to claim 13, wherein the liquid binder is an energy radiation curable resin.

15. A battery electrode or separator which is protected by the battery electrode or separator surface protective agent composition according to claim 11.

16. A battery having the battery electrode or separator according to claim 15.

17. A battery electrode or separator which is protected by the battery electrode or separator surface protective agent composition according to claim 12.

18. A battery having the battery electrode or separator according to claim 17.

19. A battery electrode or separator which is protected by the battery electrode or separator surface protective agent composition according to claim 13.

20. A battery having the battery electrode or separator according to claim 19.

* * * * *